(12) United States Patent  
Clarke et al.

(10) Patent No.: US 12,447,005 B2  
(45) Date of Patent: Oct. 21, 2025

(54) DELIVERY DEVICES FOR IMPLANTATION OF INTRAOCULAR LENS SUPPORT DEVICES AND METHODS OF USE

(71) Applicant: Long Bridge Medical, Inc., South San Francisco, CA (US)

(72) Inventors: Matthew Clarke, South San Francisco, CA (US); Ayman Naseri, South San Francisco, CA (US)

(73) Assignee: Long Bridge Medical, Inc., South San Francisco, CA (US)

( * ) Notice: Subject to any disclaimer, the term of this patent is extended or adjusted under 35 U.S.C. 154(b) by 953 days.

(21) Appl. No.: 17/576,573

(22) Filed: Jan. 14, 2022

(65) Prior Publication Data

US 2022/0211487 A1    Jul. 7, 2022

Related U.S. Application Data

(63) Continuation-in-part of application No. 17/396,048, filed on Aug. 6, 2021, and a continuation of
(Continued)

(51) Int. Cl.
  *A61F 2/16*   (2006.01)
  *A61F 2/14*   (2006.01)

(52) U.S. Cl.
  CPC ................. *A61F 2/16* (2013.01); *A61F 2/14* (2013.01); *A61F 2/15* (2015.04);
(Continued)

(58) Field of Classification Search
  CPC ...... A61F 2/16; A61F 2/15; A61F 2/14; A61F 2002/169; A61F 2002/16902;
(Continued)

(56) References Cited

U.S. PATENT DOCUMENTS 3,673,616 A    7/1972  Fedorov et al.
3,866,249 A    2/1975  Flom
(Continued)

FOREIGN PATENT DOCUMENTS

CA    2928918 A1    3/2017
CN    2328346 Y    7/1999
(Continued)

OTHER PUBLICATIONS

Alwitry, Amir (n.d.) IC-8 pinhole IOL. 1 page. https://amaralwitry.com/about/our-procedures/premium-lenses-refractive-procedures/ic-8-pinhole-iol.
(Continued)

*Primary Examiner* — Jerrah Edwards
*Assistant Examiner* — Aren Patel
(74) *Attorney, Agent, or Firm* — Mintz Levin Cohn Ferris Glovsky and Popeo, P.C.

(57) ABSTRACT

An insertion tool for delivering an implantable lens support device into an eye having a proximal end region; a distal end region having a distal hook; and an intermediate region connecting the distal end region to the proximal end region, the intermediate region being substantially planar. The distal end region and intermediate region are sized for insertion through a clear corneal incision. Related tools, methods, and devices are provided.

29 Claims, 24 Drawing Sheets

Related U.S. Application Data application No. 16/988,519, filed on Aug. 7, 2020, now Pat. No. 11,759,309.

(60) Provisional application No. 63/239,134, filed on Aug. 31, 2021, provisional application No. 63/183,488, filed on May 3, 2021, provisional application No. 63/137,663, filed on Jan. 14, 2021, provisional application No. 63/129,448, filed on Dec. 22, 2020, provisional application No. 63/089,241, filed on Oct. 8, 2020, provisional application No. 63/063,110, filed on Aug. 7, 2020, provisional application No. 63/053,450, filed on Jul. 17, 2020, provisional application No. 63/017,423, filed on Apr. 29, 2020.

(52) U.S. Cl.
CPC ............ *A61F 2002/1681* (2013.01); *A61F 2002/1689* (2013.01); *A61F 2002/169* (2015.04); *A61F 2002/16902* (2015.04); *A61F 2002/169053* (2015.04); *A61F 2002/1696* (2015.04); *A61F 2230/0006* (2013.01)

(58) Field of Classification Search
CPC .. A61F 2002/169053; A61F 2002/1696; A61F 2002/1681; A61F 2002/1689; A61F 2230/0006; A61F 2/1662
See application file for complete search history.

(56) References Cited

U.S. PATENT DOCUMENTS

| | | | |
|---|---|---|---|
| 3,922,728 A | 12/1975 | Krasnov | |
| 3,925,825 A | 12/1975 | Richards et al. | |
| 3,986,214 A | 10/1976 | Krasnov | |
| 4,014,049 A | 3/1977 | Richards et al. | |
| 4,073,014 A | 2/1978 | Poler | |
| 4,110,848 A | 9/1978 | Jensen | |
| 4,118,808 A | 10/1978 | Poler | |
| 4,168,547 A | 9/1979 | Konstantinov et al. | |
| 4,190,049 A | 2/1980 | Hager et al. | |
| 4,215,440 A | 8/1980 | Worst | |
| 4,242,762 A | 1/1981 | Tennant | |
| 4,254,511 A | 3/1981 | Chase et al. | |
| 4,262,370 A | 4/1981 | Hartstein | |
| 4,298,996 A | 11/1981 | Barnet | |
| 4,429,421 A * | 2/1984 | Levy | A61F 2/1662 |
| | | | 606/107 |
| 4,437,194 A | 3/1984 | Hahs | |
| 4,576,607 A | 3/1986 | Kelman | |
| 4,585,457 A | 4/1986 | Kalb | |
| 4,617,023 A | 10/1986 | Peyman | |
| 4,629,460 A | 12/1986 | Dyer | |
| 4,718,905 A | 1/1988 | Freeman | |
| 4,737,322 A | 4/1988 | Bruns et al. | |
| 4,790,847 A | 12/1988 | Woods | |
| 4,878,910 A | 11/1989 | Koziol et al. | |
| 4,932,971 A | 6/1990 | Kelman | |
| 5,026,396 A | 6/1991 | Darin | |
| 5,152,787 A | 10/1992 | Hamblen | |
| 5,222,981 A | 6/1993 | Werblin | |
| 5,258,025 A | 11/1993 | Fedorov et al. | |
| 5,275,624 A | 1/1994 | Hara et al. | |
| 5,326,347 A | 7/1994 | Cumming | |
| 5,336,262 A | 8/1994 | Chu | |
| 5,466,233 A | 11/1995 | Weiner et al. | |
| 5,507,805 A | 4/1996 | Koeniger | |
| 5,628,795 A | 5/1997 | Langerman | |
| 5,628,798 A | 5/1997 | Eggleston et al. | |
| 5,697,973 A | 12/1997 | Peyman et al. | |
| 5,752,960 A | 5/1998 | Nallakrishnan | |
| 5,776,191 A | 7/1998 | Mazzocco | |
| 5,843,184 A | 12/1998 | Cionni | |
| 6,027,531 A | 2/2000 | Tassignon | |
| 6,066,171 A | 5/2000 | Lipshitz et al. |
| 6,113,633 A | 9/2000 | Portney |
| 6,136,026 A | 10/2000 | Israel |
| 6,152,959 A | 11/2000 | Portney |
| 6,228,115 B1 | 5/2001 | Hoffmann et al. |
| 6,261,321 B1 | 7/2001 | Kellan |
| 6,264,693 B1 | 7/2001 | Ross |
| 6,299,641 B1 | 10/2001 | Woods |
| 6,342,058 B1 | 1/2002 | Portney |
| 6,398,809 B1 | 6/2002 | Hoffmann et al. |
| 6,443,985 B1 | 9/2002 | Woods |
| 6,488,708 B2 | 12/2002 | Sarfarazi |
| 6,551,354 B1 | 4/2003 | Ghazizadeh et al. |
| 6,596,026 B1 | 7/2003 | Gross et al. |
| 6,616,691 B1 | 9/2003 | Tran |
| 6,616,692 B1 | 9/2003 | Glick et al. |
| 6,660,036 B2 | 12/2003 | Cumming |
| 6,685,741 B2 | 2/2004 | Landreville et al. |
| 6,767,363 B1 | 7/2004 | Bandhauer et al. |
| 6,797,004 B1 | 9/2004 | Brady et al. |
| 6,881,225 B2 | 4/2005 | Okada |
| 6,921,415 B2 | 7/2005 | Callahan et al. |
| 6,972,033 B2 | 12/2005 | McNicholas |
| 7,125,422 B2 | 10/2006 | Woods et al. |
| 7,223,288 B2 | 5/2007 | Zhang et al. |
| 7,300,464 B2 | 11/2007 | Tran |
| 7,311,194 B2 | 12/2007 | Jin et al. |
| 7,354,451 B2 | 4/2008 | Koch |
| 7,416,561 B2 | 8/2008 | Worst et al. |
| 7,462,194 B1 | 12/2008 | Blake |
| 7,569,048 B2 | 8/2009 | Brown |
| 7,597,678 B2 | 10/2009 | Brown |
| 7,662,179 B2 | 2/2010 | Sarfarazi |
| 7,763,069 B2 | 7/2010 | Brady et al. |
| 7,794,498 B2 | 9/2010 | Pinchuk |
| 7,806,929 B2 | 10/2010 | Brown |
| 7,806,930 B2 | 10/2010 | Brown |
| 7,875,270 B2 | 1/2011 | Zhang |
| 7,931,686 B2 | 4/2011 | Vaudant et al. |
| 8,012,204 B2 | 9/2011 | Weinschenk, III et al. |
| 8,109,998 B2 | 2/2012 | Cumming |
| 8,128,693 B2 | 3/2012 | Tran et al. |
| 8,162,927 B2 | 4/2012 | Peyman |
| 8,216,305 B2 | 7/2012 | Salvati et al. |
| 8,273,123 B2 | 9/2012 | Ben Nun |
| 8,377,125 B2 | 2/2013 | Kellan |
| 8,551,164 B2 | 10/2013 | Willis et al. |
| 8,585,758 B2 | 11/2013 | Woods |
| 8,663,235 B2 | 3/2014 | Tassignon |
| 8,764,823 B2 | 7/2014 | Cumming |
| 8,778,022 B2 | 7/2014 | Blum et al. |
| 8,821,166 B2 | 9/2014 | Akura et al. |
| 8,852,275 B2 | 10/2014 | Park |
| 8,888,845 B2 | 11/2014 | Vaquero et al. |
| 8,900,300 B1 | 12/2014 | Wortz |
| 8,920,495 B2 | 12/2014 | Mirlay |
| 8,932,351 B2 | 1/2015 | Dell |
| 8,945,215 B2 | 2/2015 | Basinger |
| 8,956,408 B2 | 2/2015 | Smiley et al. |
| 9,034,035 B2 | 5/2015 | Betser et al. |
| 9,039,762 B2 | 5/2015 | Hong et al. |
| 9,072,600 B2 | 7/2015 | Tran |
| 9,078,744 B2 | 7/2015 | Van Noy |
| 9,084,673 B2 | 7/2015 | Dell |
| 9,095,424 B2 | 8/2015 | Kahook et al. |
| 9,125,736 B2 | 9/2015 | Kahook et al. |
| 9,198,752 B2 | 12/2015 | Woods |
| 9,289,287 B2 | 3/2016 | Kahook et al. |
| 9,326,845 B2 | 5/2016 | Ichikawa et al. |
| 9,333,072 B2 | 5/2016 | Ichikawa |
| 9,339,375 B2 | 5/2016 | Lee et al. |
| 9,358,103 B1 | 6/2016 | Wortz et al. |
| 9,364,316 B1 | 6/2016 | Kahook et al. |
| 9,364,318 B2 | 6/2016 | Beer |
| 9,387,069 B2 | 7/2016 | Kahook et al. |
| 9,398,949 B2 | 7/2016 | Werblin |
| 9,421,088 B1 | 8/2016 | Kahook et al. |
| 9,439,754 B2 | 9/2016 | Wortz |
| 9,445,891 B2 | 9/2016 | Ichikawa |

(56) References Cited

U.S. PATENT DOCUMENTS

| | | |
|---|---|---|
| 9,445,892 B2 | 9/2016 | Brown |
| 9,468,523 B2 | 10/2016 | Dell |
| 9,498,325 B2 | 11/2016 | Salvati et al. |
| 9,504,558 B2 | 11/2016 | Wortz et al. |
| 9,517,127 B2 | 12/2016 | Wortz et al. |
| 9,522,060 B2 | 12/2016 | Wortz et al. |
| 9,622,857 B2 | 4/2017 | Coroneo |
| 9,629,711 B2 | 4/2017 | Cumming |
| 9,681,945 B2 | 6/2017 | Shahinpoor et al. |
| 9,681,946 B2 | 6/2017 | Kahook et al. |
| 9,713,526 B2 | 7/2017 | Rombach |
| 9,744,027 B2 | 8/2017 | Jansen |
| 9,757,227 B2 | 9/2017 | Kushlin et al. |
| 9,763,771 B1 | 9/2017 | Wortz et al. |
| 9,877,825 B2 | 1/2018 | Kahook et al. |
| 9,925,037 B2 | 3/2018 | Wortz et al. |
| 9,925,040 B2 | 3/2018 | Kahook et al. |
| 9,962,256 B2 | 5/2018 | McCafferty |
| 10,004,591 B2 | 6/2018 | Ichikawa |
| 10,010,405 B2 | 7/2018 | Hayes |
| 10,080,648 B2 | 9/2018 | Kahook et al. |
| 10,085,886 B2 | 10/2018 | Schuele et al. |
| 10,201,415 B2 | 2/2019 | Aharoni et al. |
| 10,271,944 B2 | 4/2019 | Ichikawa et al. |
| 10,271,945 B2 | 4/2019 | Wortz et al. |
| 10,286,107 B2 | 5/2019 | Kahook et al. |
| 10,299,910 B2 | 5/2019 | Cady |
| 10,383,721 B2 | 8/2019 | Marcos Celestino et al. |
| 10,433,950 B2 | 10/2019 | Shadduck |
| 10,449,036 B2 | 10/2019 | Christie et al. |
| 10,470,873 B2 | 11/2019 | Ichikawa et al. |
| 10,524,900 B2 | 1/2020 | Beer |
| 10,548,713 B2 | 2/2020 | Aharoni |
| 10,575,943 B2 | 3/2020 | Ingram |
| 10,603,162 B2 | 3/2020 | Wortz et al. |
| 10,765,509 B2 | 9/2020 | Olson et al. |
| 10,799,340 B2 | 10/2020 | Collins et al. |
| 10,973,624 B1 | 4/2021 | Clarke et al. |
| 11,364,110 B2 | 6/2022 | Webb |
| 11,382,736 B2 | 7/2022 | Zacher et al. |
| 11,759,311 B2 | 9/2023 | Whitsett |
| 11,833,029 B2 | 12/2023 | Dudee |
| 2002/0087210 A1 | 7/2002 | Stenger et al. |
| 2002/0103535 A1 | 8/2002 | Portney |
| 2002/0161433 A1 | 10/2002 | Baikoff et al. |
| 2003/0055499 A1 | 3/2003 | Nguyen et al. |
| 2003/0158560 A1 | 8/2003 | Portney |
| 2003/0158599 A1 | 8/2003 | Brady et al. |
| 2003/0220652 A1 | 11/2003 | Israel |
| 2004/0042073 A1 | 3/2004 | Pynson |
| 2004/0064182 A1 | 4/2004 | Kelman |
| 2004/0148022 A1 | 7/2004 | Eggleston |
| 2004/0236422 A1 | 11/2004 | Zhang et al. |
| 2004/0249455 A1 | 12/2004 | Tran |
| 2005/0021138 A1 | 1/2005 | Woods |
| 2005/0021140 A1 | 1/2005 | Liao |
| 2005/0085907 A1 | 4/2005 | Hanna |
| 2005/0177229 A1 | 8/2005 | Boxer Wachler |
| 2006/0047339 A1 | 3/2006 | Brown |
| 2006/0047340 A1 | 3/2006 | Brown |
| 2006/0235515 A1 | 10/2006 | Chassain |
| 2007/0027541 A1 | 2/2007 | Aharoni et al. |
| 2007/0032868 A1 | 2/2007 | Woods |
| 2007/0123982 A1 | 5/2007 | Yablonski et al. |
| 2007/0162115 A1 | 7/2007 | Hermeking |
| 2007/0260308 A1 | 11/2007 | Tran |
| 2008/0086208 A1 | 4/2008 | Nordan |
| 2008/0154364 A1 | 6/2008 | Richardson et al. |
| 2009/0171458 A1 | 7/2009 | Kellan et al. |
| 2009/0198247 A1 | 8/2009 | Ben Nun |
| 2009/0204209 A1 | 8/2009 | Tran |
| 2010/0030331 A1 | 2/2010 | Zhang et al. |
| 2010/0057095 A1* | 3/2010 | Khuray ............... A61F 2/1664 606/107 |
| 2010/0094415 A1 | 4/2010 | Bumbalough |
| 2010/0121444 A1 | 5/2010 | Ben Nun |
| 2010/0131059 A1 | 5/2010 | Callahan et al. |
| 2010/0152848 A1 | 6/2010 | Williamson et al. |
| 2010/0262234 A1 | 10/2010 | Tran et al. |
| 2011/0071628 A1 | 3/2011 | Gross et al. |
| 2011/0295368 A1 | 12/2011 | Betser |
| 2011/0313521 A1 | 12/2011 | Angelopoulos |
| 2011/0313522 A1 | 12/2011 | Hayes |
| 2011/0313523 A1 | 12/2011 | Hayes |
| 2012/0290086 A1 | 11/2012 | Malyugin et al. |
| 2012/0303119 A1 | 11/2012 | Callahan et al. |
| 2012/0330415 A1 | 12/2012 | Callahan et al. |
| 2013/0116781 A1 | 5/2013 | Ben Nun |
| 2013/0190868 A1 | 7/2013 | Kahook et al. |
| 2014/0094908 A1 | 4/2014 | Zaldivar et al. |
| 2014/0121768 A1 | 5/2014 | Simpson |
| 2014/0316520 A1 | 10/2014 | Barsam et al. |
| 2014/0330375 A1 | 11/2014 | McCafferty |
| 2014/0371851 A1 | 12/2014 | Aharoni |
| 2014/0371852 A1 | 12/2014 | Aharoni et al. |
| 2015/0025627 A1 | 1/2015 | Christie et al. |
| 2015/0127102 A1 | 5/2015 | Wortz |
| 2015/0265398 A1 | 9/2015 | Hartkens et al. |
| 2015/0305857 A1 | 10/2015 | Ichikawa |
| 2015/0366656 A1 | 12/2015 | Wortz et al. |
| 2015/0366659 A1 | 12/2015 | Wortz et al. |
| 2016/0000558 A1 | 1/2016 | Honigsbaum |
| 2016/0128828 A1 | 5/2016 | Dalvi |
| 2016/0157995 A1 | 6/2016 | Beer |
| 2016/0184089 A1 | 6/2016 | Dudee et al. |
| 2016/0256260 A1 | 9/2016 | Wortz et al. |
| 2016/0256262 A1 | 9/2016 | Wortz et al. |
| 2016/0256267 A1 | 9/2016 | Wortz et al. |
| 2016/0256315 A1 | 9/2016 | Wortz et al. |
| 2016/0331520 A1 | 11/2016 | Beer |
| 2016/0338825 A1 | 11/2016 | Wortz et al. |
| 2016/0361156 A1 | 12/2016 | Brown |
| 2017/0020662 A1 | 1/2017 | Shadduck |
| 2017/0049560 A1 | 2/2017 | Cherne |
| 2017/0258575 A1 | 9/2017 | Wortz et al. |
| 2017/0319332 A1 | 11/2017 | Kahook et al. |
| 2017/0348095 A1 | 12/2017 | Wortz et al. |
| 2018/0014928 A1 | 1/2018 | Kahook et al. |
| 2018/0110613 A1 | 4/2018 | Wortz et al. |
| 2018/0263757 A1 | 9/2018 | Wanders |
| 2018/0271642 A1 | 9/2018 | Wortz et al. |
| 2018/0338825 A1 | 11/2018 | Aharoni |
| 2019/0015197 A1 | 1/2019 | Wortz et al. |
| 2019/0076236 A1 | 3/2019 | Scharioth et al. |
| 2019/0076239 A1 | 3/2019 | Wortz et al. |
| 2019/0083235 A1 | 3/2019 | Wortz |
| 2019/0091009 A1 | 3/2019 | Collins et al. |
| 2019/0125944 A1* | 5/2019 | Wiley ............... A61F 9/00736 |
| 2019/0133754 A1 | 5/2019 | Dalvi |
| 2019/0151079 A1 | 5/2019 | Zaldivar |
| 2019/0223998 A1 | 7/2019 | de Juan, Jr. et al. |
| 2019/0254809 A1 | 8/2019 | Dworschak et al. |
| 2019/0269500 A1 | 9/2019 | de Juan, Jr. et al. |
| 2019/0343621 A1 | 11/2019 | Wortz et al. |
| 2019/0380828 A1 | 12/2019 | Wortz |
| 2020/0000575 A1* | 1/2020 | Kojima ............... A61F 2/1694 |
| 2020/0022840 A1 | 1/2020 | Kahook et al. |
| 2020/0121446 A1 | 4/2020 | Cady |
| 2020/0253721 A1 | 8/2020 | Cuevas et al. |
| 2020/0323626 A1 | 10/2020 | Akinay et al. |
| 2021/0315687 A1* | 10/2021 | Brodie ............... A61F 2/16 |
| 2021/0338416 A1 | 11/2021 | Clarke et al. |
| 2021/0338417 A1 | 11/2021 | Clarke et al. |
| 2021/0353406 A1 | 11/2021 | Brodie et al. |
| 2022/0000605 A1 | 1/2022 | Clarke et al. |
| 2022/0079744 A1 | 3/2022 | Arrieta |
| 2022/0362010 A1 | 11/2022 | Akura |
| 2023/0031555 A1 | 2/2023 | Wortz et al. |

(56) References Cited

U.S. PATENT DOCUMENTS

| | | | |
|---|---|---|---|
| 2023/0127407 | A1 | 4/2023 | So |
| 2024/0058115 | A1 | 2/2024 | Kim et al. |

FOREIGN PATENT DOCUMENTS

| | | | |
|---|---|---|---|
| CN | 101031257 | A | 9/2007 |
| CN | 102090942 | A | 6/2011 |
| CN | 102090946 | A | 6/2011 |
| CN | 204698755 | U | 10/2015 |
| CN | 110811924 | A | 2/2020 |
| DE | 20 2016 105 208 | U1 | 11/2016 |
| DE | 10 2019 115 408 | B3 | 9/2020 |
| EP | 0 106 488 | A1 | 4/1984 |
| EP | 0 346 245 | A1 | 12/1989 |
| EP | 0 089 335 | B2 | 3/1993 |
| EP | 0 931 521 | A1 | 7/1999 |
| EP | 1 138 282 | A1 | 10/2001 |
| EP | 1 341 485 | B1 | 11/2006 |
| EP | 2422746 | A1 | 2/2012 |
| EP | 3 061 420 | A1 | 8/2016 |
| EP | 3 158 974 | A1 | 4/2017 |
| EP | 2 117 465 | B1 | 7/2017 |
| EP | 3 171 821 | B1 | 3/2020 |
| EP | 3700466 | A1 | 9/2020 |
| FR | 2997624 | A1 | 5/2014 |
| FR | 3 033 694 | A1 | 9/2016 |
| GB | 124500 | A | 4/1919 |
| IT | 102014902224032 | A1 | 7/2015 |
| JP | 2006-525824 | A | 11/2006 |
| JP | 4892156 | B2 | 3/2012 |
| JP | 2013123616 | A | 6/2013 |
| JP | 5383782 | B2 | 1/2014 |
| JP | 2014090772 | A | 5/2014 |
| JP | 2015-223341 | A | 12/2015 |
| JP | 2019-063534 | A | 4/2019 |
| KR | 20030051903 | A | 6/2003 |
| KR | 10-2011-0075018 | A | 7/2011 |
| KR | 10-1555298 | B1 | 9/2015 |
| RU | 86462 | U1 | 9/2009 |
| RU | 2367380 | C2 | 9/2009 |
| RU | 2440076 | C1 | 1/2012 |
| WO | WO-99/56670 | A1 | 11/1999 |
| WO | WO-00/30566 | A1 | 6/2000 |
| WO | WO-2006/103674 | A2 | 10/2006 |
| WO | WO-2007/005893 | A2 | 1/2007 |
| WO | WO-2008/077795 | A2 | 7/2008 |
| WO | WO-2008/108525 | A1 | 9/2008 |
| WO | WO-2010/091420 | A1 | 8/2010 |
| WO | WO-2011/101310 | A1 | 8/2011 |
| WO | WO-2013/112589 | A1 | 8/2013 |
| WO | WO-2014/197170 | A1 | 12/2014 |
| WO | WO-2015/026226 | A1 | 2/2015 |
| WO | WO-2016/071755 | A1 | 5/2016 |
| WO | WO-2016/159910 | A1 | 10/2016 |
| WO | WO-2016/182520 | A1 | 11/2016 |
| WO | WO-2017/212352 | A1 | 12/2017 |
| WO | WO-2019/050925 | A1 | 3/2019 |
| WO | WO-2019/094768 | A1 | 5/2019 |
| WO | WO-2019/097099 | A1 | 5/2019 |
| WO | WO-2019/106011 | A1 | 6/2019 |
| WO | WO-2019/235912 | A1 | 12/2019 |
| WO | WO-2020/086312 | A1 | 4/2020 |
| WO | WO-2020/086631 | A1 | 4/2020 |
| WO | WO-2020/086312 | A8 | 7/2020 |

OTHER PUBLICATIONS

Can, E. (2018). "Flapless and sutureless intrascleral fixation of posterior chamber intraocular lens for correction of aphakia." Journal of Cataract and Refractive Surgery, 44(8), 929-931.
Entokey. (Nov. 21, 2017). Intraocular Lens Implantation in the Capsular Bag and Posterior Capsulotomy Techniques. Retrieved Sep. 16, 2024, from https://entokey.com/intraocular-lens-implantation-in-the-capsular-bag-and-posterior-capsulotomy-techniques/ 4 pages.
Gabor, S.G. et al. (2007). "Sutureless intrascleral posterior chamber intraocular lens fixation." Journal of Cataract and Refractive Surgery, 33(11), 1851-1854.
Hu, Z. X. et al. (2018). "Sutureless Intrascleral Haptic-Hook Lens Implantation Using 25-Gauge Trocars." Journal of Ophthalmology, 2018, 9250425. 5 pages.
Omega Ophthalmics. (n.d.) The Gemini Refractive Capsule™ Revolutionary, Not Evolutionary. 1 page. https://www.omegaophthalmics.com/video/.
Schaaf, Tracy. (Oct. 23, 2018). 'In MedTech History'—Ophthalmic Implants—Part 2. MyStrategist. 3 pages. https://www.mystrategist.com/blog/article/ophthalmic-part-2.
Carlevale Lens (Carlo Carlevale) by Soleko, "Scleral Suturefree IOL—Product Description." Alyko Medical, www.alykomedical.com/en-GB/products/implants/scleral-sutureless-iol-34097888. Accessed Oct. 29, 2020. 1 page.
Carlevale, C., et al. (Nov. 15, 2018), "New IOL dedicated for scleral fixation," Ocular Surgery News. Web. Nov. 2, 2020. 4 pages. https://www.healio.com/news/ophthalmology/20181113/new-iol-dedicated-for-scleral-fixation?M_BT=3592487855654.
U.S. Appl. No. 16/988,519, filed Aug. 7, 2020, US 20210338416.
U.S. Appl. No. 17/190,169, filed Mar. 2, 2021, US 20210338417.
U.S. Appl. No. 17/284,561, filed Apr. 12, 2021, US 20210353406.
U.S. Appl. No. 17/284,578, filed Apr. 12, 2021, US 20210315687.
U.S. Appl. No. 17/396,048, filed Aug. 6, 2021, US 20220000605.
PCT/US21/29605, filed Apr. 28, 2021, WO 2021/222383.
PCT/US21/45015, filed Aug. 6, 2021, WO 2022/032143.
PCT/US22/12557, filed Jan. 14, 2022, WO 2022/155491.
U.S. Appl. No. 18/369,693, filed Sep. 18, 2023, US 20240074846.
U.S. Appl. No. 18/369,694, filed Sep. 18, 2023, US 20240074847.
U.S. Appl. No. 18/485,214, filed Oct. 11, 2023, US 20240033072.
U.S. Appl. No. 18/511,340, filed Nov. 16, 2023, US 20240180691.
U.S. Appl. No. 18/485,218, filed Oct. 11, 2023, US 20240033073.
PCT/US2023/79993, Nov. 16, 2023, WO 2024/107942.
PCT/US21/29605, Apr. 28, 2021, WO 2021/222383.
PCT/US21/45015, Aug. 6, 2021, WO 2022/032143.

\* cited by examiner

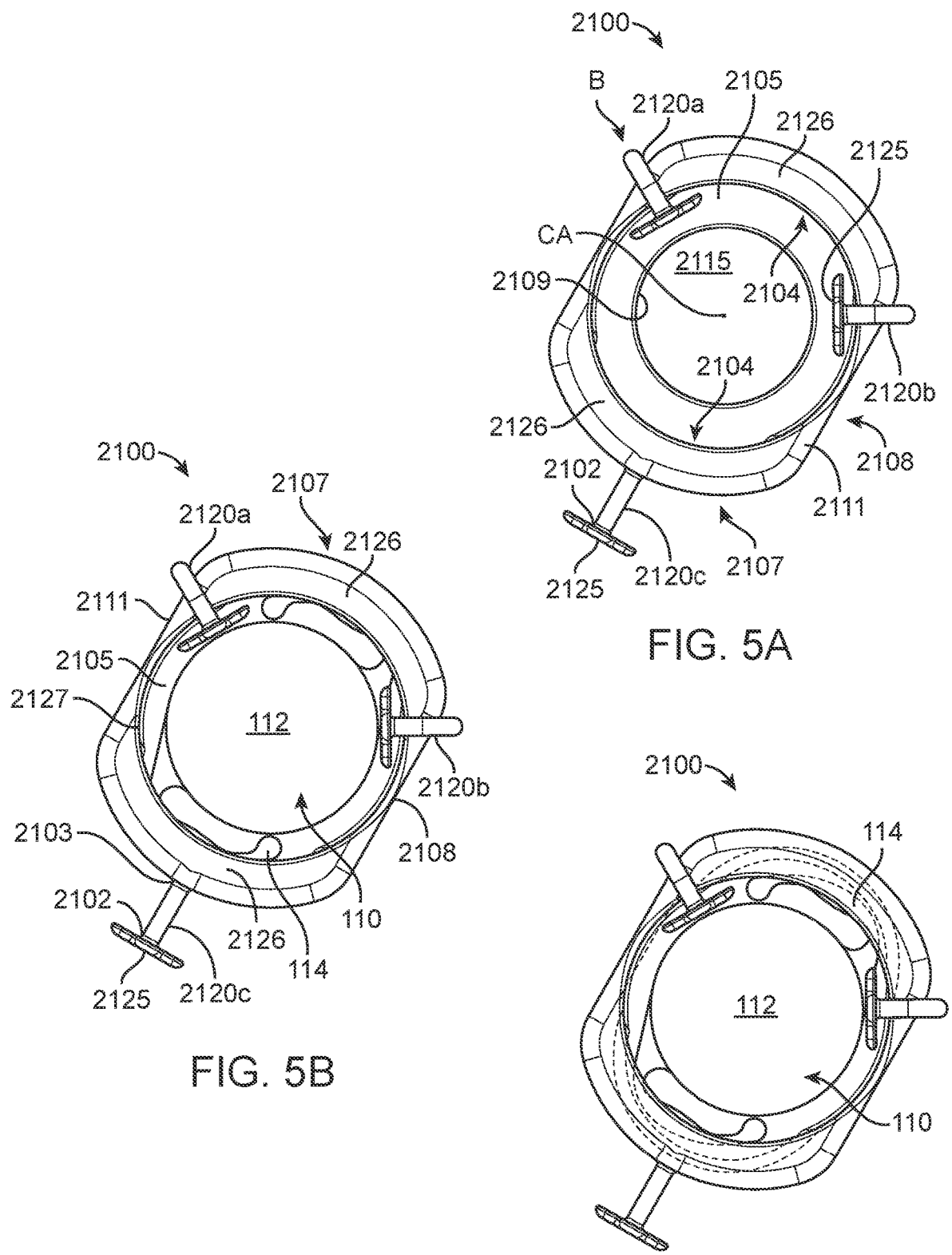

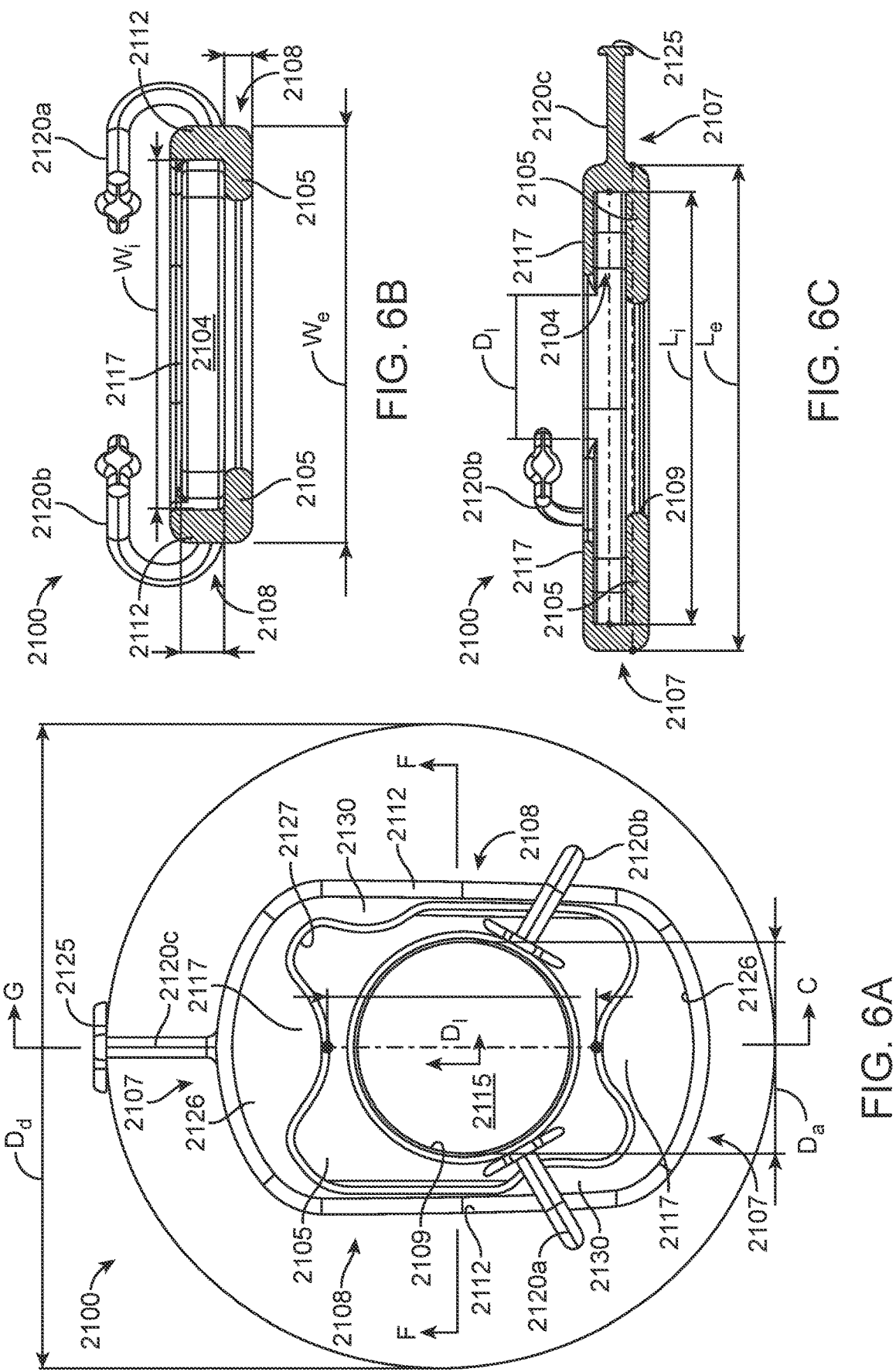

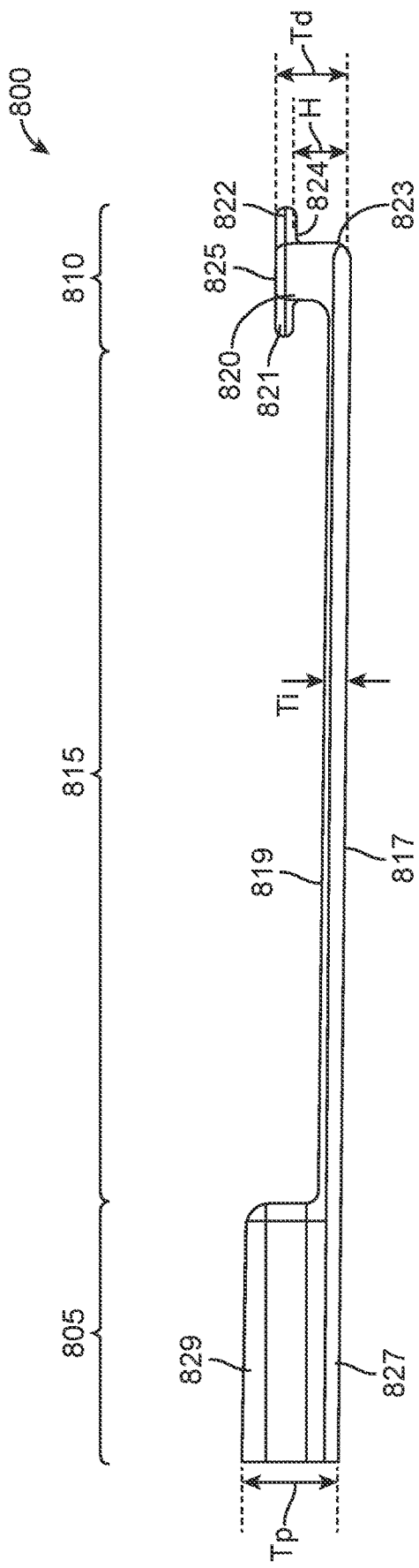
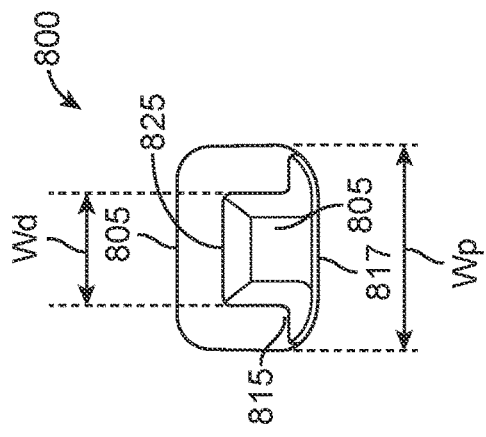
FIG. 11A
FIG. 11B

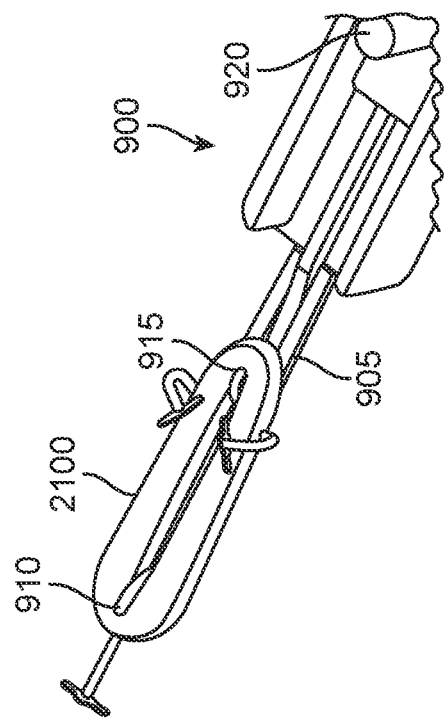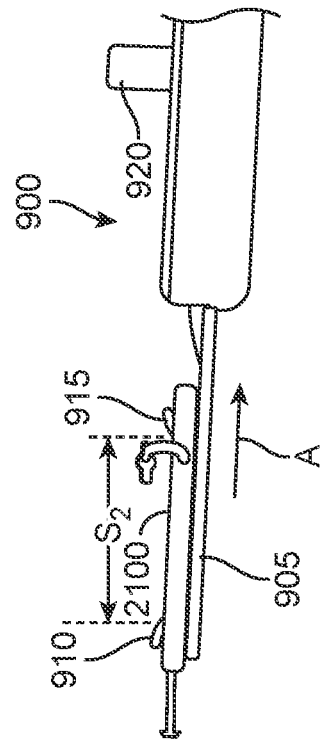
FIG. 15A
FIG. 15B
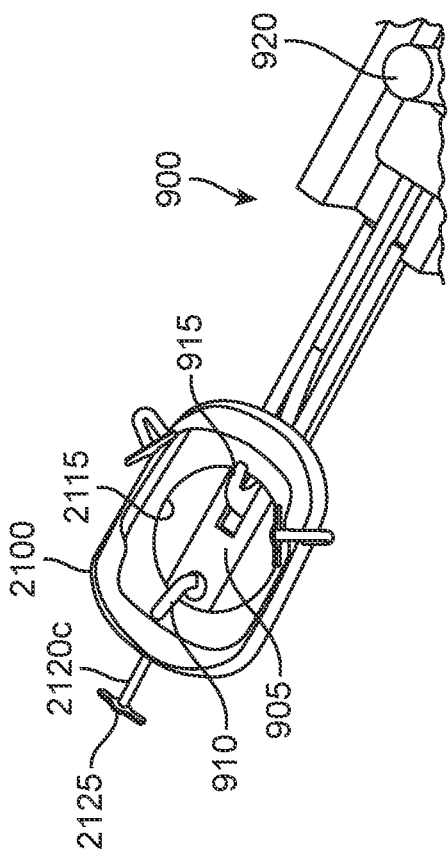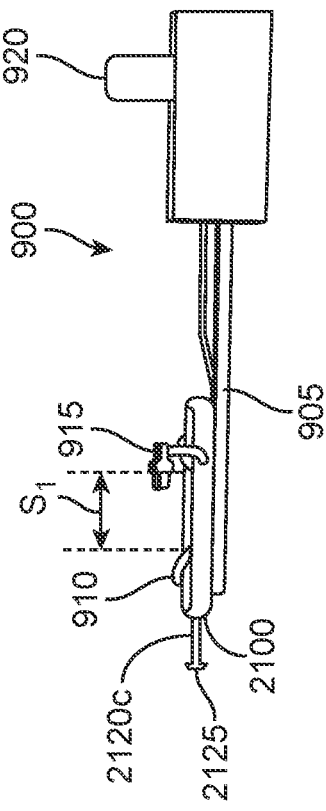
FIG. 15C
FIG. 15D

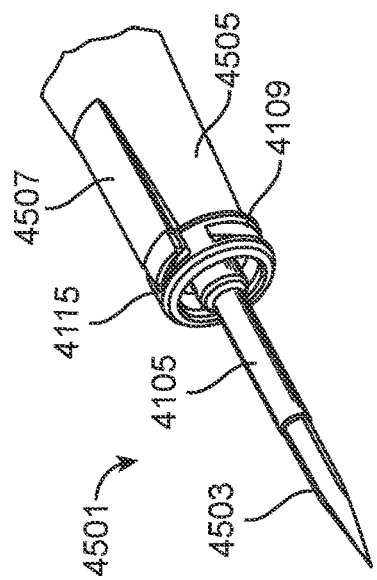
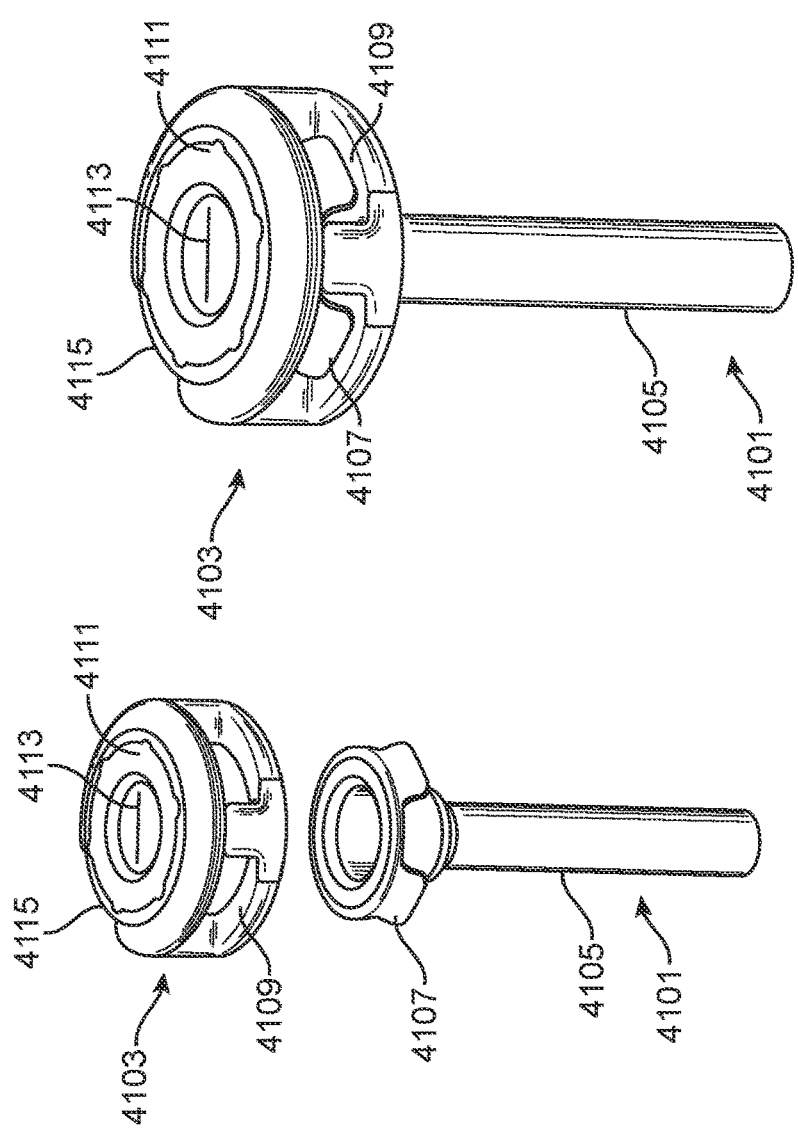
FIG. 17C
FIG. 17B
FIG. 17A

DELIVERY DEVICES FOR IMPLANTATION OF INTRAOCULAR LENS SUPPORT DEVICES AND METHODS OF USE

CROSS-REFERENCE TO RELATED APPLICATIONS

This application claims the benefit of priority under 35 U.S.C. § 119(e) to co-pending U.S. Provisional Patent Application Ser. Nos. 63/137,663, filed Jan. 14, 2021, 63/239,134, filed Aug. 31, 2021, and 63/183,488, filed May 3, 2021. The disclosures of the provisional applications are incorporated by reference in their entireties.

This application is also a continuation-in-part of co-pending U.S. application Ser. No. 16/988,519, filed Aug. 7, 2020, which claims the benefit of priority under 35 U.S.C. § 119(e) to U.S. Provisional Patent Application Ser. No. 63/017,423, filed Apr. 29, 2020; and 63/053,450, filed Jul. 17, 2020. The disclosures of these applications are incorporated by reference in their entireties.

This application is also a continuation-in-art of co-pending U.S. application Ser. No. 17/396,048, filed Aug. 6, 2021, which claims the benefit of priority under 35 U.S.C. § 119(e) to Provisional Application Ser. Nos. 63/063,110, filed Aug. 7, 2020; 63/089,241, filed Oct. 8, 2020; 63/129,448 filed Dec. 22, 2020; and co-pending application Ser. No. 63/183,488, filed May 3, 2021. The disclosures of these applications are incorporated by reference in their entireties.

BACKGROUND

The present disclosure relates generally to the field of ophthalmics, more particularly to delivery devices for implantation of ophthalmic devices for supporting and positioning intraocular lenses in the eye.

Implantation of an intraocular lens (IOL) requires support within the eye to hold it in the correct position. Normally, this is achieved through the native capsular bag suspended by the zonules (fine, thread-like structures). However, these support structures can be compromised either due to intrinsic factors such as pseudoexfoliation, Marfan, or Weill-Marchesani syndromes, or extrinsic factors such as trauma. Additionally, lens support can be compromised iatrogenically either during the time of surgery (either anterior or posterior segment surgery) or as a late complication of previous surgery, for example by capsular phimosis.

The management of secondary IOL placement in the absence of sufficient capsular or zonular support continues to evolve. Currently the only FDA approved solution is placement of an anterior chamber IOL (ACIOL). The ACIOL is a larger lens with the ability to sit anterior to the iris, however over time these lenses can cause Uveitis-Glaucoma-Hyphema (UGH) syndrome as well as endothelial cell loss and corneal decompensation, and as a result are contraindicated in many patients. Modified capsule tension rings (Cionni or Ahmed) can be used off-label to provide sutured scleral support to a partially weakened capsule. However, in cases of substantial capsule or zonular compromise the lens must be secured without use of these native supporting structures. Other off-label techniques can be employed, such as iris suturing IOL, but this is technically difficult and can lead to iris pigment loss causing glaucoma. Lastly, scleral suturing IOLs with islets is technically complex, risks rotation, and the durability of the sutures is unknown; there are reported cases of breakage and lens subluxation. Additionally, all of these techniques force the surgeon to use an alternative lens type, instead of their preferred lens for the patient. Lastly, the decision of timing is critical, as frequently lens calculations are inadequate during the initial vitrectomy/lensectomy yet there is the desire to not subject the patient to additional posterior segment surgery, so non-ideal lenses are frequently implanted.

SUMMARY

In an aspect, described is an insertion tool for delivering an implantable lens support device into an eye. The insertion tool includes a proximal end region; a distal end region having a distal hook; and an intermediate region connecting the distal end region to the proximal end region. The intermediate region is substantially planar. The distal end region and the intermediate region are sized for insertion through a clear corneal incision.

The intermediate region can include a lower surface and an upper surface and is designed to transmit a force against the lens support device. The upper surface of the intermediate region can support within a Z-plane the lens support device being implanted preventing the lens support device from drifting posteriorly within the eye during implantation. A lower surface of the proximal end region, a lower surface of the intermediate region, and a lower surface of the distal end region can be continuous with one another forming a uniform lower surface for the insertion tool from the proximal end region to the distal end region of the insertion tool. At least a first portion of the distal hook can project proximally out over an upper surface of the intermediate region and at least a second portion of the distal hook can form a distal-most end of the insertion tool. The distal hook can be sized to insert though a distal opening of an IOL injector sized for insertion through the clear corneal incision. The proximal end region can be sized to pass through the distal opening of the IOL injector. The distal hook can have a height between about 0.1 mm and about 1.0 mm and a width between about 0.1 mm and about 3.0 mm. The proximal end region can have a height between a lower surface and an upper surface that is between about 0.5 mm and about 2.5 mm. The proximal end region can have a width that is between about 0.5 mm and about 3.0 mm.

A system including the insertion tool can further include a lens support device configured for implantation in the eye to support an intraocular lens (TOL). The lens support device can include a support structure and an awning. The support structure includes an anterior-facing surface; a posterior-facing surface; and a central aperture extending through a full thickness of the support structure between the anterior-facing surface and the posterior-facing surface. The central aperture has a first perimeter forming a closed, substantially circular shape centered on a central axis of the support structure. The awning positioned over the anterior-facing surface of the support structure can form a recess for accepting a haptic of the IOL. The distal hook can insert under the awning and a distal-most end of the insertion tool abut against an internal wall of the recess. The lens support device can further include three fixation arms coupled to the support structure and configured to be placed under tension to locate and stabilize the lens support device within the eye. Each of the three fixation arms can be coupled to a trans-scleral anchor for sutureless scleral fixation of the device within the eye. One of the three fixation arms can be a leading fixation arm and a remaining two of the three fixation arms can be trailing fixation arms. The distal-most end of the insertion tool can abut against the internal wall of the recess near a location of the leading fixation arm. The intermediate region of the insertion tool can extend through the central aperture such that an upper surface of the intermediate region contacts the posterior-facing surface of the support structure and a lower surface of the intermediate region contacts the anterior-facing surface of the support structure. The upper surface of the intermediate region can contact the posterior-facing surface of the support structure between the trailing fixation arms.

The insertion tool supporting the lens support device can be deliverable through an internal channel of an IOL injector sized for clear corneal incision insertions. The lens support device can have a resting width compressible to a narrowed width by the internal channel of the IOL injector. The lens support device can have a length that increases upon being compressed to the narrowed width by the internal channel of the IOL injector. The intermediate region of the insertion tool has a length sized to receive the length of the lens support device during delivery through the internal channel of the IOL injector. Each of the three fixation arms can include an origin portion coupled to the support structure and a terminal portion having the trans-scleral anchor. The trailing fixation arms, at rest, can be biased towards a folded configuration wherein a bend exists between the origin portion and the terminal portion. The leading fixation arm, at rest, can be biased to be substantially straight between the origin portion and the terminal portion. The trailing fixation arms in the folded configuration can be urged closer together during distal movement through the internal channel of the IOL injector. The insertion tool and/or the internal channel of the IOL injector can include one or more features that engage at least a portion of the trailing fixation arms. The intermediate region of the insertion tool can include at least a first cut-out configured to receive at least a portion of a trailing fixation arm. The cut-out can have an L-shape having a first portion and a second portion. The first portion can have a larger dimension than the second portion so as to releasably fix the trailing fixation arm within the first cut-out. The insertion tool can be prevented from rotating within the internal channel around a longitudinal axis of the internal channel of the IOL injector.

The insertion tool further can include a proximal hook, each of the distal hook and proximal hook projecting upwards from a sled of the distal end region. The distal hook can have a distally-facing surface arranged to bear against an inner surface on an end of the lens support device near the leading fixation arm. The proximal hook can have a proximally-facing surface arranged to bear against an inner surface on an end of the lens support device away from the leading fixation arm. At least one of the distal hook and the proximal hook can be movable between a first configuration where the distal hook and the proximal hook are nearer to one another compared to a second configuration where the distal hook and the proximal hook are farther away from one another. The insertion tool can further include an actuator configured to urge the distal hook distally away from the proximal hook or retract the proximal hook proximally away from the distal hook or both. The actuator can further include a spring to aid in controlling motion from the first configuration towards the second configuration and/or from the second configuration towards the first configuration.

In an interrelated aspect, provided is an insertion tool for delivering an implantable lens support device into an eye that includes a proximal end region having an actuator; and a distal end region having sled with a distal hook and a proximal hook. The distal end region is sized for insertion through a clear corneal incision. The proximal end region is sized to remain outside the eye. At least one of the distal hook and the proximal hook is movable by the actuator between a first configuration where the distal hook and the proximal hook are nearer to one another compared to a second configuration where the distal hook and the proximal hook are farther away from one another. The sled can provide posterior support in a Z-plane to prevent the lens support device from falling posteriorly within the eye during implantation.

In an interrelated aspect, provided is a method of inserting into an eye an ophthalmic device for supporting an artificial intraocular lens including positioning the ophthalmic device on an insertion tool having a proximal end region, a distal end region having a distal hook, and an intermediate region connecting the distal end region to the proximal end region. The intermediate region is a generally planar elongate segment. The distal hook of the distal end region together with the intermediate region is configured to be inserted into the eye to manipulate the ophthalmic device during implantation. The method includes penetrating the eye with a distal end region of an intraocular lens injector, the injector having an internal channel having a distal opening sized to receive the distal end region and the intermediate region of the insertion tool; advancing at least a portion of the insertion tool supporting the ophthalmic device through the internal channel of the injector and out the distal opening into the eye; and inserting the ophthalmic device into a position behind an iris of the eye.

The internal channel of the injector can be tapered from a proximal opening into the internal channel towards the distal opening. The method can further include loading the ophthalmic device positioned on the insertion tool into the internal channel from the proximal opening. The method can further include compressing the ophthalmic device as the insertion device is advanced towards the distal opening to a narrower width and to a greater length. The ophthalmic device can include a support structure having an anterior-facing surface; a posterior-facing surface; and a central aperture extending through a full thickness of the support structure between the anterior-facing surface and the posterior-facing surface, the central aperture having a first perimeter forming a closed, substantially circular shape centered on a central axis of the support structure; and three fixation arms coupled to the support structure and configured to be placed under tension to locate and stabilize the lens support device within the eye, each of the three fixation arms coupled to a trans-scleral anchor for sutureless scleral fixation of the device within the eye. One of the three fixation arms is a leading fixation arm and a remaining two of the three fixation arms are trailing fixation arms. The method can further include grasping from within the eye at least a portion of the leading fixation arm extending outside the distal opening and withdrawing the anchor through the sclera of the eye to secure the anchor against an external surface of the sclera. The method can further include externalizing the anchor of each of the trailing fixation arms to secure the anchor against an external surface of the sclera.

In an interrelated aspect, provided is a method of inserting into an eye an ophthalmic device for supporting an artificial intraocular lens including positioning the ophthalmic device within an insertion tool; penetrating the eye with a distal end region of the insertion tool; advancing at least a portion of the insertion tool into a position behind an iris of the eye; injecting at least a portion of the ophthalmic device from the insertion tool; and manipulating the at least a portion of the ophthalmic device via a hubbed cannula. The hubbed cannula includes a shaft having a proximal end and a distal end; and an overcap coupled to the proximal end of the shaft. The proximal end of the shaft remains outside a sclera of the eye and the distal end of the shaft extends within the vitreous of the eye.

The ophthalmic device can include a support structure having an anterior-facing surface; a posterior-facing surface; and a central aperture extending through a full thickness of the support structure between the anterior-facing surface and the posterior-facing surface, the central aperture having a first perimeter forming a closed, substantially circular shape centered on a central axis of the support structure; and one or more fixation arms coupled to the support structure and configured to be placed under tension to locate and stabilize the ophthalmic device within the eye, each of the fixation arms coupled to a trans-scleral anchor for sutureless scleral fixation of the device within the eye. The one or more fixation arms can include a leading fixation arm and two trailing fixation arms. The method can further include externalizing the trans-scleral anchor of each of the leading and trailing fixation arms via three hubbed cannulae. The method can further include inserting the distal end of the shaft through the sclera into the vitreous of the eye up to the overcap positioned external to the sclera. The hubbed cannulae can prevent contact between tools used during externalizing the anchors and the sclera. The overcap can further include a valve configured to seal the proximal end of the shaft. The three hubbed cannulae can be inserted through a corresponding three sclerotomy sites. The sclerotomy sites can include sites posterior to the limbus and anterior to the ora serrota. The sclerotomy sites can be approximately 120 degrees from one another.

The method can further include mobilizing and displacing the conjunctiva prior to forming the sclerotomy sites. The shaft may be no larger than 23G. The method can further include inserting one or more vitrectomy tools through one or more of the three hubbed cannulae. The method can further include grasping the leading fixation arm from within the eye through one cannula of the three hubbed cannulae. The method can further include externalizing an anchor of the leading fixation arm through the sclera via the one cannula. Externalizing the anchor of the leading fixation arm through the sclera can include withdrawing the anchor relative to the one cannula until the anchor is withdrawn from the sclera and elevating the one cannula so as to withdraw the distal end of the cannula from the sclera. The method can further include externalizing each anchor of the trailing fixation arms through the sclera via at least one other cannula of the three hubbed cannulae. The method can further include inserting the IOL into the ophthalmic device anchored relative to the sclera. Advancing at least a portion of the insertion tool can include inserting the insertion tool supporting the ophthalmic device through a corneal incision. The corneal incision can be at a location between two of the three hubbed cannulae. The insertion tool can be an IOL injector. The insertion tool can include a proximal end region; a distal end region; and an intermediate region connecting the distal end region to the proximal end region. The intermediate region can be a generally planar elongate segment and the distal end region can include a distal hook that together with the intermediate region is configured to be inserted into the eye to manipulate the ophthalmic device during implantation.

In some variations, one or more of the following can optionally be included in any feasible combination in the above methods, apparatus, devices, and systems. More details are set forth in the accompanying drawings and the description below. Other features and advantages will be apparent from the description and drawings.

BRIEF DESCRIPTION OF THE DRAWINGS

These and other aspects will now be described in detail with reference to the following drawings. Generally speaking the figures are not to scale in absolute terms or comparatively but are intended to be illustrative. Also, relative placement of features and elements may be modified for the purpose of illustrative clarity.

FIGS. 5A-5C are top down views of another implementation of a device configured to accommodate an IOL;

FIG. 6A shows a top down view of an interrelated implementation of the device incorporating a plurality of trans-scleral fixation arms;

FIG. 6B shows a cross-sectional view of the device of FIG. 6A taken along line B-B;

FIG. 6C shows a cross-sectional view of the device of FIG. 6A taken along line C-C;

FIGS. 11A-11B illustrate side and end views, respectively, of an implementation of an insertion tool for delivering a lens support device;

FIGS. 15A-15B illustrate an interrelated implementation of an insertion tool engaged with a lens support device;

FIGS. 15C-15D illustrate the insertion tool placing the lens support device into an insertion configuration;

FIGS. 17A-17B is an implementation of a cannula for use with the devices described herein;

FIG. 17C is a view of the cannula of FIG. 17B installed on a trocar.

Figure 1:
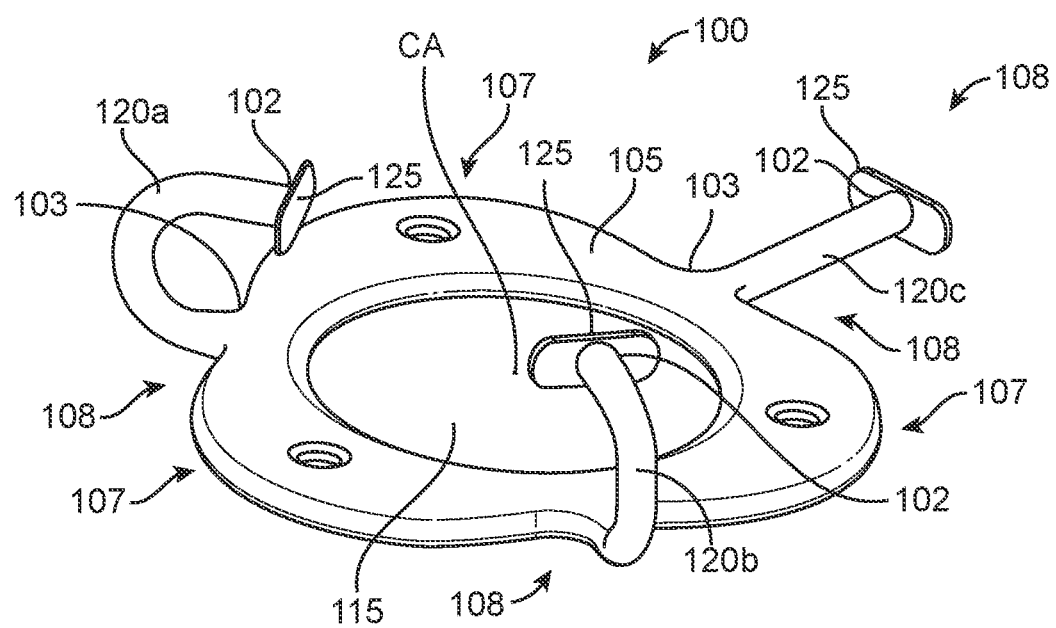
FIGS. 1 and 2 show perspective and top down views, respectively, of an implementation of a device for supporting an IOL in which two of the fixation arms are curved and inwardly biased toward a center of the device and one fixation arm is straight.

It should be appreciated that the drawings herein are for illustration only and are not meant to be to scale.

DETAILED DESCRIPTION

The present disclosure relates generally to the field of ophthalmics, more particularly to delivery of ophthalmic devices, including artificial support structures for supporting and positioning intraocular lenses (IOLs) or other ophthalmic implant in the eye, particularly when zonular and capsular support has been compromised.

The most common treatment for aphakia caused by removal of a cataractous lens is placement of an IOL within the native lenticular capsular bag. The capsular bag, which has an anterior component and a posterior component thus creating an inner chamber, is supported by zonules, thus providing a stable structure for IOL support. In some cases, the posterior aspect of the capsular bag is incompetent or ruptured during cataract surgery, necessitating a more reliable platform for positioning an IOL. If the anterior aspect of capsular bag and its associated zonules are intact, an IOL may be placed between the anterior capsule and the iris, a position referred to as the "sulcus." In another subset of cataract surgery cases, the anterior capsule is incompetent, or the zonules are incompetent, making sulcus placement unsafe or impossible. The devices described herein can be implanted into a posterior chamber of an eye that lacks an intact capsular bag. The devices described herein can create an artificial anterior capsule with artificial zonular fixation. The devices described herein can provide a stable platform structure fixated to the eye and thereby recapitulate the native anterior capsular and zonular apparatus allowing for placement of an IOL in the artificially constructed sulcus.

The devices described herein can solve problems of other support/positioning techniques known in the art. Anterior chamber intraocular lenses placed in front of the iris can cause corneal decompensation, glaucoma and bleeding over time due to their instability in the eye. Lenses sutured to the iris is technically difficult to implant and increases the risks of bleeding and glaucoma due to chafing of the iris. Lenses may also be sutured to the sclera, which is also technically difficult. In some cases, suture erosion/breakage requires additional surgery and risk potentially blinding infection.

The devices described herein can be implanted in a sutureless manner, which eliminates the risk of suture breakage. A sutureless trans-scleral fixation method allows for easier placement and secure attachment without concern for loosening or breaking of sutures. The devices described herein stably hold IOLs providing a reliable refractive result based on known position without concern. The devices also allow for posterior segment placement that greatly reduces risk of damage to iris, angle or cornea. Implantation posterior to iris and cornea eliminates or reduces risk of corneal injury, iris bleeding and glaucoma. The devices described herein reduce the risk of complications compared to current technologies such as ACIOL, Iris-sutured lens, or Scleral-sutured lens. The devices described herein are designed to accommodate and provide support to a wide variety of intraocular lenses. Thus, the lens of choice can be implanted at the time of surgery or at a later date. The devices described herein replicate a natural lens capsule and in some implementations are particularly suitable for implantation into a posterior chamber of an eye lacking an intact capsular bag. For example, the devices described herein can create an artificial anterior capsule with artificial zonular fixation providing a scaffold or stable platform structure and an artificially constructed sulcus where the anterior component of the capsular bag and/or zonules of the natural lens are incompetent. The fixation arms can be externalized as needed for scleral support/fixation. In interrelated aspects, the devices need not incorporate trans-scleral fixation arms and can be supported substantially by the anterior segment of the capsular bag, if present.

A variety of tools are known to position devices within the eye, such as injectors for implantation of intraocular lenses. IOL injectors typically include a cartridge for holding the IOL and a plunger to urge the IOL out of the cartridge and into the eye. The mechanism by which the IOL is loaded and deployed in the eye can vary. Disclosed herein are delivery devices that are compatible with any of a variety of IOL inserter systems to deploy the support devices described herein. The delivery devices described herein can be used to deploy any of the support devices described herein whether they incorporate fixation arms are not and whether they are substantially planar or include an internal recess for mating with the IOL being supported.

The lens support devices and their delivery devices will be described in more detail below.

IOL Support and Positioning Devices

FIGS. 1-4 show an implementation of an IOL support and positioning device 100. The device 100 can include a lens support structure or platform 105 upon, against, or within which an IOL can be supported, a central opening or aperture 115, and one or more fixation arms 120. The central aperture 115 prevents the device 100 from interfering with the patient's vision and is adapted to permit passage of light through the aperture 115 as well as the IOL 110 positioned on the device 100. The size of the central aperture 115 allows light to pass through the device without any optical disturbance. The light may pass through the device towards the retina and is affected only by the optics of the IOL. The one or more fixation arms 120 can locate and stabilize the device 100 within the eye. The lens support structure 105 can include an outer perimeter 111 and an inner perimeter 109 and the central aperture 115 can be bound by the inner perimeter 109. The lens support structure 105 can be generally ring-shaped although the outer perimeter 111 of the lens support structure 105 need not be circular as will be discussed in more detail below. The outer perimeter 111 of the lens support structure can be substantially non-circular where the inner perimeter 109 is substantially circular.

Figure 4:
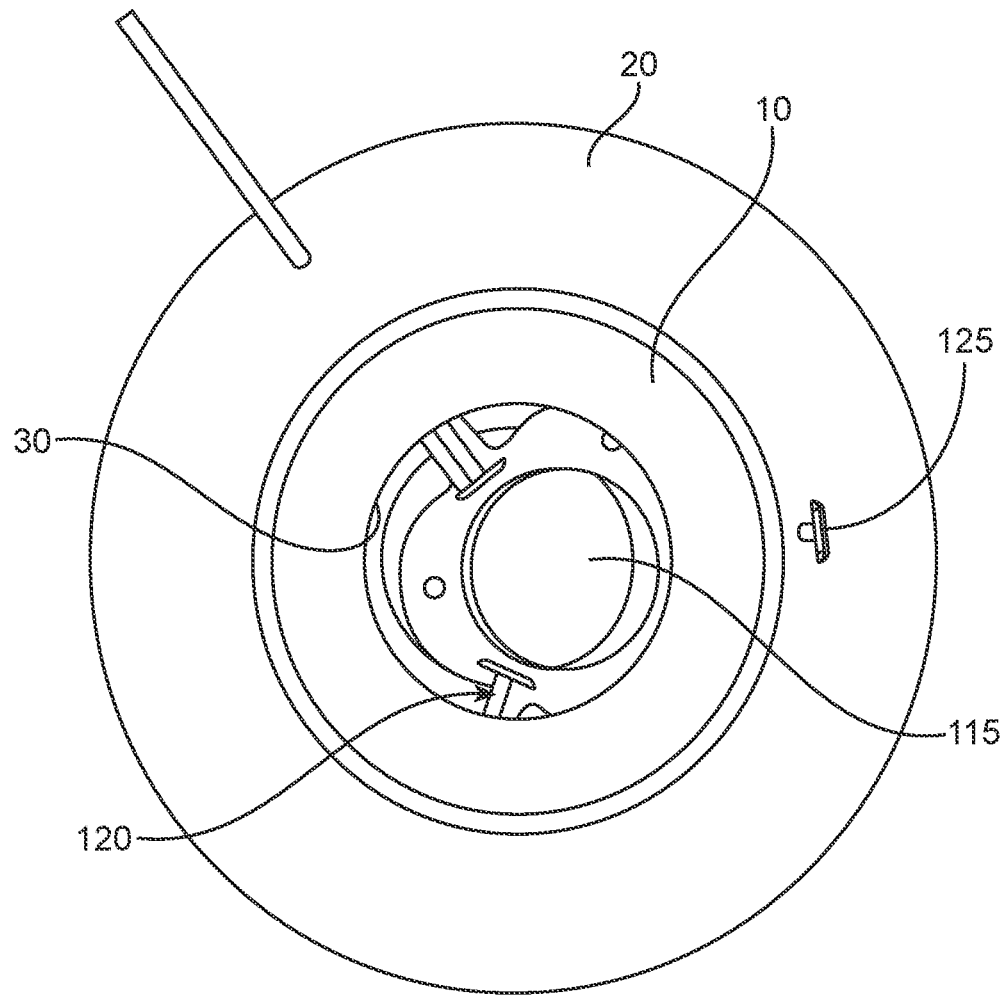
FIG. 4 shows a top down view of an eye having the device of FIG. 3 implanted.

FIG. 1 shows a top down view of the device 100 showing the lens support structure 105, the central aperture 115, and two fixation arms 120. The lens support structure 105 can serve as a support for the IOL during optimal implantation and as a guard against the IOL falling into the posterior segment during implantation. The lens support structure 105 can take the place of a native lenticular capsular bag, particularly where the anterior aspect and associated zonules are incompetent making sulcus placement of an IOL unsafe or impossible. Placement of the lens support structure 105 in a patient without a competent capsular bag can create an anterior capsule device. The fixation arms 120 can provide artificial zonular fixation stabilizing the lens support structure as a stable platform for placement of an intraocular lens within the artificially constructed sulcus. FIG. 4 also shows the iris 10, the sclera 20, and the pupil 30 defined centrally through the iris 10.

In some implementations, the support structure 105 can be substantially flat or planar. The support structure 105 can have an anterior-facing surface directed towards a front of the eye when the structure 105 is in use and a posterior-facing surface towards a back of the eye when the structure 105 is in use. The planar support structure 105 can act as a platform against which the IOL can be positioned. The planar anterior and posterior surfaces need not include any projections, channels, or capturing components to hold the IOL relative to it. For example, the support structure 105 can create an artificial anterior segment of the capsular bag for the IOL to be positioned against, but need not hold the IOL within an interior surface. Thus, the IOL can remain fully external to the support structure 105 during use and no projections, overhangs, or other surfaces positioned relative to the IOL aside from the substantially planar surfaces of the support structure 105. Thus, each of the anterior-facing and posterior-facing surfaces can be substantially smooth planar surfaces that are free of any projections or overhangs above the surfaces. Each of the anterior-facing and posterior-facing surfaces can also be free of any indentations, grooves, divots, or openings other than the central aperture 115 extending through it. The substantially flat support structure 105 can taper towards the central aperture 115. The tapered edge or inner wall 109 defining the aperture 115 has an anterior-to-posterior thickness that is less than an anterior-to-posterior thickness of the support structure away from the aperture 115.

In other implementations, the support structure 105 can incorporate one or more projections extending away from at least one of the anterior-facing surface and the posterior-facing surface.

In still other implementations, the support structure 105 can optionally or additionally include a recess in at least one of the anterior-facing or posterior-facing surfaces that is sized and shaped to receive the IOL (see FIGS. 5A-5C and others described in more detail below).

Figure 5D:
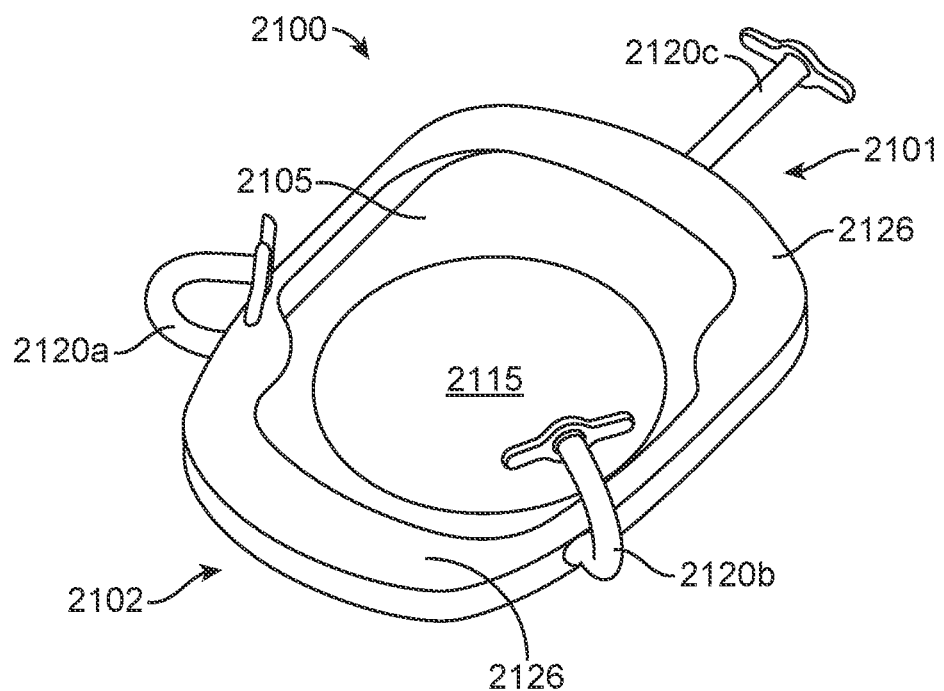
FIG. 5D shows an interrelated implementation of the device of FIGS. 5A-5C.

The recess can form a lip surrounding the central aperture 115 that is sized to engage with and support a perimeter of the optic of the IOL against the lip (see FIG. 5C). The recess in the central 6.0-7.0 mm part of the support structure 105 can limit the translational movement of the optic. The recess can additionally incorporate a concave, dished out section to increase the interfacial surface area of the IOL with the support structure 105. The recess can incorporate one or more features that additionally prevent rotational motion around the visual axis or the central axis CA of the device. FIGS. 5A-5D, 6A-6C, 7, 8A-8D, 9A-9B, and 10 illustrate additional implementations of a device incorporating a recess within which an IOL may be received and are described in more detail below.

Whether the support structure 105 is recessed or not and/or incorporates one or more projections from its surface or not, the anterior-to-posterior thickness of the support structure 105 is minimized to avoid impacting the iris 10.

The support structure 105 can include one or more surface features 118 in or on the anterior-facing surface and/or the posterior-facing surface. FIG. 1 shows the support structure 105 can include a surface feature 118 on the anterior-facing surface that can be used for positioning the device 100 during implantation. The surfaces features 118 can be engaged by forceps or other implantation tools to aid in manipulating the device 100 during implantation.

The central aperture 115 can extend through the full thickness of the support structure 105 from the anterior-facing surface through to the posterior-facing surface such that the support structure 105 additionally includes an inner wall 109 having an inner perimeter surface defining the central aperture 115 and an outer wall 111 having an outer perimeter surface defining the overall shape of the support structure 105. This can provide a substantially annular shape to the lens support structure 105. However, the annular lens support structure 105 need not be circular on both its inner and outer perimeter surfaces. The inner perimeter surface can have a circumference and form a uniform, substantially circular shape whereas the outer perimeter surface can form a substantially non-circular shape. As will be discussed in more detail below, the non-circular shape of the outer perimeter surface comprises a plurality of lobes 107 projecting outward from a plurality of sides 108. The plurality of lobes 107 can project radially away from the central aperture 115. The plurality of sides 108 can be substantially flat or concave as described elsewhere herein. In some implementations, the device includes at least three fixation arms 120 coupled to the lens support structure 105 that are configured to be placed under tension to locate and stabilize the device within the eye. Each of the three fixation arms 120 can extend outward from a respective one of the plurality of sides 108. The lens support structure 105, thus, can have a width between the outer perimeter surface and the inner perimeter surface that varies around the circumference. The central aperture 115 is designed to allow for vision through the device. In some implementations, the support structure 105 is substantially flat and the IOL sits on the anterior-facing surface (or posterior-facing surface) of the support structure 105, but is not held or contained by the central aperture 115. In other implementations, the support structure 105 is generally planar, but includes a recess surrounding the central aperture 115 such that the IOL sitting on the anterior-facing surface of the support structure 105 engages a lip formed by the recess. The support structure (and thus, the central aperture 115) can have a thickness anterior-to-posterior that is minimized. The thickness of the support structure 105 between the anterior-facing surface and the posterior-facing surface can be between about 0.15 mm and 1.5 mm, or between about 0.5 mm and 1.0 mm. The thickness of the support structure 105 can be thinner than 0.15 mm and still provide sufficient support for an IOL, for example, due to the fixation arms 120 being under tension. The inner perimeter surface or inner wall 109 defining the central aperture 115 can be smooth and free of any concavity, groove, channel, or other surface feature. In some implementations, the inner perimeter surface or inner wall 109 is convex and projects towards a central axis CA of the device and the outer perimeter surface or outer wall 111 is also convex and projects away from the central axis CA of the device. The convex inner and outer perimeter surfaces formed by the inner and outer walls 109, 111 can create a cross-sectional shape to the support structure 105 when taken across a center of the central aperture 115 that forms a pair of rounded rods. In some implementations, the anterior-facing surface and the posterior-facing surface each taper towards the central aperture 115 such that the inner perimeter surface of the inner wall 109 is shaped as a single narrow ridge or point projecting towards the central axis CA of the device.

The central aperture 115 can also be the only aperture extending through the support 105 such that the support 105 has only a single aperture extending through its full thickness. The inner diameter of the aperture 115 is designed to be generally universal for a wide range of IOL types. The aperture 115 is sized so the support 105 avoids overlapping substantially with the optic of the IOL. Conventional IOLs typically have optics with an outer diameter of 6 mm although this size can vary depending on the IOL. A device having a central aperture 115 inner diameter that is less than 5.0 mm down to about 4.0 mm can be used with some IOLs. A device having a central aperture 115 inner diameter that is between 5.0 mm to about 6.0 mm can be used with most IOLs such that the device is nearly universal for use with any conventional haptic-stabilized IOL. The minimum inner diameter of the aperture 115 can be greater than about 4.0 mm, greater than about 4.5 mm, greater than about 5.0 mm, greater than about 5.5 mm, greater than about 6.0 mm, greater than about 6.5 mm, up to about 7.0 mm, up to about 8.0 mm, up to about 9.0 mm, up to about 10 mm and any range in between.

One or more of the fixation arms 120 can be substantially straight between their origin with the support structure 105 and their terminal ends. The straight fixation arm, which can be the leading fixation arm 120c from the perspective of direction of implantation into an eye, can extend along a single longitudinal axis between the origin 103 and terminal end 102 without any bends or curves away from the single longitudinal axis. The straight fixation arm(s) 120c can extend orthogonal to the outer perimeter surface of the support structure 105 outer wall 111. The longitudinal axis of the straight fixation arm(s) 120c can be positioned orthogonal to the outer perimeter surface of the outer wall 111. The plane of the anterior-facing surface of the support structure 105 and the longitudinal axis of the straight fixation arm(s) 120c can be parallel to one another as can the plane of the posterior-facing surface of the support structure and the longitudinal axis.

The one or more fixation arms 120 can be trans-scleral fixation arms that are designed to be atraumatically externalized and held in place by its geometry and mechanical properties alone, i.e. not requiring sutures or glue. The externalized portion or anchor 125 (also referred to herein as an anchoring footplate or footplate) at a peripheral end (also referred to herein as a terminal end or a terminal portion) of the fixation arm 120 can sit sub-conjunctivally to anchor the arm 120 in position. The anchor 125 of the fixation arm 120 can have a sturdy, but low profile geometry so as to remain stable and not re-enter the eye and minimally erode the conjunctiva. Additionally, the fixation arms 120 of the device 100 may be manufactured in a way so as to facilitate easy visualization and manipulation of the device prior to surgery. At least one of the fixation arms 120 may be manufactured to have a geometry that is substantially non-planar at rest and then be manipulated into a planar configuration during the implantation procedure and, for example, when placed under tension.

The device 100 can include one, two, three, or more fixation arms 120. In a preferred implementation, the device 100 includes three fixation arms 120 that are arranged symmetrically or equidistant around the perimeter of the support structure 105. The fixation arms 120 can center the lens support structure 105 and provide sufficient support for long-term stability. In some implementations, that may be accomplished by a single fixation arm 120. In other implementations, the one or more fixation arms includes three fixation arms 120 symmetrically arranged around a perimeter of the lens support structure. The fixation arm 120 can be constructed from a semi-rigid material or may have a geometry that provides sufficient structural rigidity.

The device 100 can also include just two fixation arms 120. These fixation arms 120 may be under equal and opposite tension when implanted and anchored trans-sclerally. Alternatively, the fixation arms 120 may be asymmetric such that one fixation arm 120 is under tension and the other fixation arm 120 has a rigidity and length that it functions as a rigid spacing element. A fixation element that is rigid or capable of applying a spring force can rely on penetration of the adjacent tissue or being wedged into place. A tensioned fixation element can rely on a slight stretch or expansion of the material once placed. One or both of the fixation arms 120 may be produced with an inward biased configuration in which the fixation arm is biased towards an anterior projecting curve or a folded configuration as described elsewhere herein. The fixation arms 120 may have a paddle like geometry that resists rotation when engaged with ocular tissue.

The device 100 can also include three or more fixation arms 120. Three fixation arms 120 can provide the device 100 with a defined fixation plane that is substantially parallel to the Z-plane (vertical plane) of the eye. The fixation arms 120 can be designed and deployed in a manner that puts each fixation arm 120 in equal and opposite tension. Alternatively, one or more fixation arms 120 may be designed to have a rigidity and length allowing to behave as a rigid spacing element. Zero, one, two, or all three or more of the fixation arms 120 can be manufactured with an inward biased design or biased towards a center of the device or the central axis CA of the device (see FIGS. 1-4 and see also FIGS. 5A-5D, 6A-6C, 7, 9A-9B, and 10). The inwardly biased fixation arms 120 can extend from the support structure and have a folded configuration prior to implantation. At least one, but fewer than all, of the fixation arms may be biased or curved as described herein. At least two, but fewer than all may be biased or curved as described herein. In some implementations, all of the fixation arms 120 may be biased or curve. The device can include three fixation arms, wherein two of the three fixation arms are flexible and biased towards a folded configuration, and a third fixation arm is less flexible than the other two and is biased towards an unfolded configuration. The folded configuration of each of the fixation arms can bias the terminal end portion of the fixation arms towards a central axis CA of the device. The lens support structure can be biased towards a substantially flat or planar configuration while the fixation arm(s) is biased towards the folded configuration that is not substantially flat or planar.

Once implanted and fixed trans-sclerally, the inwardly biased arms are unbent or unfolded away from their folded, inwardly biased configuration. In a preferred implementation, two fixation arms 120 have an inward bias geometry and the third fixation arm 120 has increased cross-sectional area—increasing its rigidity (see FIG. 3). The inwardly biased fixation arms 120 can incorporate a bend between an origin of the arm with the lens support structure 105 and their terminal end. The two bent fixation arms 120 can be biased towards the central axis CA of the device towards a folded configuration.

In an implementation, the device 100 can include at least three fixation arms 120. Prior to implantation, one of the at least three fixation arms can extend in an unfolded configuration from the support structure and at least two of the at least three fixation arms extend in a folded configuration from the support structure. And, prior to implantation, one of the at least three fixation arms can be biased towards the unfolded configuration and at least two of the at least three fixation arms can be biased toward the folded configuration. After implantation, each of the arms biased toward the folded configuration can be unfolded.

Each of the fixation arms 120 can include an origin portion 103 at the support structure 105 and a terminal end portion 102 coupled to an atraumatic anchor 125 for sutureless, trans-scleral fixation. Prior to trans-scleral fixation of the anchors 125, one of the plurality of fixation arms 120 (up to all of the fixation arms 120) can include a curved fixation arm 120 that is curved between its origin portion 103 and its terminal end 102 forming a bend B (see also FIGS. 5A-5D) enabling visualization of at least a portion of the curved fixation arm 120 through the pupil 30 of the eye (see FIG. 4). After trans-scleral fixation of the anchors 125, each of the plurality of fixation arms 120 can be tensioned between the origin portion and the terminal end to align the support structure relative to the Z-plane of the eye. The support structure 105 is adapted to provide support for an intraocular lens. The central aperture 115 extending through the full thickness of the support structure 105 is adapted to permit passage of light through both the central aperture 115 and the IOL supported by the support structure 105. The curved fixation arm 120 can curve anteriorly such that a portion of the arm 120 such as the terminal end 102 and/or its atraumatic anchor 125 is positioned over at least a portion of the support structure 105 (e.g., the upper surface of the support structure 105 and/or over a region of the central aperture 115). Alternatively, the curved fixation arm(s) 120 can curve posteriorly such that a portion of the arm 120 such as the terminal end 102 and/or its atraumatic anchor 125 is positioned under at least a portion of the support structure 105 (e.g., the lower surface of the support structure 105 and/or under a region of the central aperture 115).

Two of the three fixation arms 120 curve inward such that they are biased towards a folded configuration at rest. The arms 120 extend outward substantially orthogonally from the support structure 105, such as from their origin 103 at the support structure 105 and make a turn (anteriorly or posteriorly) forming a curve between the origin 103 and the terminal ends 102 of the arms 120. The curve of the arm 120 can result in the terminal end 102 of the arm 120 being positioned nearer to its own origin portion 103. In some implementations, the arm 120 curves in an anterior direction such that the terminal end 102 of the arm 120 is positioned anterior to the arm's origin portion 103 or over at least a portion of the anterior-facing surface of the support structure 105 near the arm's origin portion 103. In other implementations, the arms 120 can curve in a posterior direction such that the terminal end 102 of the arm 120 is positioned posterior to the arm's origin portion 103 or under at least a portion of the posterior-facing surface of the support structure 105 near the arm's origin portion 103. In an implementation, the anchors 125 of the curved fixation arms 120 can curve away from a first plane of the support structure (e.g., Z-plane of the eye) into a second plane that is parallel to the first plane. The second plane can be anterior or posterior to the first plane depending on whether the arms 120 curve anteriorly or posteriorly. The curve can be in a direction that is substantially transverse (e.g., X-plane) to the plane of the lens support structure 105 (e.g., Z-plane). The dilated pupil (depending on whether adult or pediatric patient) can have a diameter up to about 8 mm. The curve positions the anchors 125 of the curved fixation arms 120 to be positioned within a diameter of a circle in that second plane that is visible within the diameter of a dilated pupil so as to not impede visualization by the opaque iris, for example, between about 3 mm up to about 7.5 mm, more preferably about 7 mm. The anchor 125 of each of the curved fixation arms 120 can be positioned a distance from the center of the device, for example, about 1.5 mm, 2.0 mm, 2.5 mm, 3.0 mm, up to an no greater than about 3.5 mm, or no greater than about 4.0 mm from the center of the device. The curved arms 120 provide for positioning the terminal end portions 102 and/or the anchors 125 within this diameter or this distance from the center of the device allowing for ease of visualization. The third of the three fixation arms 120 is biased into a straight or unfolded configuration at rest. The third arm 120 extends outward orthogonally from its origin 103 at the support structure 105 and makes no turn or bend. Rather, the entire third arm 120 is entirely straight and extends substantially along a single axis. The two fixation arms that, at rest, were biased towards a folded configuration are now in an unfolded configuration, for example, by tensioning the arms 120 via the trans-scleral anchors being externalized.

The fixation arms 120 may be uniformly distributed around the device 100 to provide uniform tension. Alternatively, the fixation arms 120 may be oriented in a non-uniform distribution, for example, with three fixation arms 120 that are 90 degrees from one another. In this circumstance two of the fixation arms 120 would be 180 degrees from each other, providing opposing tension; while the third fixation arm 120 serves primarily to prevent the device 100 from rotating.

The lens support structure 105 can provide several functions. The lens support structure 105 can have a surface (anterior-facing surface or posterior-facing surface) forming a stable platform against which an IOL 110 can be placed during use. The lens support structure 105 can take the place of a capsular bag, particularly one where the posterior and/or anterior aspects of the bag are ruptured or otherwise incompetent. Its geometric and mechanical function not only supports the IOL 110 when in use, it can also serve to assist in the centration of an IOL 110 in the case of an asymmetric eye or asymmetric surgical procedure. The lens support structure 105 can be coupled to the one or more fixation arms 120. Where the lens support structure 105 provides artificial anterior capsule support for the IOL, the fixation arms 120 provide artificial zonular apparatus. Thus, the device provides a stable platform structure fixated to the eye recapitulating the native anterior capsule and zonular apparatus that would normally allow for placement of an IOL. The lens support structure 105 geometry and mechanical properties can be designed to allow the fixation arms 120 to function as intended and also withstand any torsional or tensile forces that may be imparted by the fixation arms 120.

The fixation arms 120 and lens support structure 105 are designed such that a properly fixated device 100 will position the central aperture 115 in a manner that will not interfere with the patient's vision. The surgeon can place an IOL 110 on through the lens support structure 105 thereby providing the patient with their needed refractive correction.

The ciliary body has a substantially circular or elliptical shape, with the vertical axis being 0.5 mm longer than the horizontal axis on average. The lens support structure 105 can interface with a patient's ciliary body to provide centration of the device 100 within the eye. A substantially round or elliptical lens support structure 105 can provide centration with the similarly round or elliptical ciliary body. However, matching of the shapes and 360 degree contact between the lens support structure 105 and the ciliary body can lead to inflammation or damage, which could negatively impact aqueous production. In a preferred implementation, the lens support structure 105 has a continuous inner circumference forming a uniform, substantially circular shaped inner wall 109 defining the central aperture 115 and an outer perimeter surface forming a substantially non-circular shaped outer wall 111 providing the lens support structure 105 with a substantially non-circular geometry (see FIG. 1). The non-circular outer geometry of the lens support structure 105 can provide centration of the device 100 without 360 degree contact with the ciliary body along the substantially non-circular shaped outer perimeter surface. The shape of the lens support structure 105 can provide sufficient contact between the lens support structure 105 and the ciliary body to aid in centration and support of an IOL 110 without causing inflammation and damage. In some implementations, the shape of the lens support structure 105 allows for contact with the ciliary body that is about 120 degrees or less, preferably between 1 and 45 degrees, or between 1 and 20 degrees. Limiting the contact to 120 degrees or less significantly reduces the risk of inflammation or impairment of aqueous production. A substantially non-circular or elliptical lens support structure 105 allows allow for gentle contact between the device 100 and the ciliary body that provides centration without requiring an exact match with the patient's specific dimensions. The radius of curvature of the lens support structure 105 can be less than that of the ciliary processes. Thus, the lens support structure 105 can contact the ciliary processes at 3 distinct points rather than across a calculable range. For example, when in use, the substantially non-circular shaped outer perimeter surface of the lens support structure 105 can contact the ciliary processes at these three distinct points. In other implementations, the lobes 107 of the device 100 are positioned near, but avoid contacting eye tissues (e.g., the ciliary body) once each fixation arm 120 is implanted and placed under tension. This arrangement allows for the lobes 107 to help in centration of the device and to avoid over-tensioning one arm 120 relative to another arm 120. If a fixation arm 120 is pulled too far during externalization of its anchor 125, the neighboring lobes 107 on either side of that fixation arm 120 may abut against the ciliary body during implantation urging the support structure 105 away from the ciliary body and promoting the device 100 into a more central alignment. Once implanted, the lobes 107 of the device can be positioned near eye tissue (e.g., the ciliary body) with or without touching the eye tissue. The tensioned fixation arms 120 can pull on the support structure 105 substantially equally around its perimeter. The tension applied around the support structure 105 can substantially align a central axis CA of the device 100 extending through the central aperture 115 with the visual axis of the eye and allow for the planar surface of the support structure 105 to be stabilized substantially parallel to the Z-plane (vertical plane) of the eye. The central axis CA of the device 100 need not be perfectly aligned (coincident) with the visual axis of the eye.

The non-circular outer wall 111 of the lens support structure 105 can include a plurality of lobes 107 projecting outward (i.e., in a convex manner) from a plurality of sides 108 that are substantially flat or concave. This can form an outer wall 111 of the lens support structure 105 having an alternating pattern of convex lobes and concave or flat sides. In an implementation, the lens support structure 105 can include three convex lobes 107 projecting between three flat or slightly concave sides 108 providing the lens support structure 105 with a triangular shape or rounded triangle shape (see FIG. 1).

Figure 6D:
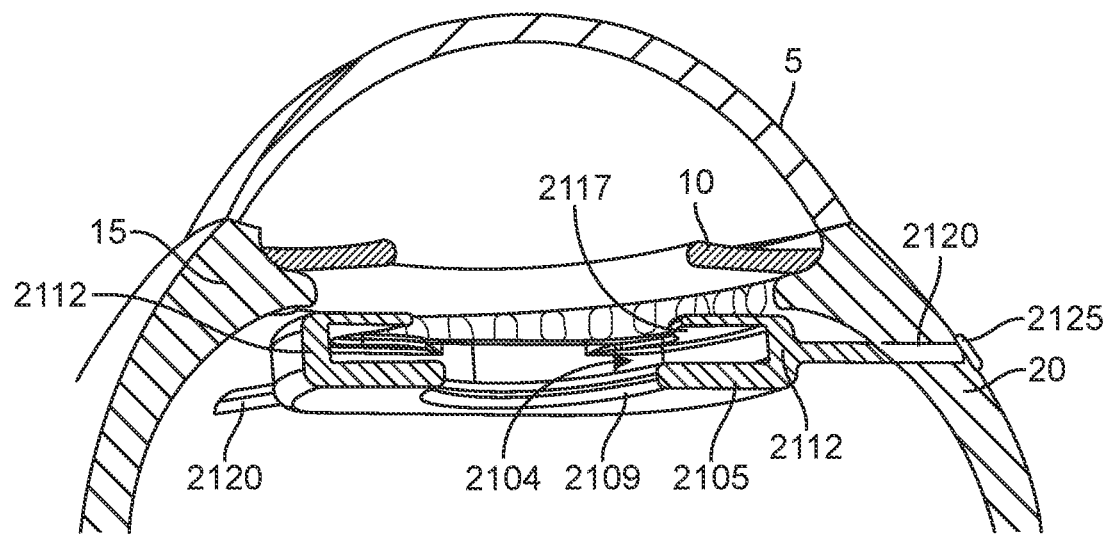
FIG. 6D shows the device of FIG. 6C implanted in an eye.
Figure 6E:
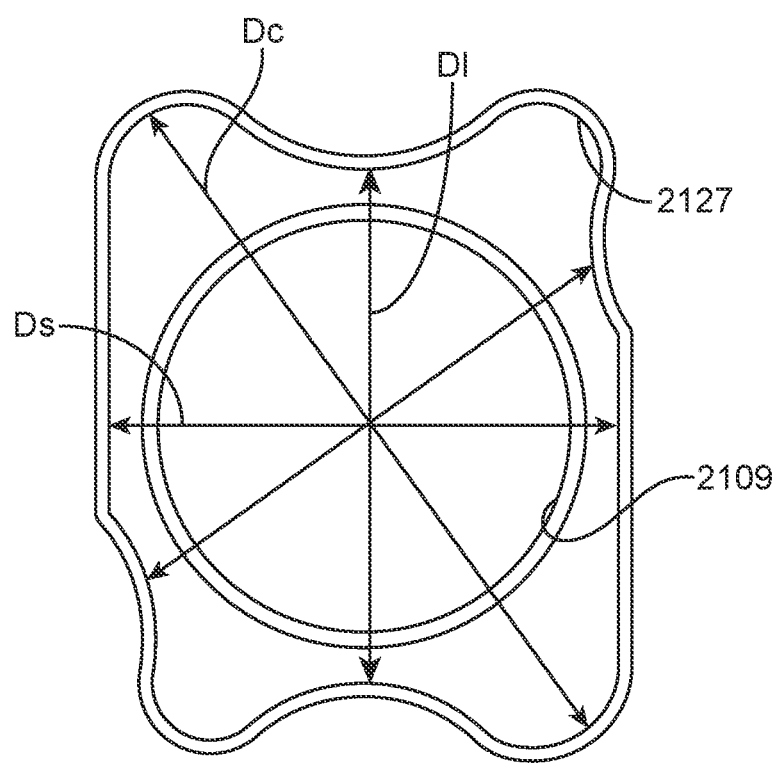
FIG. 6E shows the free-form shape of an anterior opening relative to a posterior opening of the device of FIG. 6A.
Figure 6F:
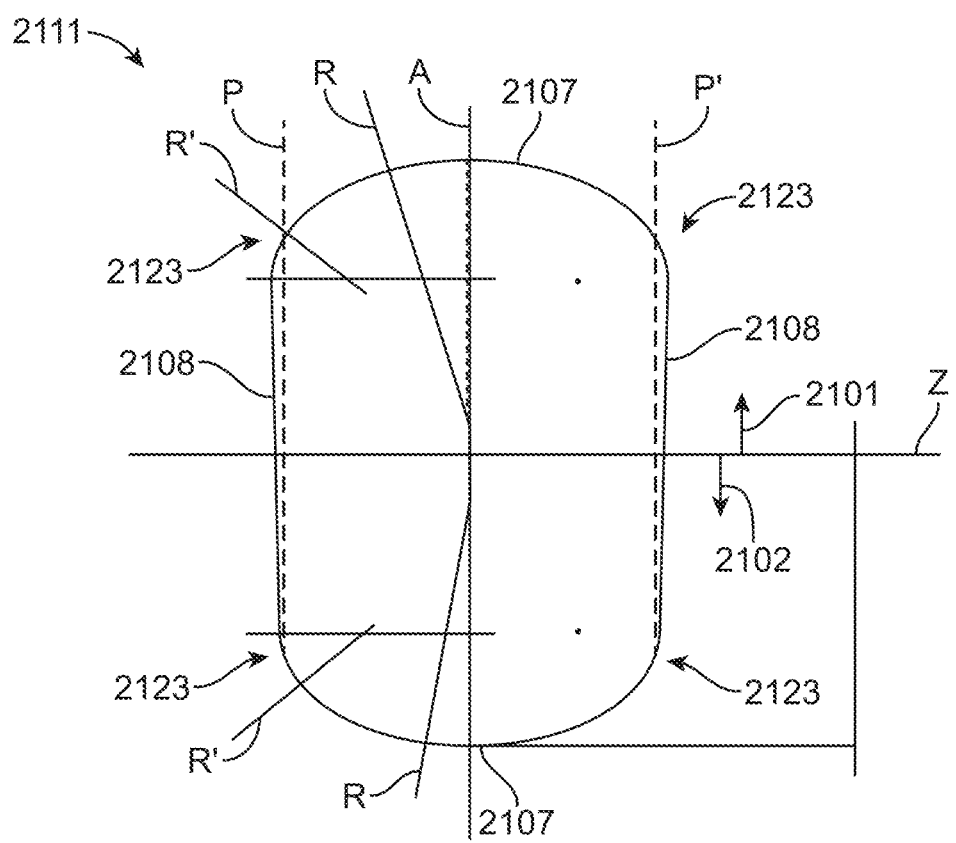
FIG. 6F shows an outer perimeter shape of a device having a major axis and a minor axis.

The lobes 107 can form the rounded corners of the device. In the implementation shown in FIGS. 1-4, the lobes 107 can form the rounded corners of the device. The device is a three-sided shape with the lobes 107 forming the corners between the sides 108. In the implementations shown in FIG. 5A through FIG. 10, the lobes 2107 form rounded ends of the device rather than the corners. The non-circular shape of the device is generally trapezoidal, rounded rectangle, or stadium shaped. The shape can include two elongate sides 2108 that are substantially straight along at least a portion of their length and connected by two lobes 2107 that form opposing curved semi-circular ends of the device. The elongate sides 2108 can bow outwardly along a curve for at least a portion of their length and can be straight for at least a portion of the length. FIG. 6F illustrates a perimeter 2111 or footprint of a device (excluding any fixation arms) showing four sides of the device. A first lobe 2107 forms the trailing end 2102 of the device, which can have a slightly narrower width (e.g., about 7.0 mm from side wall 2108 to opposite side wall 2018) compared to the width of the second lobe 2107 forming the leading end 2101 of the device (e.g., about 7.4 mm from side wall 2108 to opposite side wall 2018). The taper can create a width difference between leading end 2101 and trailing end 2102 that is about 0.1 mm to about 1.0 mm, preferably about 0.20 mm and roughly about a 0.5-5.0 degree angle from the center line of the device. The elongate sides 2108 of FIG. 6F can, but need not be straight along their entire length or lie parallel to one another. The two elongate sides 2108 are connected to the two lobes 2107 by four rounded corners 2123. The rounded corners 2123 can, but need not all have the same radius of curvature R'. The rounded corner 2123 in the upper left quadrant of FIG. 6F has a radius of curvature R' that is about 0 to about 3.5 mm, preferably about 1.67. The rounded corner in the upper right quadrant of FIG. 6F is its mirror image having the same radius of curvature of the rounded corner 2123 on the opposite side of the axis of symmetry along the major axis A of the device. The rounded corner 2123 in the lower left quadrant of FIG. 6F can, but need not have the same radius of curvature R' as the rounded corners 2123 in the upper quadrants, for example, about 0 to about 3.5 mm, preferably about 1.67. The rounded corners 2123 in the lower quadrants can be the same so that they are mirror images of one another on the opposite side of the axis of symmetry along the major axis A of the device. However, the corners 2123 in the upper and lower quadrants on opposite sides of the minor axis of the device need not be mirror images of one another. Meaning the minor axis extending generally along line Z shown in FIG. 6F need not be a line of symmetry. The lobes 2107 can have different radius of curvature R compared to the radius of curvature R' of the respective corners 2123. The radius of curvature R can be anywhere from a flat line to a radius of about 3.5 mm. A "lobe" as used herein can include a rounded corner of the device or an end of the device where the end projects or is curved outwardly relative to the center axis of the device. The rounded corners can, but need not have the same radius of curvature. The lobes also need not have the same shape and/or length so that a first end of the device may be slightly wider than the opposite end of the device (see, for example, FIGS. 5D and 6F).

The lobes 107 can act as bumpers against the ciliary body and/or within the ciliary sulcus to provide anti-rotation function in the Z-plane and/or prevent displacement within the Z-plane to maintain proper alignment between the central aperture 115 and the eye's visual axis. The plurality of fixation arms 120 can be positioned on the sides 108 and the plurality of lobes 107 project outward between the plurality of fixation arms 120. The fixation arms 120 each can have a length that is longer than a distance the lobes 107 project outward. As mentioned above, the lens support structure 105 can have a circular inner wall 109 defining the central aperture 115. The plurality of lobes 107 projecting outward from the central aperture 115 provides a varying thickness in the plane of the central aperture 115 between the inner wall 108 and outer wall 111. The thickness of the lens support structure 105 between the inner wall 108 and the outer wall 111 at the location of the substantially flat sides 108 is less than a thickness of the lens support structure between the inner wall 108 and the outer wall 111 at the location of the lobes 107. The number of lobes 107 or rounded corners of the lens support structure 105 can vary providing the lens support structure with any of a variety of non-circular shapes including rounded triangle, rounded rectangle, rounded pentagon, rounded hexagon, trefoil, quatrefoil, cinquefoil, trapezoid, stadium shape, cyclogon, egg, lens, triquestra, vesical piscis, reuleaux polygon, or other geometric or free-form etc. The projections or corners of these non-circular geometries can be rounded to provide gentle, non-penetrating contact with ciliary tissue such as the ciliary body. Alternatively, the device 100 can be designed to utilize the pars plana or scleral wall for centration assistance. In this implementation, the device 100 can be positioned posterior to the ciliary processes.

In still further implementations, the lens support structure 105 may have an overall shape that tapers from a leading end to a trailing end. For example, the device 100 can be configured for insertion through an incision such that a leading end of the lens support structure 105 (i.e., the end of the device inserted first through the incision) is wider leading end than trailing end such that the overall shape tapers from leading end to trailing end (see, for example, FIG. 2 and also FIG. 5D, 6A, and FIGS. 9A-9B, and 10). The leading end of the lens support structure 105 can be a region of the lens support structure 105 coupled to the leading fixation arm 120c. The trailing end of the lens support structure 105 can be a region of the lens support structure 105 located between the two trailing fixation arms 120a, 120b. The region near the leading fixation arm 120c has a width that is greater than the region between the trailing arms 120a, 120b. This tapered shape from leading end to trailing end of the device 100 results in it taking on a desired shape when loaded onto an insertion tool and stretch into an insertion configuration, which will be described in more detail below. The taper from leading end to trailing end can exist regardless of the overall shape of the lens support structure 105.

The plurality of lobes 107 can include at least three convex lobes connecting three sides 108 providing the lens support structure 105 with a substantially rounded triangular shape or Reuleaux triangle shape. A first numerical count of the plurality of lobes 107 can equal a second numerical count of at least three fixation arms 120 where each of the lobes 107 is spaced between adjacent fixation arms 120. The lobes 107 can be symmetrically spaced around the outer perimeter of the lens support structure between adjacent fixation arms. Each of the at least three fixation arms 120 can be symmetrically spaced around the outer perimeter of the lens support structure 105 between the adjacent lobes 107. The plurality of lobes can also include just two convex lobes 2107 forming curved, semi-circular ends of the stadium-shaped device connecting the two opposed and substantially straight or slightly outwardly curving elongate sides 2108 as shown in FIGS. 5A-5D, 6A, and 6F.

Each fixation arm 120 can have a spring force that is a function of elongation of the material when under a load. In contrast, an open loop haptic or coil spring may have a spring force provided due to bending of a material that has a substantially fixed length. The fixation arms 120 once anchored in the eye can be under tensile stress and material elongation. For example, each fixation arm 120 can provide for extension over a radius of between about 7.5 mm to 8.0 mm to accommodate diameters between about 15 mm to about 16 mm. The device has an operable range of tension for function. As an example, the device can be under a first amount of tension once implanted (X tension). The first amount of tension is the amount of tension in the minimum acceptable diameter. In other words, the device is under a minimum amount of tension in order to function, but is capable of being placed under greater tension to accommodate larger diameters. In the example of fixation arms 120 capable of accommodating both 15 mm and 16 mm extension, each force transfer arm can operate while under the first tension X and while under at least a second tension. The second tension can be the sum of the first tension X plus a distance of tension (e.g., 0.5 mm of tension). The fixation arms can withstand the differential tension available in each extension ratio. To further illustrate the example, if each fixation arm 120 in this implementation is about 4 mm long, then the second tension (X tension+0.5 mm of tension) can undergo a 12.5% increase in elongation to function at the 15 mm diameter and also function up to the 16 mm diameter. If the fixation arms 120 in this example are 2 mm long, then the second tension (X tension+0.5 mm of tension) can undergo a 25% increase in elongation to function at the 15 mm diameter and also function up to the 16 mm diameter. If the fixation arms in this implementation that are about 6 mm long, then the second tension (X tension+0.5 mm of tension) can undergo a 6.25% increase in elongation to function at the 15 mm diameter and also function up to the 16 mm diameter. The decreased spring force of the fixation arms 120 can enhance the safety and function of the device because the tension of the anchor on the ocular tissue is less dependent on variables that are difficult for the surgeon to assess—the eye's inherent dimensions and the specific location of the incisions. Additionally, the length of the fixation arm (e.g., between about 2 mm to 6 mm) as well as the inward curve (anteriorly or posteriorly) of at least one or more fixation arm 120 improves access and visualization for the surgeon to find and fix the arm during the operation. The device can have a relaxed fixation diameter Dd that is between about 15 mm up to about 20 mm, preferably between about 16.50 mm up to about 18.00 mm, where the radius of the circle is measured from the center of the central aperture 2115 to an inner facing surface of the anchor 2125 of the straight fixation arm 2120 (see FIG. 6A).

The anchors 125 can be coupled to or positioned at an outer terminus of the fixation arms 120. These geometries are designed to be easily externalized by the surgeon and to stabilize tension on the device throughout its useful life. The anchors 125 can have a generally low profile and can have a geometry (e.g., rounded) designed to limit conjunctival erosion and eyelid irritation. The terminal end of the fixation arm 120 can have an anchor 125 configured to be positioned external to the sclera 20 to secure the lens support structure 105 and prevent centripetal slippage. The geometry of the anchor 125 allows for the surgeon to pass the anchor 125 through a puncture or incision in the sclera 20 using forceps, trocars or other surgical tool. A snare device for anchor extraction is described in more detail below. The anchor 125 can have a geometry that resembles a nail head, a T-bar, a multi-pronged shaped, or any other geometry that can preferentially be passed through the sclera 20 in a first direction and resist pulling out the direction of insertion to maintain its external position when the arm 120 is placed under the tension anticipated through the lifetime of the device. The anchor 125 is designed to have a profile and geometry that does not cause irritation to the eyelid or conjunctiva throughout the useful life of the device 100. As such, preferred geometries will have minimal thickness profiles with smooth, rounded and/or tapering edges. The anchor 125 can have a substantially constant thickness or can have a thickness that various over its length, as discussed in more detail below.

The anchors 125 described herein are configured to be both easily externalized and resistant to re-internalization following externalization. The anchors can be designed such that they are graspable using an ophthalmic tool (e.g., 23, 25, or 27 gauge). A geometry that is ideal for grasping with an ophthalmic tool may not necessarily be ideal for firm fixation. The anchors 125 can have variations in thickness, width, and/or height. The anchors 125 can include a central portion and one or more graspable portions at a periphery of the central portion. The central portion can be arranged to lie over the wound (sclerotomy) through which the anchor 125 was inserted and the graspable portions arranged immediately adjacent the wound. The central portion can have increased thickness, height, and/or width compared to the graspable portions at the periphery. The increased thickness, height, and/or width of the central portion can add bulk to the area over the wound and thereby reduce the likelihood that tension on the fixation arm pulls the anchor 125 back through the wound. The central portion of the anchor 125 may have a thickness along a longitudinal axis of the arm 120 that is greater than a thickness of the graspable portion. For example, the thickness can be between about 1.2 to 5.0 times as thick as a thickness of the graspable portion. In other implementations, the central portion may have a width or height that is between about 1.2 to 5.0 times as wide or as high as the graspable portions. The geometry of the bulkier area is designed to resist deformation when under the tensile forces associated with normal use of the device. The bulkier central portion can collapse inward to fold over onto the terminal end of the arm 120 to which it is attached during externalization. Once the arms 120 are placed under tension, the bulkier central portion is incapable of being folded over away from the terminal end of the arm 120 onto itself, which prevents the externalized anchor 125 from being pulled back through the wound. Thus, the central portion can be pulled through the wound in the first direction (outward from the eye) despite its greater bulk, but is prevented from being pulled through the wound in the second opposite direction (inward towards the eye) because of its greater bulk. Fixation arms 120 extending to the eye wall can be difficult to manipulate as they can be blocked from view by the peripheral iris 10, limbus and sclera 20. As discussed above, one or more of the fixation arms 120 can be inwardly biased toward a folded configuration. Each of the fixation arms 120 may extend initially from the support structure 105 outward in an orthogonal direction and then curve or fold anteriorly (or posteriorly) such that the terminal ends of the fixation arms 120 are positioned over at least a portion of the fixation arm 120, the support structure 105, or the central aperture 115 extending through the support structure 105. At least a portion of the bent fixation arms (i.e., the terminal ends and/or the anchors 125) can be more easily visualized through a dilated pupil and visualization is not impeded by the opaque iris 10 (see FIG. 4). This inward (centripetal) bias also allows the bent fixation arms 120 to be safely grasped and manipulated during device implantation. Each of the fixation arms 120 of the device 100 can have inward bias toward a folded configuration or just a selection of the fixation arms 120 can have inward bias (e.g., one, two, up to less than all fixation arms 120).

The fixation arm 120 can also be molded to incorporate a bend or curve between its origin with the lens support structure 105 and the terminal anchor 125 (see FIGS. 1-4, and also fixation arms 2120 of FIGS. 5A-5C, 5D, 6A-6C, FIGS. 7, and 9A-9B, FIG. 10). The bent fixation arm(s) 120 can be biased towards a folded configuration. For example, one or more of the fixation arms 120 can bend between 90 degrees and 270 degrees from its origin with the lens support structure 105 in a radial and centripetal direction. The terminal end of the bent fixation arms 120 thus, lie in a different plane from a plane of the lens support structure 105. When in a resting state prior to being positioned in the eye, the terminal end of at least a first fixation arm 120 of the plurality of fixation arms 120 can incorporate a bend between its origin with the lens support structure and its terminal end forming a bent arm. The bent arm can extend at least a first distance from its origin orthogonal to the lens support structure 105. The bent arm can then curve upward (anteriorly) away from the plane of the lens support structure 105 at least another distance. The bent arm 120 can then curve back towards its origin or towards the central axis CA of the device. This can result in the terminal end of the bent arm 120 lying in a different plane than the plane of the lens support structure 105. The curve or bend in the arm 120 can be projecting outward away from the central axis CA and away from both the arm's origin 103 and terminal end 102. The trans-scleral anchor 125 and/or a terminal portion of the fixation arm 120 can be positioned over or anterior to at least a portion of the lens support structure 105 or positioned over at least a portion of the central aperture 115. Alternatively, the bent arm(s) 120 can curve downward (posteriorly) away from the plane of the lens support structure 105 at least a distance and the trans-scleral anchor 125 or a terminal portion of the fixation arm 120 can be positioned under or posterior to at least a portion of the lens support structure 105 and/or under or posterior to at least a portion of the central aperture 115. The folded configuration (whether the arms 120 curve anteriorly or posteriorly) allows for at least a portion of the bent fixation arms 120 such as the terminal ends of the bent fixation arms 120 and/or their anchors 125 to be visualized through the pupil and not impeded by the opaque iris. Only one arm 120 of the fixation arms 120, two arms 120 of the fixation arms 120, or all of the fixation arms 120 can incorporate a curve.

Once the device is positioned and anchored in the eye, the fixation arms 120 are placed under tension such that the bent arm is unfurled away from this folded configuration and is no longer bent. The terminal end of the arm 120 is urged away from this resting state in which the arm 120 is in a folded configuration to urge the bent fixation arm into a straight or unfolded configuration.

The bend of the folded configuration can be a gradual, smooth bend having a radius of curvature or can bend so as to form one or more distinct angles along a length of the arm 120. The bend can be tight enough to avoid projecting too far anterior while still capable of being unfurled or placed into an unfolded configuration with relative ease without imparting undue stress on the lens support structure 105. The inward biased geometry can have a curve that is between about 0.10 mm to about 2.5 mm radius of curvature on the inner curve (anterior-facing side) and between about 0.6 mm to about 3.0 mm radius of curvature on the outer curve (posterior-facing side). In an implementation, the biased fixation arm 120 curves a full radius of 180 degrees and has an inward biased geometry that is about 0.63 mm radius of curvature on the inner curve and about 1.13 mm on the outer curve such that the lens support structure 105 and the biased fixation arm are spaced by about 1.25 mm. The start point of the curve (near the origin 103 with the lens support structure 105) and the end point of the curve (near the terminus 102 at the trans-scleral anchor 125) can have a plurality of radiuses such that the curve changes over the length of the fixation arm 120. The curve of the biased fixation arms 120 can have an average curvature between about 0.15 mm to about 2 mm on the inner curve.

Figure 2:
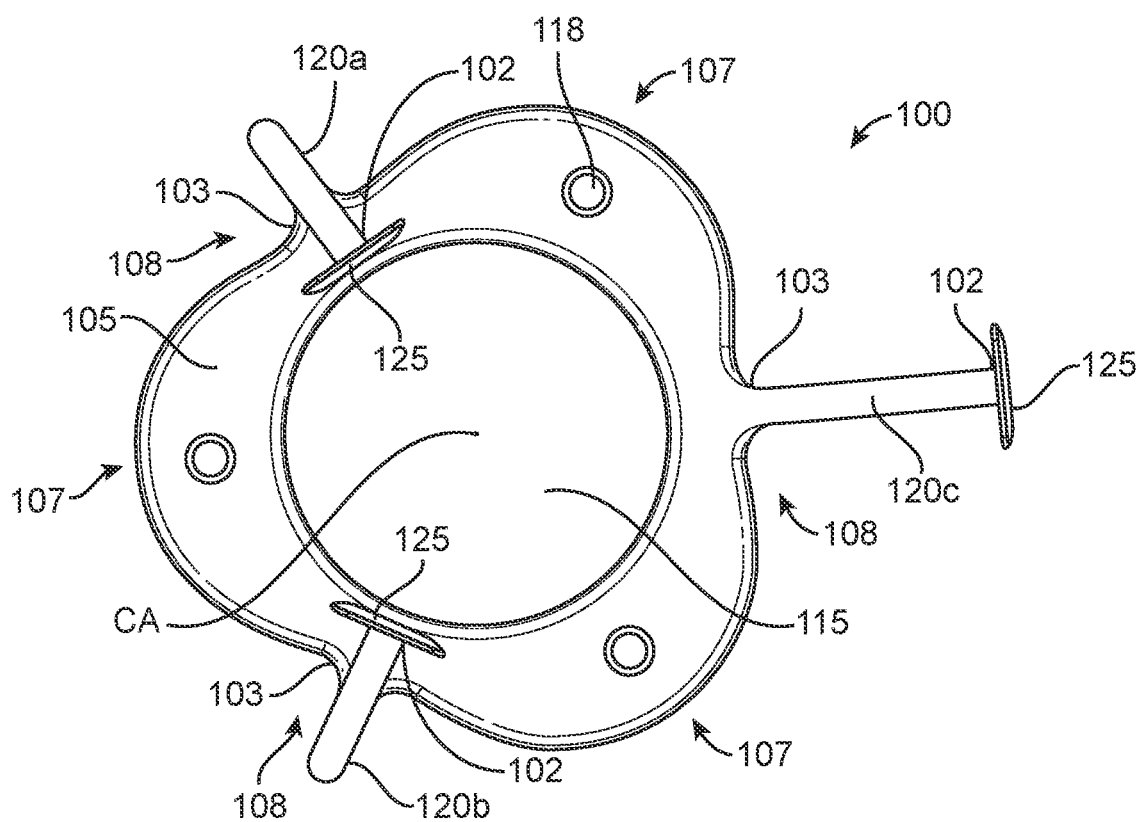

The bent fixation arms 120, after implantation and prior to fixation with the scleral wall, can be visible through the pupil when in an unstressed (resting) state (see FIG. 4). This visibility allows the surgeon to easily engage the anchor 125. When the surgeon engages the fixation arms 120 by grabbing the body of the fixation arm 120 or anchor 125, the surgeon can unfurl the fixation arm 120 away from the resting, folded configuration in a way to bring it substantially on plane with the lens support structure 105. These fixation arms 120 can have a flexibility such that the stresses stored in the material in the deployed state will not impart torsional or tensile forces upon the lens support structure 105 in a way that compromises device function. The fixation arm(s) 120 can be molded to have a 90-270 degree turn from its lens support origin in a tangential and centripetal direction. The fixation arm(s) 120 can incorporate elastic materials or deformable hinges to facilitate this manipulation without substantially altering the geometry of the lens support structure 105. The fixation arm 120 can have a length such that when the fixation arm 120 bends 180 degrees back towards its origin with the lens support structure 105, the terminal end 102 of the fixation arm 120 can be positioned over at least a portion of the lens support structure 105 as shown in FIGS. 1-2. Each of the fixation arms 120 of the device 100 can have a bend or just a selection of the fixation arms 120 can have a bend (e.g., one, two, up to less than all fixation arms 120). FIGS. 1-2 show two of the fixation arms 120 have a bend and one fixation arm is substantially co-planar with a plane of the lens support structure 105.

The visibility of one or more regions of the device can be improved also by modifying the material of the device components. The device can be formed of silicone elastomer, fluorosilicone elastomer, urethane, flexible acrylic, copolymers or combinations, or other biocompatible elastomers. The material of the device as a whole or one or more distinct regions of the device can be made translucent or opaque for visualization purposes. For example, where the material selected for the fixation arms, anchors, platform, awnings, or other region of the device is normally transparent, one or more additives may be included in the material to make it translucent or opaque. The additive can be a pigment or dye, polymerized or unpolymerized, so that the device or device component is readily visible by a user within the eye. A white pigment or dye added to an otherwise clear silicone elastomer forming the anchor of one or more of the fixation arms 120 so that they are more easily seen and grasped during externalization. One or more regions of the chassis of the device may also be opaque with a dye or pigment so that the IOL can be manipulated relative to the device with visual confirmation of the location of the IOL components. The IOL haptic, for example, can be positioned behind a tab or awning of the device that is made opaque so that the haptic is not visible following implantation. The size of the anterior opening prevents the opacity of the one or more device features, such as the tab or awning, from significantly impacting a user's vision while the device is implanted.

One or more of the fixation arms 120 of the devices described herein can be manufactured to have a non-planar geometry at rest and may be biased towards the folded configuration that allows for easy viewing of at least a portion of the fixation arm 120 through a pupil once the device 100 is implanted, but prior to externalization of the anchor 125. The fixation arm 120 having this configuration can be more easily grasped and manipulated by a user so that it can be urged into an unfolded configuration for sutureless fixation. A fixation arm 120 manufactured to have a bias in a resting state or that is curved or bent in a resting state includes a fixation arm 120 having that shape when the device 100 is outside the eye and ready for implantation. In some implementations, the fixation arm 120 can take on the curved, folded, or bent shape after implantation in the eye (e.g., the posterior chamber), but before fixation of the anchors. For example, one or more fixation arms 120 can be formed of a material that has a first shape outside the eye, takes on a curved shape upon implantation in the eye that is different from the shape of the arm 120 prior to implantation in the eye, and that can be unfolded into a substantially straight shape upon externalization of the anchor 125.

A fixation arm 120 that has the bias towards a folded or curved shape (e.g., having a bend along its length between its origin portion 103 and its terminal end 102) can be visualized through the pupil, grasped, and manually unfolded and/or stretched in order to fix the anchor 125 of the arm 120 trans-sclerally. The configuration and/or radius of curvature of the curve, bend, or fold as well as the directional orientation of the curve, bend, or fold can vary so long as at least a portion of the fixation arm 120 (e.g., the anchor 125 and/or the terminal end portion coupled to the anchor 125) is visible to a user through the diameter of the pupil of the patient, preferably a dilated pupil of the patient. In some implementations, this means at least a portion of the fixation arm 120 is positioned over at least a portion of the lens support structure 105 and radially inward of its outer wall 111. The distance the portion of the arm 120 extends radially inward of the outer wall 111 can vary. The portion can extend to be over a location adjacent to the outer wall 111 that is not over the outer wall 111 in the orientation a central axis CA extending anterior-to-posterior through the central opening 115. In this implementation, the distance between the central axis CA of the device to the portion extending over is greater than the distance between the central axis CA of the device and the outer wall 111. The portion can extend to be over the outer wall 111. In this implementation, the distance between the central axis CA of the device to the portion is the same as the distance between the central axis CA of the device and the outer wall 111. The portion can extend to be over a location radially inward to the outer wall 111. In this implementation, the distance between the central axis CA of the device to the portion is less than the distance between the central axis CA of the device and the outer wall 111. The portion can extend to be over the central opening 115. In this implementation, the distance between the central axis CA of the device to the portion is less than the distance between the central axis CA of the device and the inner wall 109 defining the central opening 115.

A portion of the fixation arm (e.g., the terminal end and/or the anchor 125) can be positioned over a portion of the lens support structure 105 and at the same time also over a portion of the central opening 115. For example, the anchor 125 can have a dimension such that at least a portion of the anchor 125 is positioned over at least a portion of the lens support structure 105 and another portion of the anchor 125 is positioned over at least a portion of the central opening 115.

The fixation arms 120 biased towards a curved configuration can curve towards an inner or a central portion of the device, including, but not limited to, the actual center of the device or the central axis CA. The center of the device 100 is the center of the circle formed by the central aperture 115 (in the instance where the central aperture 115 is circular). The central axis CA of the device extends through the center of that circle in an anterior-to-posterior direction (i.e., a top-to-bottom direction). If the central aperture 115 is substantially non-circular, the center of the device is a symmetrical center of the central aperture 115 along the central axis CA extending anterior-to-posterior direction. A fixation arm that is biased into a folded or curved configuration such that its anchor extends towards a center of the device or towards the central axis CA of the device need not require an axis through the anchor of the arm to intersect the actual center or intersect the central axis CA of the device. "Toward the center" or "toward the central axis" with regard to the inwardly biased fixation arms includes an arm having a curve so that the terminal end of the fixation arm extends back toward a portion of the device in a generally inward direction as opposed to the terminal end of the straight fixation arm, which extends in a generally outward direction away from the lens support structure. The curved fixation arm can be biased toward any central portion of the device and need not point directly at the actual center of the device. The curved fixation arms can be angled relative to the actual center.

Where the fixation arms are described as being "folded" or "bent" or "curved" or having a configuration that is "folded" or "bent" or "curved", the angle of the fixation arms relative to a longitudinal axis along its length can change gradually and uniformly, or can change more sharply or abruptly such that an angle is formed. The folded configuration can describe the inward bias of the fixation arm at rest or prior to implantation where the fixation arm extends outward from the support structure along a first axis and curves anteriorly or posteriorly relative to a plane of the support structure back towards a central portion of the device. The support structure of the device when implanted is configured to lie substantially parallel to the Z-plane (vertical plane) of the eye. The folded configuration can include a geometry in which the fixation arm curves away from this plane of the support structure (e.g., within a transverse plane) so that at least a portion of the fixation arm is positioned anterior to another portion of the device (e.g., over itself, the lens support structure, and/or the central opening). The folded configuration need not mean the fixation arm portions are over and also in contact with each other. Preferably, the portions of the fixation arm are spaced a distance away from each other, the distance being along the central axis CA of the device. The folded configuration also need not mean a creased or sharply angled folding. The folded configuration can mean a radius of curvature exists between the origin of the fixation arm at the support structure and the terminal end of the fixation arm.

A portion of the arm 120 that is positioned over at least a portion of the support structure 105 can include that portion being over as well as positioned radially inward of an outer wall 110 of the support structure 105. The portion of the arm 120 that is positioned over at least a portion of the support structure 105 can include that portion being positioned radially inward of and over the central opening 115. In these instances, "radially inward" need not also mean within the same plane. Preferably, the portion of the arm 120 is positioned over the portion of the support structure within a different plane from the plane of the support structure. The portion of the fixation arm 120 (e.g., anchor 125 and/or terminal end 102) can terminate anterior or posterior to the lens support structure 105 at a diameter that is central to the outer perimeter of the lens support structure 105. The portion can be located over the portion of the lens support structure relative to the central axis CA of the device that extends anterior-to-posterior through the central opening 115. Where the portion of the fixation arm 120 is described as being over the portion of the lens support structure, the portion of the fixation arm 120 may also be over the central opening 115 defined by the lens support structure 105.

Where a portion of the arm 120 is described herein as being "over" another portion of the device 100 (e.g., itself, the lens support structure 105, and/or the central opening 115), the portion of the arm 120 can generally overlap that portion of the device in space and need not require a particular direction relative to the retina. Thus, "over" may be used generically herein to refer to an overlap in the space surrounding the device and can, but need not require the spatial overlap to be in a generally anterior direction relative to the retina. A portion that is described as being "over" another portion can, during use, be positioned posterior to it relative to the retina. The arm 120 that is biased into the folded configuration may only be referred to herein as "over" or "overlapping" another part of the device even though it may also, during use, be positioned "under" or "posterior" to another part of the device relative to the retina. For the sake of simplicity, each alternative may not be reiterated at each instance throughout the disclosure. The arms can be curved to position at least a portion of the arm over an anterior-facing portion of the device such that the portion is generally vaulted above the device along the central axis CA. The arms can be curved to position at least a portion of the arm over a posterior-facing portion of the device such that the portion is generally vaulted below the device along the central axis CA. The arms can be curved to position at least a portion of the arm within the same plane so that it is neither over the anterior-facing portion nor over the posterior-facing portion of the device. Any of a variety of configurations of the fixation arms are considered herein so that at least a portion of the arms are visible through a dilated pupil. The mechanisms can vary by which the bent fixation arms 120 that are biased towards the folded configuration become unfolded to take on a straight configuration. The arms can be unfolded mechanically, electromagnetically, and/or thermally.

In some implementations, the fixation arm 120 may be unfolded mechanically along a single axis of the arm. The fixation arm 120, at rest, need not be biased into a folded configuration that has a bend or that curves. For example, the fixation arm 120 may be biased into a folded configuration in which the arm 120 is compressed longitudinally along a single axis. The arm 120 be extend along the single axis orthogonally outward from the lens support structure between its origin portion 103 and its terminal end portion 102. The length of the arm 120 in the folded configuration can be shorter between origin portion 103 and terminal end portion 102 such that the anchor 125 of the arm 120 is positioned more centrally within a smaller diameter than when in the unfolded configuration. Once the device is implanted in the eye, but before externalization of the anchor 125, the arm 120 may be telescoped outward to extend its length such that it can be externalized. The mechanical unfolding by telescoping can be due to nested components of the arm 120 sliding over each other to provide greater length when unfolded or a shorter length when folded. The mechanical unfolding by telescoping can also be due to a single elastic component configured to fold into itself for a shorter length for visualizing through the pupil and unfold out of itself for a longer length during externalization.

In some implementations, the fixation arm 120 may be unfolded or folded thermally. For example, the fixation arm 120 can be in a first shape at room temperature (folded or straight) and change to a second shape at body temperature or thereabouts (heated to 35° C.). This can also be effected by chemical means (e.g., hydration) or mechanical means (cutting a restrictive feature).

The fixation arm 120 can be produced from elastic or inelastic material. For example, the fixation arm 120 can be formed of an inelastic material and have a 3-dimensional shape that provides for the elasticity. The 3-dimensional shape can vary as described elsewhere herein, including a C-shape, Z-shape, S-shape, or other 3-dimensional shape. The fixation arm 120 provides sufficient support to maintain an IOL 110 or other device while not imparting excessive force on scleral tissue. An optimal design would have a wide operable range of tensions and stability in order to be able to meet both parameters in eyes of varying sizes and with incisions in varying locations. One means of modifying the fixation arm design is to incorporate spring-like structures. These can include traditional compression based haptic designs like J-Loop, C-Loop, Closed Loop, Kellman Haptics, plate haptics, or other haptic designs common to IOLs. Alternatively, the device 100 can incorporate a tension-based haptic such as a simple linear elastic cord. Alternatively, the tension design can be modified with a V-shaped, Z-shaped or S-shaped feature to decrease the tensile resistance of the fixation arm 120.

The fixation arm 120 can have a texture or features that allows it to be pulled through sclera in one direction, but there is resistance in the opposite direction to minimize the chance of slippage the fixation arm 120. The texture or feature can be provided by the material itself or designed into the fixation arm 120. For example, the fixation arm 120 can be barbed and formed from a material integrated into an outer structure. In this way, a barbed internal structure may be able to function as a barb while hiding the sharp edges commonly associated with a barb. An example would be a rigid plastic structure embedded in a soft elastomeric structure.

The fixation arms 120 can be formed of a flexible material that has memory and is not malleable. The flexible material of the fixation arms 120 can include any of a variety of biocompatible elastomers including silicone elastomer, fluorosilicone elastomer, urethane, flexible acrylic, copolymers or combinations, polyurethanes, hydrophobic acrylics, hydrophilic acrylics, Nylon, Polyimide, PVDF, natural poly-isoprene, cis-1,4-polyisoprene natural rubber (NR), trans-1,4-polyisoprene gutta-percha, synthetic polyisoprene (IR for isoprene rubber), Polybutadiene (BR for butadiene rubber) Chloroprene rubber (CR), polychloroprene, Neoprene, Baypren etc., Butyl rubber (copolymer of isobutylene and isoprene, IIR), Halogenated butyl rubbers (chloro butyl rubber: CIIR, bromo butyl rubber: BIIR), Styrene-butadiene Rubber (copolymer of styrene and butadiene, SBR), Nitrile rubber (copolymer of butadiene and acrylonitrile, NBR), also called Buna N rubbers Hydrogenated Nitrile Rubbers (HNBR) Therban and Zetpol, EPM (ethylene propylene rubber, a copolymer of ethylene and propylene) and EPDM rubber (ethylene propylene diene rubber, a terpolymer of ethylene, propylene and a diene-component), Epichlorohydrin rubber (ECO), Polyacrylic rubber (ACM, ABR), Silicone rubber (SI, Q, VMQ), Fluorosilicone Rubber (FVMQ), Fluoroelastomers (FKM, and FEPM) Viton, Tecnoflon, Fluorel, Aflas and Dai-El, Perfluoroelastomers (FFKM) Tecnoflon PFR, Kalrez, Chemraz, Perlast, Polyether block amides (PEBA), Chlorosulfonated polyethylene (CSM), (Hypalon), Ethylene-vinyl acetate (EVA), Thermoplastic elastomers (TPE), resilin and elastin, Polysulfide rubber, and Elastolefin.

The arms 120 made of a flexible material that is formed into a shape can be flexed away from the formed shape, but has memory to return to the formed shape. In other words, the flexible fixation arms 120 can be flexed or unfolded away from their folded configuration, but cannot be urged into a different shape that is retained without some kind of anchoring fixation. For example, one or more of the flexible fixation arms 120 can be formed into a bent shape. For example, the arm can include a 180 degree bend from its origin 103 with the support structure 105 to the terminal end 102 near the anchor 125. The arm 120 can maintain this bent shape when the device is at rest and no forces are applied to the arm 120 such that the arm 120 is biased towards a folded configuration. In other words, the arm 120 in its unbiased state is bent. The bent fixation arm 120 can be flexed away from this bent shape to take on a straight shape or an unfolded configuration such that the entire arm 120 extends and is positioned straight relative to the longitudinal axis L. When flexed into a straight shape, the arm 120 is biased to return to the bent shape or the folded configuration. If the flexing force on the fixation arm 120 is released, the arm 120 will return to its resting bent shape. However, when in use, the fixation arm 120 is anchored trans-sclerally and the anchor 125 at the terminal end 102 of the arm 120 positioned outside the sclera. The arm 120 is tensioned to remain in the straight shape.

In other implementations, the fixation arms 120 can be formed of or incorporate a material that is malleable such that the fixation arms 120 can be bent or formed into a particular shape. The malleable fixation arms 120 can be formed of a material such as implant-grade metals or plastics including gold, silver, platinum, stainless steel, Nitinol, nickel, titanium, polypropylene, polyethylene, nylon, PVDF, polyimide, Acetal, and PEEK.

The one or more fixation arms 120 can have a Young's modulus that is less than about 1000 MPa, or less than about 500 MPa, or less than about 250 MPa, or less than about 100 MPa, or less than about 50 MPa, or less than about 25 MPa. The one or more fixation arms 120 can have a Young's modulus that is less than about 20 MPa, for example, between about 0.01-about 1.0 MPa, or between about 0.5-about 5.0 MPa. The fixation arms 120 can be very soft and apply very little force because they are designed to be under tension to anchor the support structure 105 rather than having a compression spring force to anchor the support structure 105 or a more rigid penetrating force that a barb or other fixation haptic can provide.

In some implementations, the fixation arms 120 can each have a length between the origin 103 and the terminal end 102 that is about 2 mm to about 6 mm. The fixation arms 120 each can have the same length. The length of the fixation arms 120 that extends through the sclera can having a thickness or width that is minimized to reduce the overall size of the wound through which the arms 120 extend. The maximum width of the trans-scleral portion of the fixation arms near the terminal end 120 where the anchor 125 is positioned can be no greater than about 2.0 mm, no greater than about 1.5 mm, no greater than about 1.0 mm, no greater than 0.75 mm, no greater than 0.50 mm.

Figure 3:
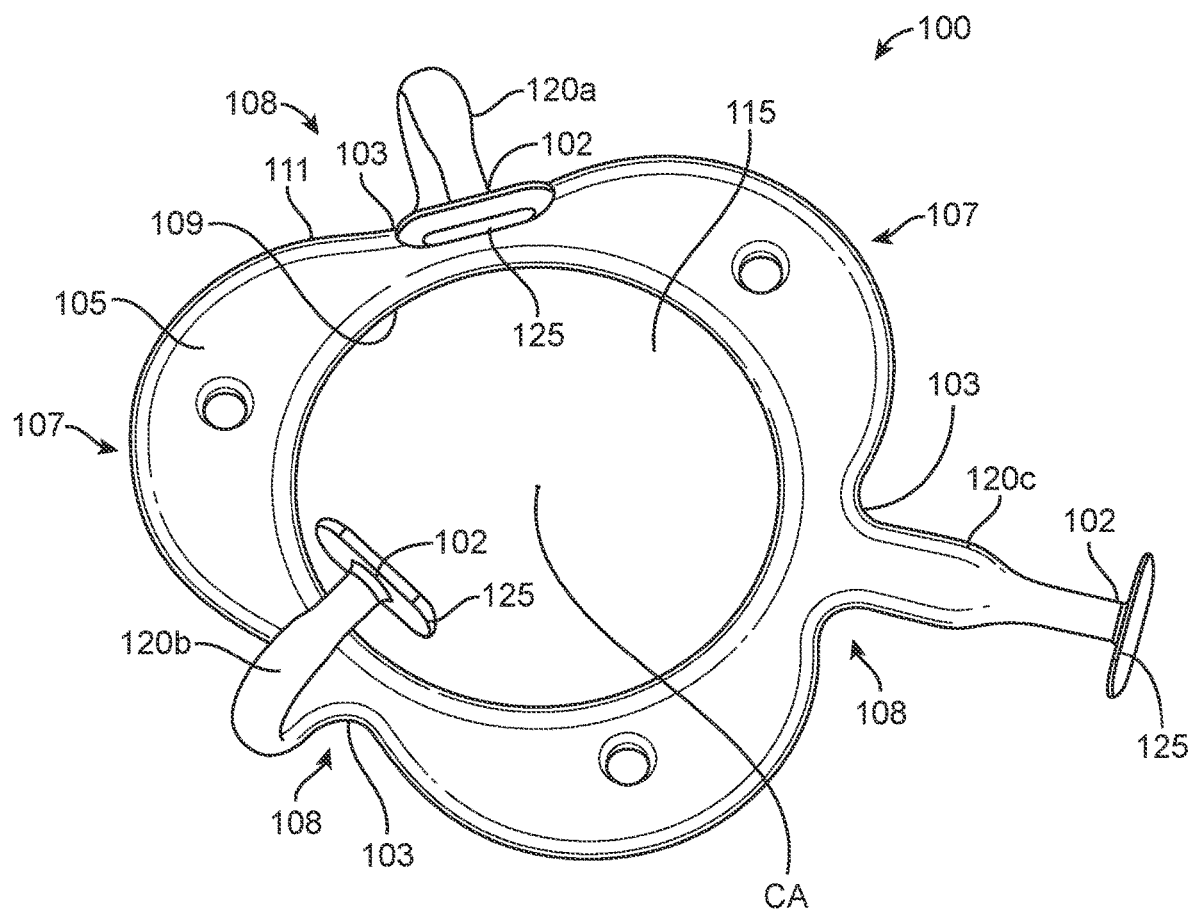
FIG. 3 shows an implementation of a device for supporting an IOL in which two fixation arms are curved and inwardly biased toward a center of the device and one fixation arm is straight and has a geometry that makes it more rigid than the other fixation arms.

FIG. 3 also shows an implementation of a device 100 having two fixation arms 120a, 120b that have inward bias and a third fixation arm 120c that does not have inward bias and is straight. Additionally, the third fixation arm 120c has a geometry that makes it less flexible than the other fixation arms 120a, 120b. The third fixation arm 120c can incorporate a region between the origin 103 and terminal end 102 that is wider than the other two fixation arms 120a, 120b and can have a higher cross-sectional area. A region of a fixation arm 120 can be narrower near the terminal end 102 and wider away from the terminal end 102 of the arm 120. The width of the arm 120 away from the terminal end 102 can provide a degree of bulk and stability while the width near the terminal end 102 can minimize the trans-scleral portion of the arm 120.

Each fixation arm 120a, 120b, 120c can be positioned one at a time during the surgical procedure. As described elsewhere herein, the leading fixation arm 120c can be a straight configuration and the trailing fixation arms 120a, 120b can be curved. The weight of the device can cause the first implanted or leading fixation arm 120c to bend following externalization such that the device 100 tilts posteriorly toward the retina. In this scenario, a surgeon can locate the device in a more posterior position. However, this can increase the risk of intraoperative tissue damage due to the manipulation of tools near the retina. In some implementations, the leading fixation arm 120c can be mechanically and/or geometrically reinforced to reduce the likelihood of posterior drift. The leading fixation arm 120c can be produced out of a material that is resistant to such deformation. The material can be any implant grade plastic or metal that can cantilever the device following externalization of the anchor 125 of the leading fixation arm 120c. Suitable materials include, but are not limited to, PMMA, rigid silicones, nylon, hydrophilic and hydrophobic acrylics, PEEK, polyimide, stainless steel, titanium, Nitinol, and others. The more rigid material can be used to form the entire leading fixation arm 120c or just a portion of the leading fixation arm 120c. The leading fixation arm 120c may be formed of a softer material embedded with a more rigid material. In an implementation, the leading fixation arm 120c can include a region of mechanical reinforcement between its origin 103 at the support structure 105 and its terminal end 102 where it is coupled to an anchor 125. The region can achieved by increasing a thickness of the fixation arm 120c or embedding a rigid section of plastic into a softer material. The region can have an increased thickness (see FIG. 3) designed to specifically reduce the likelihood that the device 100 drifts posteriorly, while not impacting the ability externalizing the anchor 125 of the fixation arm 120. For example, the fixation arm 120 can have a tapered thickness designed to limit deflection in the posterior direction. The tapered geometry can be thinnest near the footplate anchor 125 and thicken centrally. The posterior surface of the fixation can serve to bias the device anteriorly relative to the eye. The angle of contact of the posterior surface of the fixation arm 120 and the wound can bias the device 100 in a way that reduces the practical risk of a posterior deflection of the fixation arm 120. Additional bulk can further limit the deflection of the device and the proximity to the retina.

The trans-scleral fixation arm 120 and/or anchor 125 can have a photoreactive or hydroreactive element that assists in the sizing or fixation of the fixation arm. By swelling or shrinking a portion of the fixation arm, the geometry of the fixation arm can be expanded or contracted in order to intra-operatively or post-operatively adjust the length of the fixation arm. Alternatively, by expanding the anchor following the externalization of the fixation arm, the anchor will become more effective in providing secure fixation with reduced risk of slippage.

The cross anchor of the fixation arm is able to slide along the fixation arm 120 with some resistance. By adjusting the fixation arm 120 intraoperatively, the surgeon can size the device 100 specifically for a given patient. Custom sizing reduces the risk of slippage and modulation of the effective lens position. Once the fixation arm 120 is set to the appropriate tension, the excess material can be removed such as by trimming.

The device 100 can be made of a material or contain a geometry that can serve as a drug delivery device, including a refillable drug delivery device. A securely fixated device accessible in the subconjunctival space would provide an opportunity to deliver drugs to the posterior and anterior segments. Examples of therapeutics can include one or more drugs for lowering intraocular pressure (glaucoma medications), steroids, biologic medications such as anti-vascular endothelial growth factor (anti-VEGF), gene therapy, anti-bacterial, anti-viral, chemotherapeutic, and non-steroidal anti-inflammatory medications, among others to treat ocular or systemic diseases.

The devices described herein can be used together with IOLs having any of a variety conventional designs, including multi-piece as well as one-piece designs. IOL 110 can include a central optic 112 and two haptics 114 (see, e.g., FIGS. 5B and 5C). The haptics 114 can be conventional open loop haptics such as C-loop, J-loop, modified J-loop, or other haptics. The IOL 110 may be positioned above (or below) the central opening 115 of the device so that the central axis CA extending anterior-to-posterior through the central opening 115 extends through the optic 112 of the IOL 110. The haptics 114 of the IOL 110 may project upwards or anteriorly away from (or toward, if positioned below) the lens support structure 105 as described elsewhere herein. One-piece IOLs can have open loop haptics similar to conventional three-piece IOLs do. One-piece IOLs may also incorporate monobloc-plate style haptics. Where the device is shown with one type of IOL (e.g., the multi-piece IOLs or one-piece IOL shown in FIGS. 5B and 5C), it should be appreciated that another type of IOL can be mated with the device. The devices described herein can be used with any type of IOL as described elsewhere herein, including multi-piece as well as one-piece designs. Similarly, the haptics of the IOL can be of any of a variety of configurations.

The lens support structure 105 can have a geometry adapted to mate with a perimeter of the IOL or with one or more haptics of the IOL. The geometry can include a concavity, recess, channel, or groove forming at least a portion of an inner perimeter of the lens support structure.

FIGS. 5A-5D, 6A-6C, 7, 8A-8D, and 9A-9B illustrate various implementations of a device configured to mate with an IOL such that at least a portion of the IOL is covered by at least a portion of an internal surface of the device. The devices shown in these figure can incorporate any of a variety of features described above with respect to FIGS. 1-4 and similarly, the devices shown in FIGS. 1-4 may incorporate any of the features described with respect to FIGS. 5A-5D, 6A-6C, 7, 8A-8D, and 9A-9B in any reasonable combination. For example, where the fixation arms are described with regard to, for example, the lens support structure 105 or arms 120 of FIGS. 1-4, that description also applies to the support structure 2105 or fixation arms 2120, respectively, of the devices of FIGS. 5A-5D, 6A-6C, 7, 8A-8D, and 9A-9B and vice versa.

FIGS. 5A-5D illustrate an implementation of a device 2100 having a lens support structure or posterior platform 2105, a central aperture 2115, and a plurality of fixation arms 2120. The central aperture 2115 can be bound by the inner perimeter or inner wall 2109 of the posterior platform 2105. The central aperture 2115 can be circular, but the outer perimeter or outer wall 2111 of the posterior platform 2105 can be non-circular. As described elsewhere herein the outer perimeter of the posterior platform 2105 can have any of a variety of shapes including circular and non-circular shapes. The non-circular shapes can vary including oval, elliptical, rounded rectangle or stadium shape, trapezoid or other polygonal shape, rounded triangle or reuleaux polygon, hour-glass, free-form, etc., as described elsewhere herein.

The posterior platform 2105 can support the IOL 110, for example, taking the place of a native lenticular capsular bag. The device 2100 can include one or more leaflets or awnings 2126 positioned over an anterior-facing surface of the posterior platform 2105 so that one or more recesses 2104 are formed within which at least a portion of the IOL 110 may be positioned. The recesses 2104 may at least partially surround the central aperture 2115 and be sized to accommodate at least a portion of the IOL, such as the haptics 114. FIGS. 5B and 5C show the IOL 110 engaged with the device 2100. The optic 112 of the IOL 110 is positioned over the central opening 2115 and a perimeter region of a posterior-facing surface of the optic 112 is positioned against the anterior-facing surface of the posterior platform 2105. Each of the haptics 114 of the IOL 110 can be positioned substantially within the respective recesses 2104 and a majority of the optic 112 of the IOL 110 remains outside the recesses 2104. The recesses 2104 can be defined by an anterior-facing surface of the posterior platform 2105 and the overhanging leaflet or awning 2126. The volume of the recesses 2104 formed by the space between the anterior-facing surface of the posterior platform 2105 and the posterior-facing surface of the awning 2126 is sufficient to receive the respective one of the haptics 114 in both depth anterior-to-posterior as well as distance away from the central axis CA of the opening 2115. The awnings 2126 can have a smooth geometry and can serve to protect the iris from any sharp edges of the IOL once positioned on the device 2100. Additionally, the central-facing surfaces of the awnings 2126 (facing toward a center axis CA of the device 2100) can additionally serve to provide a surface against which the haptics 114 may abut. These surfaces can provide counter pressure to the haptics and thereby aid in centering the IOL 110 on the device 2100. The awnings 2126 also can limit Z-axis movement of the haptics 114 and help to secure the IOL 110 to the device 2100. The reliable fixation of the IOL, including one-piece IOLs, allow for the use of IOLs that require tight centration tolerances (e.g., torics, multi-focal lenses, extended depth of focus (EDOF) IOLs, and accommodating IOLs).

The IOL 110 may be positioned within the device 2100 prior to implantation in the eye or after implantation in the eye. Similarly, the IOL 110 may be removed from the device 2100 and replaced postoperatively. Methods of implantation of the device will be described in more detail below.

The device 2100 can have an outer perimeter 2111 that has a major axis and a minor axis. Thus, the inner perimeter 2109 may define a circular central aperture 2115 and the outer perimeter 2111 may define a non-circular shape. The recesses 2104 formed by the awnings 2126 are positioned opposite one another relative to the major axis so that the span of the IOL 110 haptics 114 may be accommodated within the recesses 2104. The non-circular outer perimeter 2111 in FIGS. 5A-5D is a rounded rectangle. Where a shape is referred to here as being "rectangular" it should be appreciated that the shape need not have corners that form right angles or that the sides be perfectly parallel with one another. The term is used to suggest a particular non-circular shape that is elongate having a pair of opposing sides that are longer than a pair of opposing ends so as to have a major or long axis and a minor or short axis. The rounded rectangle or stadium shape may have two substantially flat or slightly curved, elongate sides 2108 and two substantially rounded, short sides or lobes 2107. The shape of the outer perimeter wall can be symmetrical along each line of symmetry that would be present in the geometric shape. For example, a stadium shape or rounded rectangle geometrically includes two lines of symmetry due to the opposing sides being parallel and the opposing ends being identical. However, the opposing sides of a stadium shape device need not be parallel and the opposing ends can have a slightly altered shape compared to one another. The opposing elongate sides 2108 of the device can be non-parallel so that the trailing end 2102 of the stadium shaped device is narrower than the opposite leading end 2101 of the device (see FIG. 6F). The outer perimeter 2111 of this stadium shaped device would not be symmetrical along one of two lines of symmetry that would normally be present in a rectangle or stadium shape. The elongate sides 2108 of the rounded rectangle or stadium shaped perimeter need not be parallel. FIG. 6F shows elongate sides 2108 that bow outward slightly along their length such that they are not perfectly parallel as are dotted lines P, P'. The elongate sides 2108 intersect the parallel lines P, P' near the trailing end 2102 of the device and diverge out from parallel lines P, P' moving toward leading end 2101. FIG. 6F illustrates a footprint of a device highlighting a shape of its outer perimeter 2111. It should also be appreciated that other features of the device such as the awnings, haptic covers, and fixation arms can impact the lines of symmetry as well. In some embodiments, the device as a whole (including awnings, haptic covers, and fixation arms) has no line of symmetry.

The recesses 2104 formed by the awnings 2126 may project out over the anterior-facing surface of the posterior platform 2105 such that they are positioned generally opposite one another along a major axis of the rectangle and spaced to accommodate the span of the IOL 110 haptics 114. For example, the awnings 2126 may project out over the anterior-facing surface of the posterior platform 2105 on the short sides of the rounded rectangle (i.e., at the location of the lobes 2107) to accommodate the span of the IOL therebetween within the recesses 2104 along the long sides 2108.

Although the span of the recesses 2104 can accommodate the span of the IOL haptics 114, the span of the recesses may be slightly undersized compared to the span of the IOL haptics 114 so that the haptics 114 are placed under slight compression by the inner bearing surfaces of the side walls 2112. The IOL 110 can rest in a position relative to the device 2100 such that the haptics 114 are at least partially flexed. If the haptics 114 are flexed to severely due to the fit being too tight, the optic 112 of the IOL 110 can become distorted. If the haptics 114 are not in contact with the side walls 2112 due to the fit being too loose, the optic 112 of the IOL 110 may not be stable relative to the device such that it shifts and/or falls out of the device 2100. The one or more recesses 2105 can be sized to accommodate at least a portion of the IOL 110, for example, along as a thickness aspect within the Z-axis), as an arc length to provide wiggle room for IOL rotation relative to the device 2100 during implantation, or as a width providing a degree of coverage to hide the haptic edge from contacting the iris. The depth of the recesses 2104 between an inner surface of the awnings 2126 and the anterior-facing surface of the platform 2105 can be between about 0.15 mm and about 1.50 mm. The width across the platform 2105 between side walls 2112 along the minor axis can be between about 5.0 and about 11.0. The span between opposing recesses 2104 can be between about 7.5 mm and about 12.5 mm. In another implementation, the length of the platform is about 10.2 mm, the width is about 7.0 mm, and the depth is about 0.60 mm. In further implementations, the platform along the long axis of the device can have an external length of about 9.2 mm and an internal length along the same axis that is about 8.5 mm such that a thickness of the side wall is about 0.7 mm. In still further implementations, the platform along the long axis can be increased to about 11 mm and an internal length along the same axis that is about 9.8 mm. As a result, the side wall is thicker at about 0.6 mm on each side or a 1.2 mm delta when both sides are counted. The increased cavity length can provide more space within which the IOL can be manipulated that, combined with the increased side wall thickness, provides an overall length of the device that is increased. The device can be fixated through the pars plana and thus, posterior to the apex of the ciliary body, such that even if the device on the plane of the ciliary apex is too wide, there can still be space for implanting the larger IOL housing (see FIG. 6D).

Figure 9A:
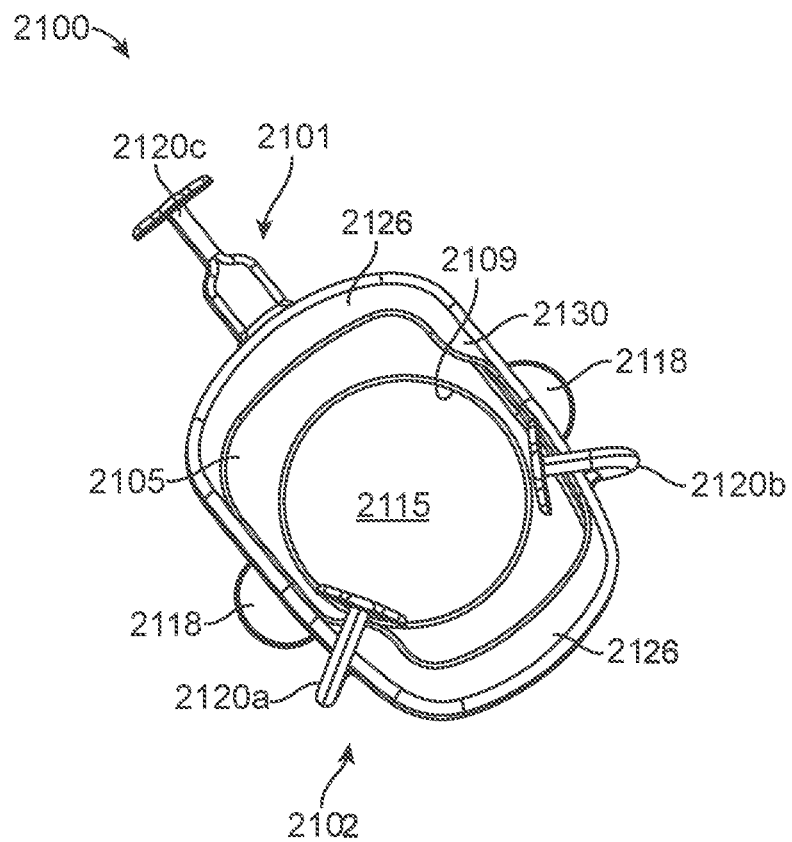
FIGS. 9A-9B shows a top down and perspective views, respectively, of an interrelated implementation of the device incorporating a plurality of trans-scleral fixation arms and a posterior stabilization feature.
Figure 9B:
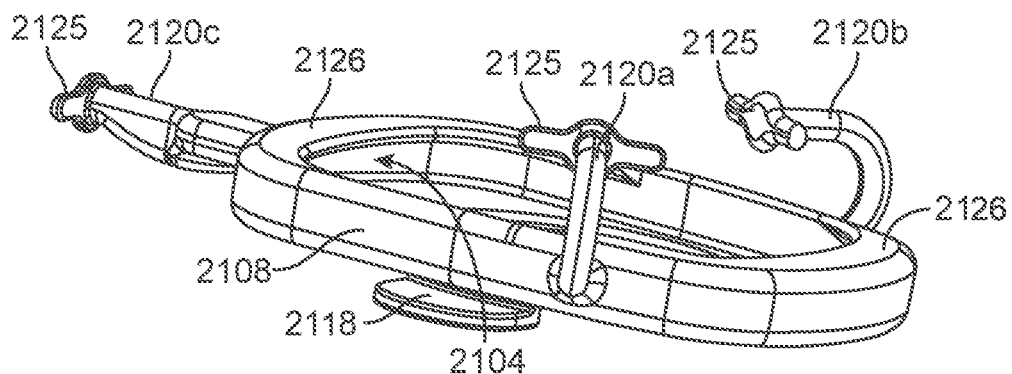

Three fixation arms 2120 can be coupled to a region of the device such as the posterior platform 2105 or region of the device that is located more anteriorly than the posterior platform 2105 such as a portion of the side wall 2112. At least one of the fixation arm 2120a, 2120b can be biased into the folded configuration as described elsewhere herein. One fixation arm 2120c can be a leading fixation arm that extends along a single axis orthogonally relative to the posterior platform 2105 so that its terminal end 2102 coupled to the anchor 2125 projects outward away from the center axis CA of the aperture 2115. The leading fixation arm 2120c can be coupled to the posterior platform 2105 at a location of a lobe 2107 and the other fixation arms 2120a, 2120b can be coupled away from the lobe 2107 of the leading fixation arm, for example, on opposite sides 2108 so that the opposite lobe 2107 projects outward between the arms 2120a, 2120b (see FIGS. 5A-5B and 5D). This arrangement can create an overall tapered shape to the posterior platform 2105 from leading end to trailing end, with the trailing end of the platform 2105 somewhat narrower than the leading end of the platform 2105. FIG. 5D and also an interrelated implementation in FIG. 9A show the posterior platform 2105 and awnings 2126 forming a chassis having a rectangular shape that has a leading end 2101 and a tapered trailing end 2102. The trailing end 2102 of the chassis between the trailing fixation arms 2120a, 2120b may be narrower than a width of the leading end 2101 of the chassis near the leading fixation arm 2120c. The trailing end 2102 of the chassis can be at least about 0.2 mm, about 0.3 mm, about 0.4 mm, about 0.5 mm, about 1.0 mm, about 1.5 mm, about 2.0 mm narrower than a width of the leading end 2101 of the chassis.

The non-circular shape of the outer perimeter 2111 may have a plurality of lobes 2107 projecting outward from a plurality of sides 2108 as described elsewhere herein. Each of the three fixation arms 2120 can extend outward from a respective one of the plurality of sides 2108. The awnings 2126 may project out over the anterior-facing surface of the posterior platform 2105 such that they are positioned generally opposite one another. A first awning 2126 may be positioned on a side 2108 near, for example, an origin 2103 of the leading fixation arm 2120c and a second awning 2126 may be positioned on a lobe 2107 between the other two fixation arms 2120a, 2120b. The span of the recesses 2104 defined by the awnings 2126 and the posterior platform 2105 is sufficient to accommodate a span of the IOL haptics 114 therebetween (see FIG. 5C).

The central opening 2115 may have a diameter as described elsewhere herein so that the optic 112 of the IOL may be supported on the anterior-facing surface of the posterior platform 2105 without the optic 112 slipping through its diameter (e.g., between about 4 mm up to about 6 mm). The IOL may be inserted within the recesses 2104 under the awnings 2126. Thus, the diameter between the first and second opposing awnings 2126 is sufficient for IOL insertion. IOLs are typically foldable and therefore the diameter between the first and second awnings 2126 can vary widely. In some implementations, the opposing awnings 2126 are fully connected to one another along the sides 2108. The opposing awnings 2126 can include extensions along each of the sides 2108 forming a complete overhanging surface above the posterior platform 2105 that defines an upper aperture 2127. The upper aperture 2127 can have a diameter that is larger than a diameter of the central aperture 2115 of the posterior platform 2105. For example, the upper aperture 2127 can be greater than about 6 mm so that the IOL can be manipulated into place and fully unfurl into position with the recesses 2104. The diameter of the upper aperture 2127 can be greater than 6 mm up to about 8 mm. The central aperture 2115 is preferably circular, but the anterior opening 2127 need not be circular. The anterior opening 2127 can have any of a variety of geometric or free-form shapes. In some implementations, the anterior opening 2127 can incorporate one or more out-croppings configured to extend over and cover selected areas of the IOL 110, as described in more detail elsewhere herein. The anterior opening 2127 can also incorporate one or more centrally-extending features to directly visualize the device 2100 through the pupil during implantation even if the pupil narrows in size mid-surgery. The centrally-extending features can project to define at least one narrower diameter around the circumference of the anterior opening 2127 that is less than about 7 mm down to about 5 mm, preferably about 6 mm.

The IOL 110 may be positioned against the posterior platform 2105 above the central aperture 2115 so that the central axis CA extending anterior-to-posterior through the central aperture 2115 extends through the optic 112 of the IOL 110. Light is permitted to pass through the aperture 2115 as well as the IOL 110 positioned on the posterior platform 2105. The central aperture 2115 can be substantially co-axial with the optical axis of the IOL 110 once the IOL is positioned against the posterior platform 2105. The central aperture 2115 has a diameter sized to allow the optic 112 of the IOL to be supported on the anterior-facing surface of the posterior platform 2105 without the IOL 110 falling through into the posterior chamber. The diameter of the central aperture 2115 avoids the posterior platform 2105 from overlapping substantially with the optic 112 of the IOL 110 so that it allows light to pass through the device without any optical disturbance as it passes towards the retina. The diameter of the aperture 2115 is designed to be generally universal for a wide range of IOL types. Conventional IOLs typically have optics with an outer diameter of 6 mm although this size can vary depending on the IOL. A central aperture 2115 having a diameter that is less than 5.0 mm down to about 4.0 mm, preferably about 4.75 mm, can be used with some IOLs. A central aperture 2115 having a diameter that is between 5.0 mm to about 6.0 mm can be used with most IOLs such that the device is nearly universal for use with any conventional haptic-stabilized IOL. The minimum inner diameter of the aperture 2115 can be greater than about 3.0 mm, greater than about 3.5 mm, greater than about 4.0 mm, greater than about 4.5 mm, greater than about 5.0 mm, greater than about 5.5 mm, greater than about 6.0 mm, greater than about 6.5 mm, up to about 7.0 mm, up to about 8.0 mm, up to about 9.0 mm, up to about 10 mm, up to about 15 mm, and any range in between. The central aperture 2115 inner diameter can be between about 4 mm to about 8 mm, or between about 4 mm up to 6 mm. The inner diameter of the central aperture 2115 can approach the outer diameter of a common IOL optic 112, for instance at least about 5.5 mm or 6.0 mm. In an implementation, the minimum inner diameter of the aperture 2115 can be small enough to create a pin-hole effect to create an extended depth of focus. In this implementation, the inner diameter of the aperture 2115 can be less than about 3.0 mm down to about 1.5 mm, including 2.0 mm and 2.5 mm inner diameter.

The aperture diameter can be selected to maintain a particular hoop strength to limit the risk of accidentally passing the IOL through the aperture 2115 upon implantation. Smaller aperture diameters can increase the hoop strength compared to larger aperture diameters. A stiffer IOL housing limits distortion of the aperture 2115 when placed under tension and/or compression. The increased stiffness of the IOL housing can also facilitate easier insertion of the IOL following fixation in the eye.

The posterior lens support structure or platform 2105 of the device 2100 can have an anterior-facing, lens-support surface directed towards a front of the eye when the platform 2105 is in use and a posterior-facing surface directed towards a back of the eye against the capsular bag when the platform 2105 is in use. The posterior platform 2105 can provide several functions. The posterior platform 2105 can have a surface (the anterior-facing surface or posterior-facing surface) forming a stable platform against which an IOL 110 can be placed during use. The posterior platform 2105 can take the place of a capsular bag and can set the effective lens position of the IOL 110 within the eye. The geometric and mechanical function of the posterior platform 2105 not only supports the IOL 110 when in use, it can also serve to assist in the centration of an IOL 110 in the case of an asymmetric eye or asymmetric surgical procedure. The posterior platform 2105 provides artificial anterior capsule support for the IOL and a stable platform structure in the eye recapitulating the native anterior capsule. The posterior platform 2105 can be substantially flat or planar between the anterior-facing surface and the posterior-facing surface. The thickness of the posterior platform 2105 between the anterior-facing surface and the posterior-facing surface can be minimized while still providing sufficient support to the IOL. The thickness can be between about 0.02 mm and 1.5 mm, or between about 0.5 mm and 1.0 mm. The posterior platform 2105 can be about 0.2 mm. The thickness of the posterior platform 2105 can be thinner than 0.2 mm and still provide sufficient support for an IOL. For example, the posterior platform 2105 can be reinforced with a stiffer material to reinforce it and limit its distortion despite being only 0.2 mm thick. Alternatively, the posterior platform 2105 can have an increased thickness (e.g., about 0.50 mm up to about 1.0 mm) and the material thickness sufficient to limit distortion of the device even when placed under tension and/or compression. Increased stiffness of the lens support structure can facilitate easier insertion of the IOL following implantation. This can additionally increase the hoop strength of an aperture 2115 extending through the posterior platform 2105 as described in more detail below, which can limit the risk of the IOL accidentally passing through the aperture 2115 upon implantation of the IOL in the device 2100. Reinforcement of the devices described herein to avoid distortion and risk of the IOL passing through the device is discussed in more detail below.

FIGS. 6A-6C illustrate an implementation of the device 2100 incorporating a plurality of fixation arms 2120. The posterior platform 2105 and the side walls 2112 can be reinforced due to increased material thickness of those regions of the device. FIG. 6B is a cross-sectional view of the device 2100 in FIG. 6A taken along arrow B-B showing an increased cross-sectional thickness of the posterior platform 2105 (e.g., about 0.50 mm) and an increased thickness of the side wall 2112 (e.g., about 0.35 mm up to about 0.60 mm or up to about 1.5 mm). The increased stiffness of the lens support structure provided by the increased material thickness can facilitate easier insertion of the IOL following implantation. The increased material thickness can additionally increase the hoop strength of the central aperture 2115 extending through the posterior platform 2105, which can limit the risk of the IOL accidentally passing through the aperture 2115 upon implantation of the IOL in the device 2100.

The diameter Da of the central aperture 2115 also can be reduced to increase the hoop strength of the posterior platform 2105. For example, the central aperture 2115 can have a diameter that is less than about 5.0 mm down to about 4.0 mm, preferably about 4.75 mm so as not to interfere with the optics of the IOL. As discussed elsewhere herein the material of one or more regions of the device can be translucent or opaque for visualization purposes. A platform 2105 that is non-transparent would interfere with the optics of the IOL unless it incorporated a central aperture 2115 to allow light to pass through the IOL unhindered. Thus, the central aperture 2115 is selected to have a size that is large enough to prevent significant interference, but small enough to support the IOL and prevent the optic from falling through the aperture 2115.

The aperture size alone or in combination with the posterior platform thickness and/or side wall thickness can resist distortion of the device that could otherwise be caused by the tensioned fixation arms. The aperture diameter can also limit the risk of accidentally passing the IOL through the aperture 2115 upon implantation due to not just the size, but the increased hoop strength of the aperture 2115. Smaller aperture diameters can increase the hoop strength compared to larger aperture diameters. A stiffer IOL housing limits distortion of the aperture 2115 when placed under tension and/or compression. The increased stiffness of the IOL housing can also facilitate easier insertion of the IOL following fixation in the eye.

The thicker side walls 2112 of the device can reduce the space within which the IOL can be manipulated. To provide more space for IOL manipulation within the recess 2104, the external length along the long axis of the device can be increased to accommodate the thicker side walls 2112 and provide an internal length of the recess along the same axis for IOL insertion and manipulation (see FIG. 6C). The posterior platform 2105 along the long axis of the device can have an external length $L_e$ of about 9.2 mm and an internal length $L_i$ along the same axis that is about 8.5 mm such that a thickness of each side wall is about 0.35 mm. To provide additional reinforcement to the device 2100, the side wall cross-sectional thickness can be increased to about 0.60 mm. The platform along the long axis can be increased to about 11 mm such that an internal length $L_i$ along the same axis is about 9.8 mm. The increased cavity length can provide more space within which the IOL can be manipulated that, combined with the increased side wall thickness, provides an external length $L_e$ of the device that is increased. The longer device can be fixated through the pars plana and thus, posterior to the apex of the ciliary body, such that even if the device on the plane of the ciliary apex is too wide, there can still be space for implanting the larger IOL housing (see FIG. 6D). The short axis width can be impacted by the thicker side walls 2112 as well (see FIG. 6B). The posterior platform 2105 along the short axis of the device can have an external width $W_e$ of about 6.60 mm and an internal width Wi along the same axis that is about 5.90 mm such that a thickness of each side wall 2112 is about 0.35 mm. Each side wall 2112 cross-sectional thickness can be increased to 0.60 mm as discussed above. The platform 2105 along the short axis can be increased to about 7.4 mm such that an internal Width Wi along the same axis is about 6.2 mm.

The devices described herein are used to support an IOL within an eye. The devices described herein can incorporate one or more features configured to engage with at least a portion of the capsular bag, if present, for centration or fixation in the eye. The devices described herein can incorporate one or more features configured to fix and center the device in the eye even where capsular bag support is lacking, for example, due to iatrogenically compromised lens support during the time of surgery or as a late complication of a previous surgery. Whether there is capsular bag support or not, visualization of the device during implantation is important. In some implementations, the curved or biased fixation arms 2120 can allow for direct visualization of the device through the pupil such that the arms 2120 may be more readily grasped, which is particularly useful during externalization and fixation of the device within the eye. One or more of the fixation arms 2120 can be non-transparent so that they are more easily visualized through the pupil during implantation. In some implementations, only a portion of the fixation arm 2120 designed to project out from behind the iris so as to be visualized directly through the pupil is non-transparent.

The devices described herein can be viewed directly through the pupil even if there are no fixation arms 2120. In some implementations, the anterior geometry of the device 2100 is modified to improve anterior visualization through the pupil. For example, the anterior awnings 2126 can be sized and shaped to have at least a portion that projects inwardly or more centrally than an adjacent portion (e.g., towards a center axis extending through the central aperture 2115) such that the centrally-projecting portion of the awning 2126 is visible anteriorly through a dilated pupil without being substantially blocked by the iris. The awnings 2126 can be formed of a non-transparent material so as to improve this direct visualization. The geometry of the awnings 2126 can be visible relative to the IOL being implanted without impacting the optics of the IOL. This can increase the likelihood that the IOL will be properly secured within the recess 2104 of the device 2100. Post-operative lens dislocation can occur when the IOL haptic is left in a position that is anterior to the device 2100. Uncertainty of lens position can increase surgical time and the potential for tissue trauma as surgeons manipulate the device and/or tissue to confirm lens position relative to the device. Direct visualization of the device 2100 through the pupil lessens this uncertainty, particularly where intra-operative pupil diameter decreases mid-surgery.

FIG. 6A illustrates an example of the anterior awnings 2126 having a centrally-projecting visualization feature 2117. The visualization feature(s) 2117 can project centrally to allow for direct visualization of the device 2100 while avoiding substantially interfering with optics of the IOL after implantation by having a minimum inner diameter of about 4 mm. The visualization features 2117 can project sufficiently towards a central axis of the central aperture 2115, for example, at least about 2.5 mm to about 3 mm away from the central axis so that the features 2117 are visible through the pupil during an implantation procedure. The centrally-projecting visualization feature 2117 can narrow an inner dimension of the anterior opening 2127, for example, a distance $D_l$ of the anterior opening 2127 along the long axis of the device (see FIGS. 6B and 6C) while the overall dimensions of the anterior opening 2127 remain relatively large for accessing the internal recess 2104. The distance $D_l$ along the long axis of the device between the central-most edges of the anterior opening 2127 formed by the opposing awnings' visualization features 2117 can be at least about 7.0 mm down to about 5.0 mm, preferably about 6.0 mm. This distance $D_l$ is selected to be larger than the diameter Da of the central aperture 2115. For example, the diameter $D_a$ of the central aperture 2115 can be about 4.75 mm and the distance $D_l$ between the visualization features 2117 can be about 5.00 mm, about 5.25 mm, about 5.50 mm, about 5.75 mm, about 6.00 mm up to about 7.00 mm. Thus, even where the awnings 2126 incorporate the one or more visualization features 2117, the dimension of the anterior opening 2127 defined by the features 2117 can be larger than the diameter $D_a$ of the central aperture 2115.

The features 2117 shown in FIG. 6A projects centrally away from the leading fixation arm 2120c such that coverage provided by the awning 2126 near this arm is greater than coverage provided by the awning 2126 near the ends or corners of the device 2100 where the short sides 2107 meets the long sides 2108. The pair of features 2117 can therefore be positioned on the short sides 2107 of the device and project along the long axis. The visualization features 2117 can alternatively be positioned on the long sides 2108 of the device and project along the short axis (i.e., turned 90 degrees relative to what is shown in the figure). The visualization features 2117 can be located anywhere around the perimeter of the anterior region of the device so long as they extend sufficiently inward so as to be visible out from behind the iris fringe when the device is positioned in the eye. Discrete visualization features 2117 avoid narrowing the anterior opening 2127 around its full circumference providing anterior visualization without significantly impairing the user's ability to position the IOL through the anterior opening 2127 within the recess 2104 anterior to the platform 2105.

The discrete visualization features 2117 in combination with the one or more junction covers 2130 create a free-form shape to the anterior opening 2127. The undulating inner perimeter forming the free-form shape of the anterior opening 2127 can be relatively larger along at least one direction (e.g., between the long sides) and relatively smaller along another direction (e.g., between the short sides). The free-form shape also can create an even larger distance between edges of the perimeter in a particular orientation around the anterior opening 2127 that can be leveraged for insertion of the IOL into the recess. FIG. 6E illustrates the free-form shape of an anterior opening 2127 of the device of FIG. 6A relative to the circular shape of the inner perimeter 2109 defining the posterior opening 2115. As discussed above, the distance $D_I$ between the visualization features 2117 projecting inwardly from the short sides 2107 of the device can be less than, for example, a distance Ds between the long sides 2108 of the device. The distance $D_I$ between the visualization features 2117 as well as the distance Ds between the long sides 2108 of the device can be larger than the diameter $D_a$ of the central aperture 2115. For example, the undulating free-form shape of the anterior opening 2127 can also define a distance $D_c$ corner-to-corner across the center of the central aperture 2115 that is larger than the distance $D_I$ between the visualization features 2117 and also larger than the distance $D_s$ between the long sides 2108 of the device. The IOL can be inserted (or removed) through the anterior opening 2127 taking advantage of the asymmetrical free-form shape of the anterior opening 2127 by orienting the widest dimension of the IOL to slide between the widest part of the anterior opening 2127 (i.e., along line Dc). Once inserted through the anterior opening 2127, the IOL can be rotated or adjusted around the visual axis to orient the IOL within the recess.

The IOL can be inserted within the device in a variety of ways. The IOL can be injected from an IOL injector that is located anterior to the device so that release of the IOL from the injector positions the IOL on top of the device prior to a user manipulating the device to insert it through the anterior opening 2127. The IOL can be allowed to unfurl prior to inserting the IOL through the anterior opening 2127 of the device. In other methods, the IOL can be manipulated into the device while it is at least partially folded. The IOL can also be injected by the IOL injector through the anterior opening 2127 so that at least one haptic of the IOL is injected directly into the chassis of the device. The IOL can be allowed to unfold while at least partially implanted within the device and then the remainder of the lens manipulated into position within the device. The IOL can be manipulated by a user through one or more trocar cannulae as discussed elsewhere herein.

Implementations of the lens support structure may have an outer perimeter wall of various geometrical shapes, axes and symmetries or non-symmetries. For example, the device may have a long axis and a short axis, two shorter sides and two longer sides. FIG. 6F illustrates an outer perimeter wall 2111 having a long axis A and a short axis Z with two longer sides 2108 and two shorter sides 2107. The shorter sides may be straight and parallel to one another, straight and slightly angled with respect to one another, or at least partially or entirely curved outwardly away from the central axis of the device that passes through the aperture. The longer sides may also include both a straight portion and a portion curved outwardly away from the device's central axis. If a longer side includes both a straight portion and a slightly curved portion, then the slightly curved portion may be adjacent the junction between the outer perimeter and the fixation arm associated with the longer side. FIG. 6F shows a region of the elongate sides 2108 on the trailing end 2102 of the device is curved and does not lie parallel to straight lines P, P'. A region of the elongate sides 2108 on the leading end 2101 of the device straightens out so that this segment does lie substantially parallel to straight lines P, P'. Thus, each elongate side 2108 can have both straight and curved portions or can be completely straight or can be completely curved. The trailing end 2102 of the device shown in FIG. 6F is also narrower than the leading end 2101 due to the elongate sides 2108 not being perfectly parallel along their length.

The longer sides may be parallel or nominally parallel (in the case of slight curvature of at least a portion of the longer sides), to produce an outer perimeter akin to a rectangle, with shorter, straight or rounded sides joined to the longer sides at rounded corners. Or the longer sides may be partially or entirely slightly angled or nominally angled with respect to one another (in the case of slight curvature of at least a portion of the longer sides), to produce an outer perimeter akin to a slightly tapered trapezoid, with shorter straight or rounded sides joined to the longer sides at rounded corners. As used herein, the term "about" or "nominally" means a range of values including the specified value, which a person of ordinary skill in the art would consider reasonably similar to the specified value. In aspects, about or nominally means within a standard deviation using measurements generally acceptable in the art. In aspects, about or nominally means a range extending to +/−10% of the specified value. In aspects, about or nominally includes the specified value.

A radius of curvature of at least a portion of each longer side may be much larger than a radius of curvature of a shorter side, thereby producing a much more gradual or subtle bowing of the longer side compared to the degree of curvature of the shorter side. The corners may have a radius of curvature smaller or much smaller than a radius of curvature of either the longer sides or shorter sides, thereby providing a lens support structure with an outer perimeter having at least two or three or more different radii of curvature to produce the desired outer perimetrical shape. In a preferred embodiment, a lens support structure has longer sides with a large radius of curvature to produce very slight outward bowing (e.g., about 35 mm up to a flat line), shorter sides with a smaller radius of curvature by at least one order of magnitude compared to the radius of curvature of the longer sides, to produce more exaggerated bowing for the shorter sides, and rounder corners having a much smaller radius of curvature (e.g., no radius up to about 3.5 mm or about 5.0 mm).

The lens support structure may have an outer perimeter that is symmetrical with respect to the long axis of the device such that each side of the outer perimeter is a mirror-image of the other about the long axis and is also symmetrical with respect to the short axis of the device, or may have an outer perimeter that is symmetrical with respect to the long axis of the device, but which is non-symmetrical with respect to the short axis of the device.

A lens support structure may have opposed awning on opposite sides of the central axis of the device that passes through the central aperture. Each of these awnings forms a recess underneath the awning for securing one of an IOL's haptics when an IOL engages the lens support structure. As disclosed herein, each such awning may have a contour formed of various inwardly projecting portions, including, for example, a centrally-projecting visualization feature that extends sufficiently inwardly towards the central axis so as to be visible behind an iris during implantation of the device in the patient's eye, and/or one or more additional projections extending inwardly so as to at least partially cover a portion of an IOL haptic when the haptic is placed underneath the awning. In some embodiments, the awnings are arranged such that each awning is a mirror-image of the other around the device's short axis and symmetrical with respect to the short axis. In these cases, the entire lens support device may be symmetrical with respect to either or both of the device's long axis and short axis. Alternatively, the awnings may be arranged such that they are non-symmetrical with respect to either or both of the device's long axis and short axis, and may be of such configuration that no axis of symmetry exists within the device for the awnings. In addition, when such awnings are coupled with the various outer perimetrical shapes available for the device, a lens support device may have outer perimetrical symmetry about one or both of the device's long axis and short axis, and also have two awnings that are either symmetrical about one or both of the device's long axis and short axis, or which are non-symmetrical with respect to both long and short axes.

The lens support structure may have an outer perimeter shape that has one configuration with the device at rest before implantation, and a second, different geometrical configuration when the structure is implanted and under tension. For example, with the device at rest, in a device having two shorter sides and two longer sides, the entire length of, or a portion of, each of the longer sides may be slightly angled towards one another so that the lens support body is slightly tapered. When such a slightly tapered device is made of suitable dimensions and suitably flexible materials, the device, when placed under tension through implantation of the fixation arms into contact with the sclera of the eye, the outer perimeter geometrical shape may change from a slightly tapered configuration to a less slightly tapered configuration or a configuration more closely akin to a rectangle, with longer sides that are closer to being, or are actually or nominally, parallel. This modification of outer perimetrical shape may be helpful to create the desired shape of the lens support structure when implanted, when the device is such that tensioning tends to distort the original at-rest shape of the device.

Figure 7:
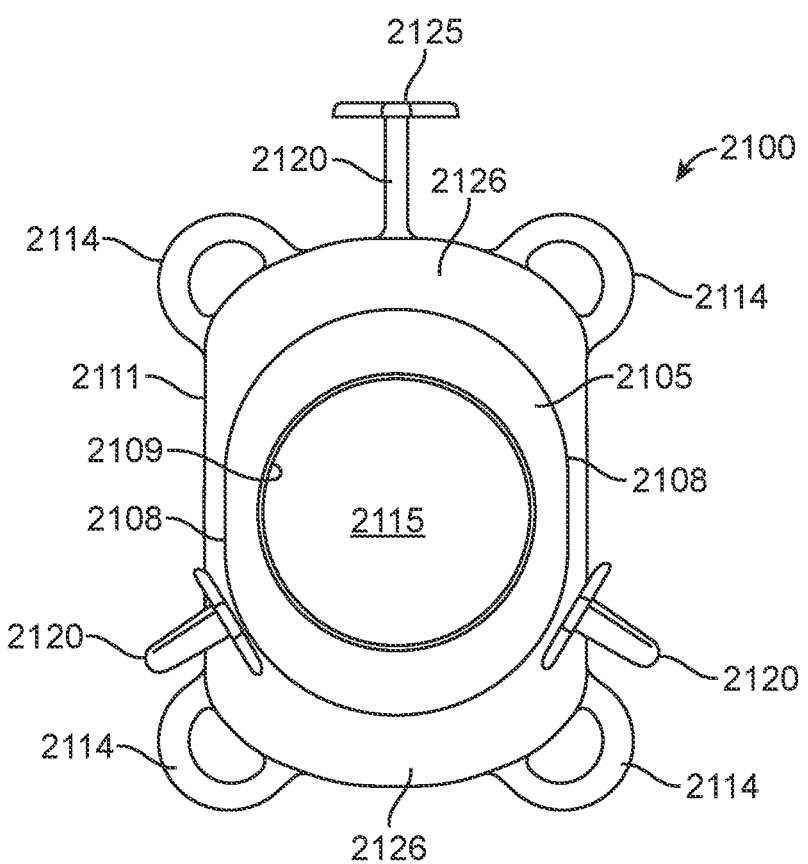
FIG. 7 shows another implementation of a device having awnings configured to accommodate an IOL.

FIG. 7 shows an interrelated implementation of a device 2100 that incorporates a plurality of bumpers 2114 to assist in the centration of the device 2100 within the eye, preferably within the posterior chamber of the eye. The device 2100 can include four bumpers 2114 projecting outward from each corner of the posterior platform 2105. The bumpers 2114 can be substantially ring-shaped or incomplete rings having a C-shape. In some implementations, the bumpers 2114 can be angled relative to the platform 2105 so that the outer region is positioned more anteriorly than an inner region thereby providing posterior bias for the device 2100. The ring-shaped bumper 2114 can include a first end and a second end that are both coupled to the posterior platform 2105. The C-shaped bumper 2114 can have one end coupled to the posterior platform 2105 and the second end that remains separated from the posterior platform 2105. Regardless, the shape or configuration, the bumper 2114 can urge the device 2100 away from the adjacent eye tissue. In some implementations, the bumper 2114 can deform slightly upon coming into contact with a ciliary structure. The deformation can be temporary so that the bumpers return to their original shape urging the device 2100 back towards a centralized position within the eye. As with other implementations described herein, the device 2100 can include a plurality of fixation arms 2120 including at least one that is biased into a folded configuration. Preferably, the bumpers 2114 avoid remaining in contact with the ciliary structures once the device 2100 is implanted. The bumpers 2114 can act as a guide during externalization of the fixation arms 2120. The bumpers 2114 can project sufficiently away from the outer perimeter 2111 of the posterior platform 2105 such that they abut against the ciliary body and/or within the ciliary sulcus to prevent displacement within the Z-plane to maintain proper alignment between the central aperture 2115 and the eye's visual axis during fixation.

The devices described herein may be implanted into the posterior chamber of an eye lacking an intact capsular bag. As described elsewhere herein, prior to insertion into the posterior chamber, at least one of the at least three fixation arms can be biased towards a linear configuration and at least a second of the at least three fixation arms can be biased towards a folded configuration. The folded configuration includes the origin portion of the fixation arm extending away from the posterior platform, a central portion of the fixation arm having a bend, fold, or curve so that the anchor of the terminal end portion can be then positioned over or under at least one of a portion of the posterior platform and a portion of the central opening. Once the device inserted into the posterior chamber, at least a portion of the fixation arm in the folded configuration can be visualized through the pupil. The anchor of the straight fixation arm can be grasped and externalized through and over a first portion of the sclera. The anchor of a curved fixation arm can be grasped, unfolded, and externalized through and over a second portion of the sclera. A third of the fixation arms can then be grasped, tensioned, and externalized through and over a third portion of the sclera to locate and stabilize the device within the posterior chamber of the eye.

In an interrelated implementation, the device 2100 can be positioned with a majority of the device located anterior to the capsular bag and supported by the anterior segment of the bag rather than trans-sclerally fixated arms. The most common treatment for aphakia caused by removal of a cataractous lens is placement of an IOL within the native lenticular capsular bag. The capsular bag, which has an anterior component and a posterior component creating an inner chamber, is supported by zonules, thus providing a stable structure for IOL support. Typical IOLs include an optic and one or more haptics that support the optic within the eye. The design of the IOL largely dictates where the IOL may be implanted in the eye. For example, one-piece IOLs such as multi-focus, toric, and accommodating IOLs are sometimes preferred by both surgeons and patients. These premium lenses are not typically suitable for implantation within the sulcus due to their haptic edge sharp geometries and greater anterior-to-posterior haptic thickness, which can cause damage to the iris. However, in some cases, implantation within the bag is not desirable, for example, due to a torn or missing anterior or posterior capsule or zonules.

The devices described herein can be implanted into the posterior chamber of the eye and fixed atop the anterior capsule to stably hold IOLs of all designs (one-piece or multi-piece IOLs) with a variety of haptic and optical designs to provide a reliable refractive result. The devices described herein can incorporate features specifically designed to accommodate toric IOLs by maintaining IOL orientation. The devices also allow for posterior segment placement that greatly reduces risk of damage to iris, anterior chamber angle, or cornea. Implantation posterior to the iris and cornea eliminates or reduces risk of corneal injury, iris bleeding and glaucoma. The devices described herein reduce the risk of complications compared to current technologies such as ACIOL, Iris-sutured lens, or Scleral-sutured lens, or to placement of commercially-available IOLs in the ciliary sulcus. The devices described herein provide a full range of IOL options to surgeons and patients.

In some implementations, the device can incorporate one or more stabilization features, including bumpers configured to extend towards the ciliary structures or stabilization feature configured to engage with at least a portion of the capsular bag, particularly within the capsulorhexis. The stabilization features can provide secure positioning relative to the bag and/or the ciliary sulcus to ensure the device remains fixed against the anterior segment of the bag.

Figure 8A:
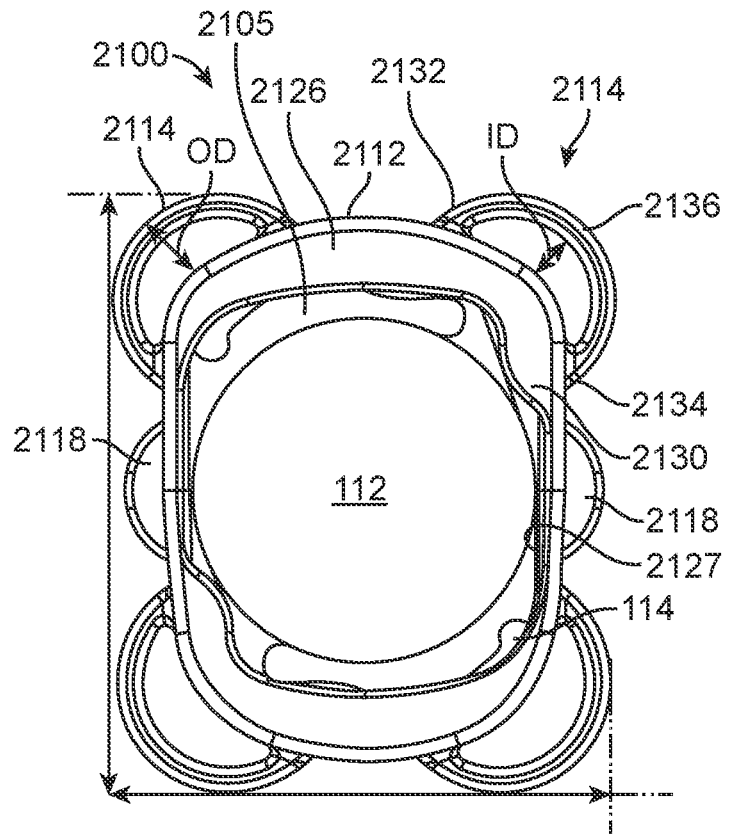
FIGS. 8A-8B show top down and perspective views, respectively, of an implementation of the device incorporating a plurality of radially extending bumpers and a posterior stabilization feature.
Figure 8B:
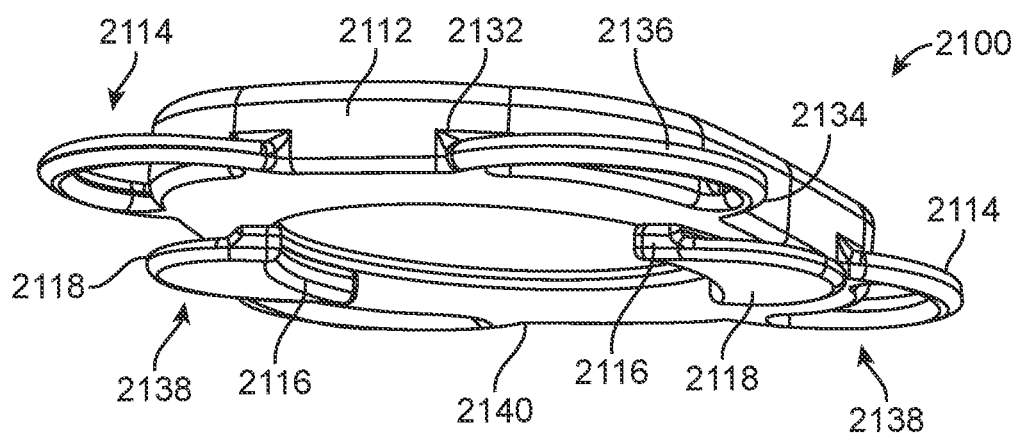
Figure 8C:
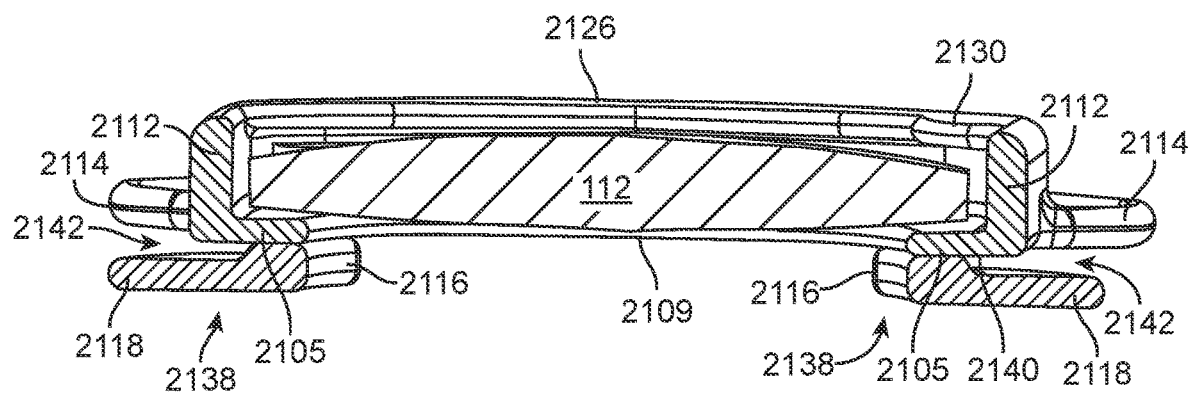
FIG. 8C is a cross-sectional view of the device of FIG. 8A.

FIGS. 8A-8C show an implementation of the device 2100 without fixation arms that is configured to be implanted within an eye having at least an anterior segment of the bag present. The device 2100 can have a plurality of bumpers 2114 as discussed above with regard to FIG. 7. The device 2100 can also include a stabilization feature 2138. The device 2100 need not incorporate both bumpers and stabilization features, but can incorporate one or the other. The posterior platform 2105 has a rounded rectangle shape with four bumpers 2114, each projecting outward from a perimeter of the platform 2105 near a corner of the rectangle. The wings of the second portion 2118 of the posterior stabilization feature 2138 extend outward from the elongate sides 2108 between the bumpers 2114. In this implementation, the wings of the second portion 2118 have a shape that is circular or oval, but it should be appreciated that any of a variety of shapes are considered. FIG. 8B shows a perspective view of the posterior side of the device 2100. The bumpers 2114 project radially outward so that the entire bumper 2114 is generally within a single plane that is parallel to the posterior-facing surface of the platform 2105. The bumpers 2114 can be angled relative to the posterior-facing surface of the platform 2105 as described above so that the middle portion 2136 is positioned more anteriorly than the ends 2132, 2134. The bumper 2114 ends 2132, 2134 are also coupled to a more posterior region of the side walls 2112. The bumper 2114 ends 2132, 2134 may also be coupled to a more anterior region of the side walls 2112. The implementation shown in FIG. 8A also has four bumpers 2114 with each bumper 2114 projecting outward from a corner of the rectangular shaped body portion. It should be appreciated that the device can include two bumpers 2114 projecting outward over the short ends 2107 of the rectangle so that a first end 2132 is coupled to a side wall 2112 near a first elongate side 2108 and a second end 2134 is coupled to a side wall 2112 near the opposite elongate side 2108 so that the middle portion 2136 extends around an entire short side 2107.

Figure 8D:
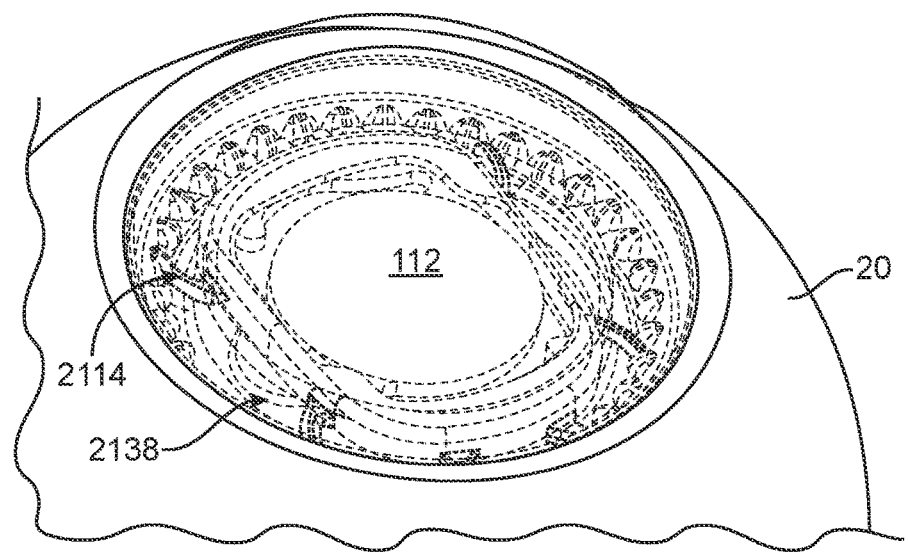
FIG. 8D is a perspective view of the device of FIG. 8A implanted in an eye.

The posterior stabilization feature 2138 can project posteriorly from the posterior-facing surface 2140 of the posterior platform 2105 so that a plane of the wings 2118 is posterior to a plane of the bumpers 2114. This allows for the wings 2118 of the posterior stabilization feature 2138 to be positioned posterior to the anterior segment 35 of the capsular bag while the bumpers 2114 are capable of inserting within the ciliary sulcus. FIG. 8D is a perspective view of the device of FIG. 8A implanted in an eye visualized through the pupil with the bumpers 2114 positioned within the ciliary sulcus and the stabilization feature 2138 positioned posterior to the anterior segment of the capsular bag. The space 2142 between the wings 2118 and the posterior facing surface 2140 of the posterior platform 2105 can receive the anterior segment within it so that the capsulorhexis 40 surrounds the first portions 2116 of the posterior stabilization feature 2138. The IOL 110 is shown positioned within the body portion, which forms a partial lens housing for the IOL. The optic 112 of the IOL 110 is shown positioned between side walls 2112 and against the anterior-facing surface of the posterior platform 2105 so the optic 112 of the IOL 110 covers the central aperture 2115. The posterior surface 2140 of the posterior platform 2105, the posterior stabilization feature 2138, and the IOL 110 covering the central aperture 2115 can create a barrier between the posterior chamber and the vitreous. The anterior-facing surface of the awning 2126 is positioned posterior to the iris 10. Preferably, the awning 2126 does not contact the iris 10, however, the smooth external surfaces of the awnings 2126 are designed so that in case of contact the iris 10 does not experience damage or irritation. The junction cover 2130 provides additional coverage of the haptic 114 where it forms a junction 115 with the optic 112 of the IOL 110 preventing this region from coming into contact with the iris 10.

Figure 10:
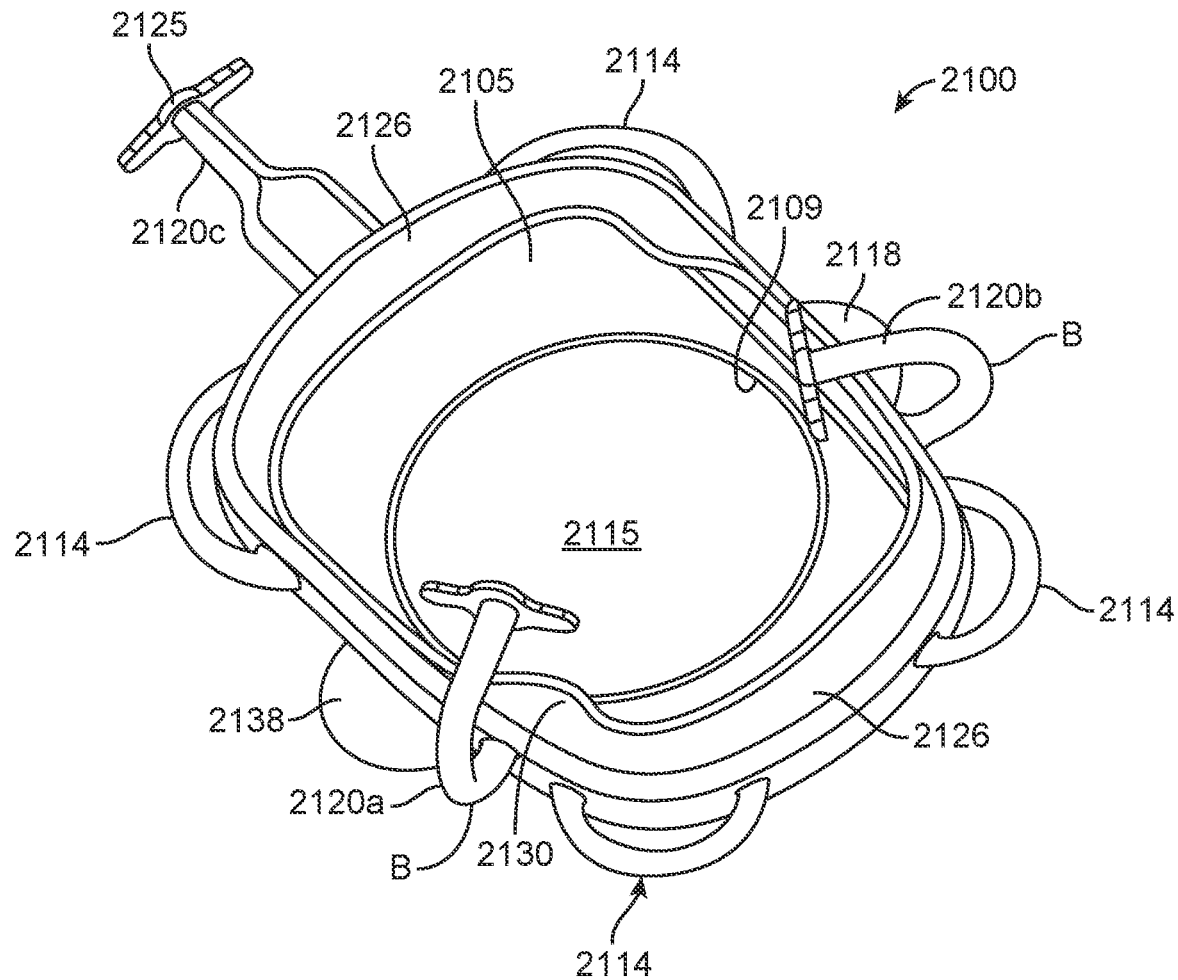
FIG. 10 shows a perspective view of an interrelated implementation of the device incorporating a plurality of trans-scleral fixation arms, a plurality of bumpers, and a posterior stabilization feature.

The devices described herein can incorporate any of a variety of combinations of stabilization features including trans-scleral fixation arms, bumpers, and/or posterior stabilization features. The devices shown in FIGS. 1-4 and also FIGS. 5A-5D, 6A-6D, 7, 9A-9B, and 10, for example, incorporate trans-scleral fixation arms. These devices can additionally incorporate one or more bumpers and/or posterior stabilization features configured to engage the anterior capsulorhexis. The device shown in FIG. 7 incorporates trans-scleral fixation arms and a plurality of bumpers. The device of FIG. 7 can additionally or alternatively incorporate a posterior stabilization feature. The device shown in FIGS. 8A-8C incorporate a plurality of bumpers and posterior stabilization features. The device of FIGS. 8A-8C can additionally or alternatively incorporate one or more trans-scleral fixation arms. The device of FIGS. 9A-9B incorporate a plurality of trans-scleral fixation arms and a posterior stabilization feature. The device of FIGS. 9A-9B can additionally or alternatively incorporate one or more bumpers. FIG. 10 illustrates a device incorporating a plurality of fixation arms, a plurality of bumpers, and a posterior stabilization feature.

Delivery Devices

The lens support devices described herein can be implanted using any of a variety of delivery devices. As will be described in more detail below, at least a portion of the delivery device can remain at least partially inside the eye, for example an insertion tool may remain in the eye even after retraction of the injector assembly. This can be particularly useful in eyes where there is insufficient or no capsular bag support. At least a portion of the delivery device can support the lens support device upon injection of the lens support device from the delivery device as the capsular bag would otherwise do during more conventional surgeries where the capsular bag is intact. This makes the delivery devices, which will be described in more detail below, particularly useful for eyes without sufficient capsular or zonular support. The delivery devices are not limited by the lens support devices being delivered. The delivery devices described herein can be used to deliver any of a variety of lens support devices including devices described herein as well as those described in U.S. Patent Publication No. 2021/0338416, filed Aug. 7, 2020, which is incorporated by reference herein. As discussed above, the lens support devices can be configured to anchor trans-sclerally creating an artificial capsule for the intraocular lens being implanted or may also avoid contact with the sclera. The lens support devices delivered by the delivery devices described here can engage with one or more of a portion of the capsular bag, such as an anterior capsulorhexis, the sclera, the ciliary sulcus, etc.

Figure 12A:
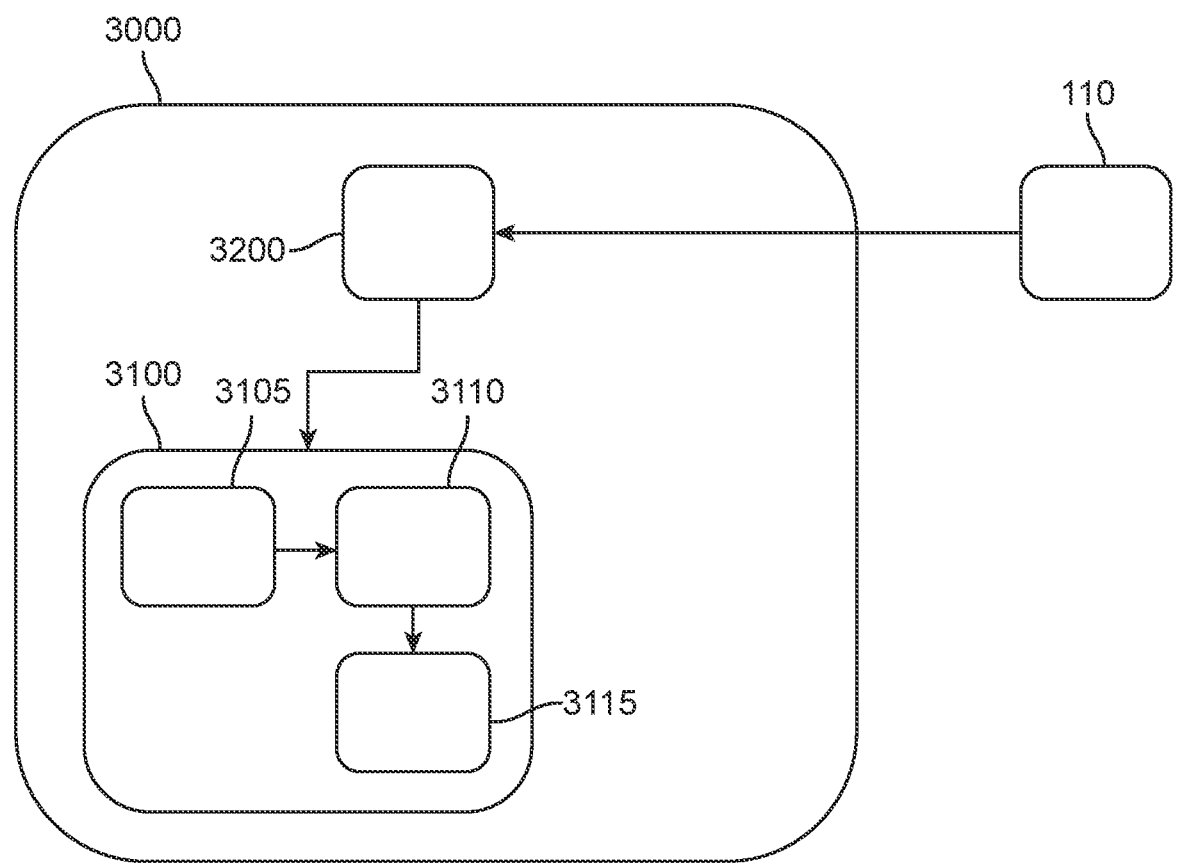
FIG. 12A is a schematic box diagram of a conventional IOL delivery system.
Figure 12B:
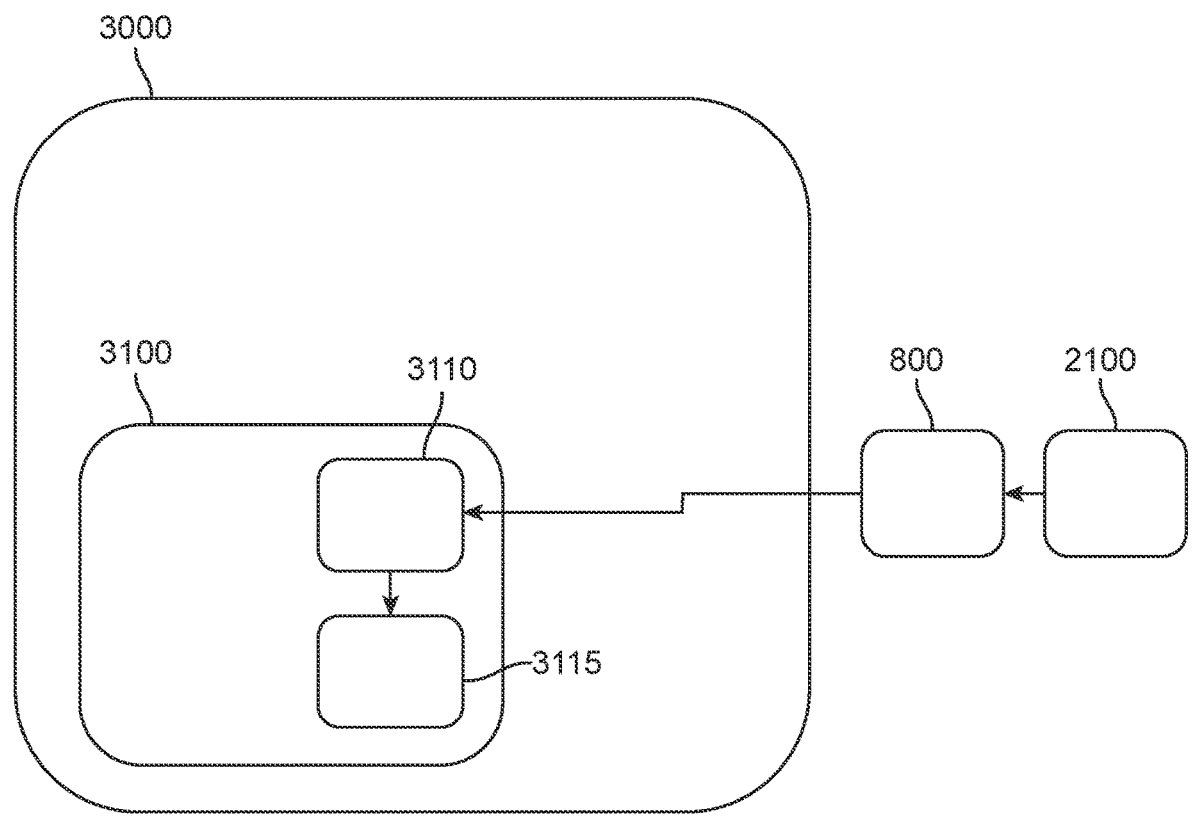
FIG. 12B is a schematic box diagram of an insertion tool for delivering a lens support device used in combination with an IOL delivery system injector.

The lens support devices described herein can be implanted within the eye using an insertion tool 800 that is compatible with any of a variety of injectors used for implanting IOLs (see FIGS. 11A-11B). FIG. 12A is a box diagram illustrating features of a conventional IOL delivery system 3000 having an IOL injector 3100 configured to receive a cartridge 3200 holding an IOL 110 inside of it. The injector 3100 can further include a plunger 3105 movable relative to a distal tip 3110 that is used to urge the IOL 110 out of the cartridge 3200 when the cartridge 3200 is installed with the injector 3100. The IOL 110 can be advanced from the cartridge 3200 through the distal tip 3110 out the distal opening 3115 of the distal tip 3110 and into the eye. Conventional plungers 3105 can enter the eye, but remain attached to the injector hand piece so that the plunger 3105 is retracted with the injector 3100 as the injector 3100 is removed from the eye. FIG. 12B illustrates the insertion tool 800 for delivery of a lens support device 2100 using an IOL delivery system 3000 in which the plunger does not remain attached and can remain within the eye even after removal of the injector 3100 from the eye. The insertion tool 800 can act as a modified plunger in the injector 3100 because the insertion tool 800, along with the lens support device 2100, can be advanced through the distal opening 3115 of the distal tip 3110 of the injector 3100 into the eye. The lens support device 2100 is deployed and remains at least partially in the eye even when the injector 3100 is retracted. The lens support devices described herein can be deployed in the eye using the insertion tool 800 interfaced with an injector 3100 of an IOL delivery system 3000 as shown schematically in FIG. 12B. Alternatively, the lens support devices described herein can be deployed in the eye using the insertion tool 800 alone without an injector 3100 of an IOL delivery system 3000. Each implementation will be described in more detail below.

Again with respect to FIGS. 11A-11B, the insertion tool 800 can have a proximal end region 805, a distal end region 810, and an intermediate region 815 connecting the distal end region 810 to the proximal end region 805. The intermediate region 815 can be a generally planar, elongate segment having a lower surface 817 and an upper surface 819 that forms a platform for manipulating and transmitting a force against the lens support device 2100. The thickness Ti of the intermediate region 815 between its lower surface 817 and its upper surface 819 can be less than a corresponding thickness Tp or Td of either the proximal end region 805 or the distal end region 810. The intermediate region 815 is designed to transmit a force from the proximal end region 805 to the distal end region 810 while occupying minimal space in the injector 3100. The upper surface 819 of the intermediate region 815 can prevent the device 2100 from drifting posteriorly within the eye once the device 2100 is implanted in the eye and still engaged with the insertion tool 800. A lower surface 827 of the proximal end region 805, the lower surface 817 of the intermediate region 815, and a lower surface of the distal end region 810 are generally continuous with one another such that the insertion tool 800 has a relatively smooth uniform lower surface from the proximal end region 805 to the distal end region 810. The smooth lower surface of the insertion tool 800 allows for it to slide smoothly along an internal channel 3120 of an injector 3100 (see FIGS. 13A-13C).

Again with respect to FIGS. 11A-11B, the distal end region 810 can include a distal hook 820 that together with the intermediate region 815 can be used to manipulate the device 2100 during implantation. At least a first portion 821 of the distal hook 820 projects proximally out over the upper surface 819 of the intermediate region 815. At least a second portion 822 of the distal hook 820, which can project distally, can form a distal-most end of the insertion tool 800. The distal hook 820 has a height H between a base 823 of the distal hook 820 and an underside 824 of the second portion 822. The distal hook 820 has a width Wd across its upper surface 825. The height H and width Wd of the distal hook 820 is low profile enough so that it can be inserted through distal opening 3115 of the distal tip 3110 of the injector 3100 sized to insert through a clear corneal incision. The height H and width Wd of the distal hook 820 is sufficient for inserting under the awning 2126 of the device 2100 while also hooking the device 2100 upon retraction. In an implementation, the height H can be between about 0.1 mm and about 1.0 mm and the width Wd can be between about 0.1 mm and about 3.0 mm. The proximal end region 805 is also sized to be ejected completely through the distal opening 3115. However, unlike the distal end region 810, the proximal end region 805 remains outside the eye. Thus, the entire insertion tool 800 can be ejected completely through the distal opening 3115 of the distal tip 3110 of an injector 3100, but only the distal end region 810 and at least a portion of the intermediate region 815 are typically inserted inside the eye during delivery of a device 2100. The proximal end region 805 can have a height H from its lower surface 827 to its upper surface 829 that is between about 0.5 mm and about 2.5 mm. The proximal end region 805 can have a width Wp side to side that is between about 0.5 mm and about 3.0 mm.

The length of the insertion device 800 between its distal-most end and its proximal-most end can vary. The distal end region 810 can have a length that is sufficient to insert under an awning 2126 of the device 2100. The intermediate region 815 has a length that is sufficient to position the distal end region 810 under the awning 2126, for example, near the leading fixation arm 2120c and support the remainder of the device 2100 even when elongated during compression through the internal channel 3120 of the injector 3100 (see FIG. 13C). The intermediate region 815 can support the device 2100 when compressed and elongated without causing warping, flipping, twisting, or otherwise turning relative to the Z-plane within the injector 3100. In an implementation, the intermediate region 815 can have a length that is about 5.0 mm to about 25 mm. The proximal end region 805 can also vary in length, for example, between about 2.0 mm to about 20 mm. Thus, the insertion device 800 can have an overall length between its distal-most end and its proximal-most end that is between about 7 mm up to about 60 mm. This allows for the insertion device 800 to enter the eye a distance to access an opposing fixation site and still have sufficient length of the proximal end region 805 outside the eye for manipulating by a user.

The insertion device 800 can extend through the injector 3100 such that it is used to load the device 2100 within the internal channel 3120. The internal channel 3120 can be wider at a proximal end and taper distally towards the distal opening 3115 at the distal tip 3110 of the injector 3100 (see FIGS. 13A and 13C). The device 2100 can be supported by the insertion device 800 so that the distal hook 820 inserts under the awning 2126 and the distal-most end of the device 800 abuts against an internal wall of the recess 2104, for example, interior to or near a location of the leading fixation arm 2120c. The lower surface 817 of the intermediate region 815 can contact an anterior-facing surface of the posterior platform 2105. The intermediate region 815 can extend through the central aperture 2115 such that an upper surface 819 of the intermediate region 815 can contact a posterior-facing surface of the posterior platform 2105 between the trailing fixation arms 2120a, 2120b.

The device 2100 can be loaded into the internal channel 3120 from the proximal end. Prior to insertion within the internal channel 3120 the device 2100 can have a greater width than a width of the internal channel 3120 (see FIG. 13A). As the insertion device 800 is advanced into the internal channel 3120 towards the distal opening 3115, the taper of the internal channel 3120 compresses a resting width of the device 2100 towards a narrowed width and elongated configuration (see FIG. 13C). The compressed device 2100 shown in FIG. 13C has a greater length than the uncompressed device 2100 shown in FIG. 13A prior to insertion within the internal channel 3120. A length of the intermediate region 815 is sufficient to receive the elongated length of the compressed device 2100 as it advanced through the internal channel 3120. The leading fixation arm 2120c extends in a generally straight configuration distally through the internal channel 3120 whereas the trailing fixation arms 2120a, 2120b may be urged closer together while still in the folded configuration during distal movement through the internal channel of the IOL injector. The trailing fixation arms 2120a, 2120b may maintain the bend B during injection through the internal channel 3120 although the bend B may also become contorted. Once the device 2100 and its trailing fixation arms 2120a, 2120b are freed from the forces of the injector, the bend B of the fixation arms can return to its initial state. Thus, the injection process may impose forces that deform the bend B of the fixation arms 2120a, 2120b to become unbent or take on another shape from their resting shape, but once freed from those forces return to the resting bent shape.

Figures 14A, 14B:
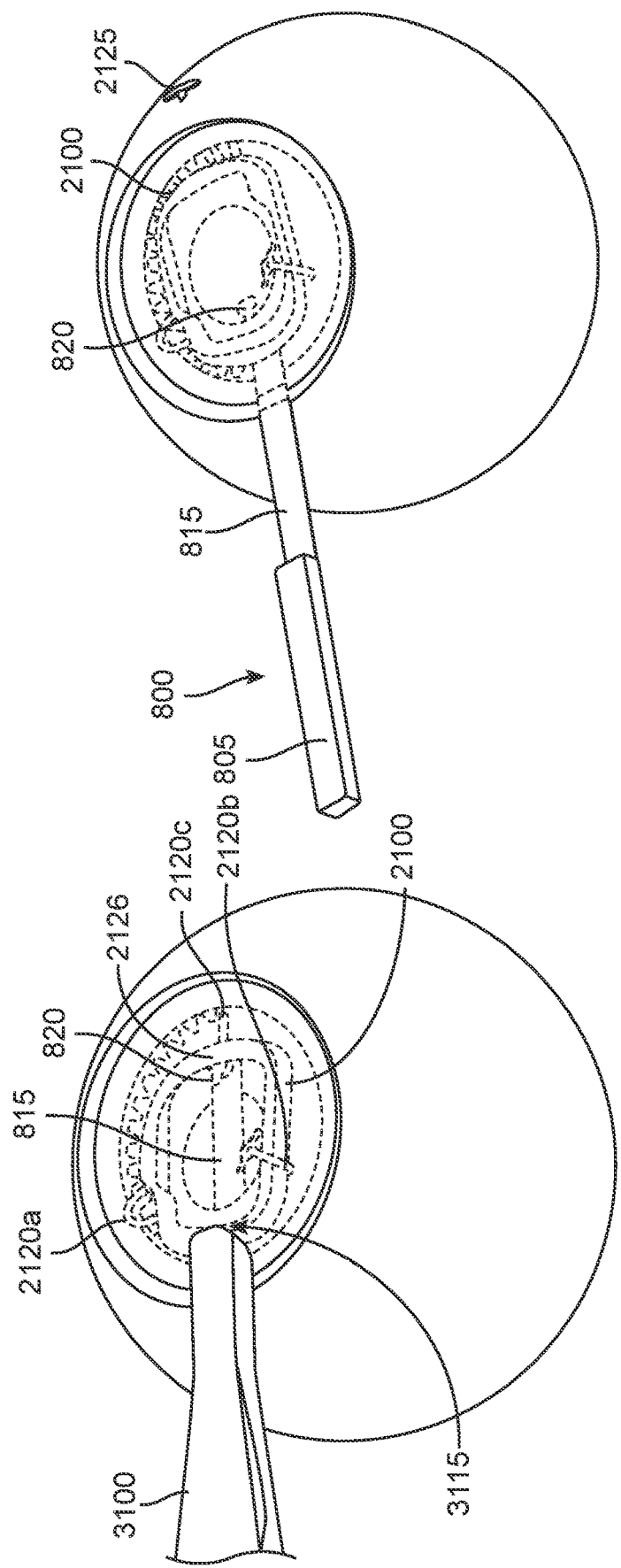
FIGS. 14A-14B illustrate the insertion tool engaged with a lens support device inserted into an eye.

The leading fixation arm 2120c can be ejected out the distal opening 3115 first prior to full ejection of the device 2100 from the internal channel 3120. This allows for the device 2100 to be held by the insertion device 800 while the leading fixation arm 2120c is externalized through the sclera (see FIGS. 14A-14B). Once the leading fixation arm 2120c is externalized, the remainder of the device 2100 can be ejected from the distal opening 3115 (FIG. 14B). The device 2100 even when ejected from the distal opening 3115 of the injector 3100 can still be engaged with the insertion device 800. The proximal hook 820 and platform of the insertion device 800 formed by intermediate region 815 can remain engaged with the device 2100 and used to manipulate the device 2100 into a desired position relative to the eye before fully releasing it. For example, the insertion tool 800 can be withdrawn relative to the fixed device 2100 so that the distal hook 820 engages with the inner wall 2109 defining the central aperture 2115. The first portion 821 of the distal hook 820 can extend over an anterior-facing surface of the posterior platform 2105 so that the inner wall 2109 is positioned between the underside 824 of the first portion 821 and the base 823 of the hook 820. The distal hook 820 can be used to manipulate the device 2100 during implantation, for example, to improve visualization, adjust the angle to facilitate grasping the anchors, or otherwise adjust the device 2100 relative to the eye to assist with the surgical procedure. Once the trailing fixation arms 2120a, 2120b are externalized, the insertion tool 800 can be disengaged from the central aperture 2115 and manually retracted through the main incision in the eye.

Figure 14D:
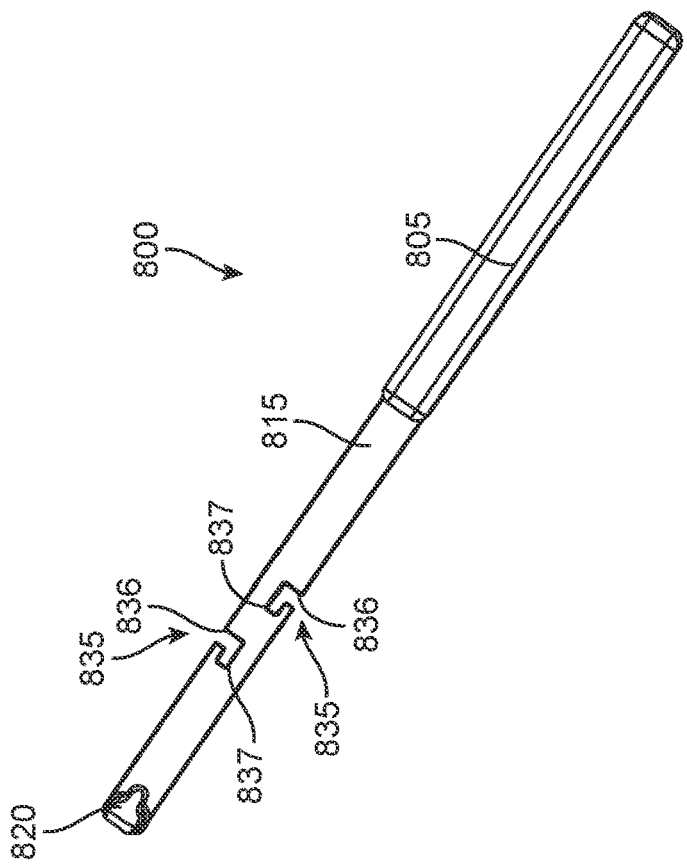
FIGS. 14C-14D illustrate the insertion tool having one or more cut-outs configured to engage with at least a portion of a fixation arm of a device.
Figure 14C:
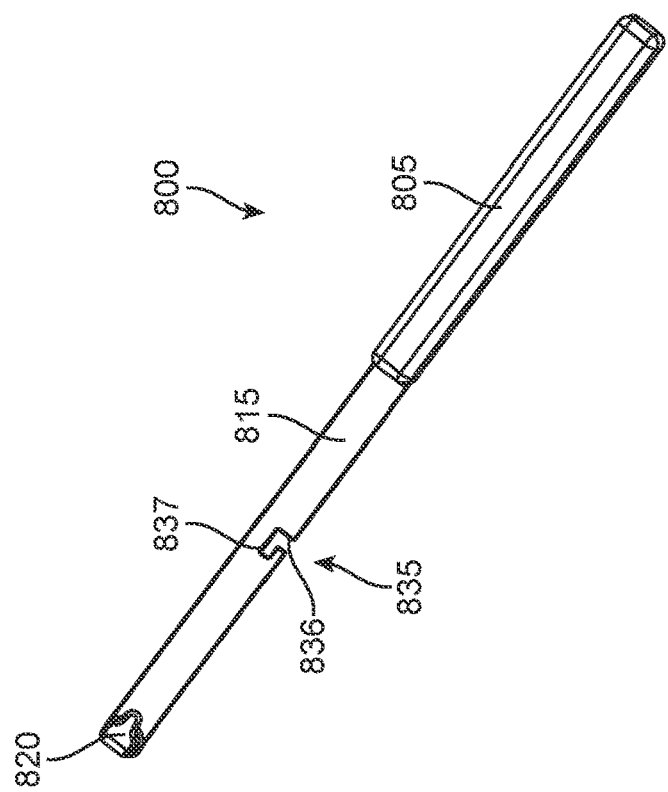

The injector 3100 can include a non-traditional bevel along the longitudinal axis that exposes one of the trailing fixation arms 2120a, 2120b before the device 2100 is fully ejected from the internal channel 3120. The internal channel 3120 and/or the insertion device 800 can also include one or more features that engage at least a portion of one or more of the trailing fixation arms 2120a, 2120b such as the anchors 2125 so that upon loading the device 2100, the anchors 2125 are manipulated into a fixated position relative to the internal channel 3120. The device 2100 can be advanced forward through the internal channel 3120 and the anchors 2125 can remain engaged with the slotted features as the device 2100 advances. In an implementation, the intermediate region 815 of the insertion device 800 can include at least a first cut-out 835 configured to receive at least a portion of a trailing fixation arm (see FIG. 14C). The intermediate region 815 of the insertion device 800 can include at least a first and a second cut-out 835a, 835b as shown in FIG. 14D so that both of the trailing fixation arms 2120a, 2120b may be fixed relative to the insertion device 800. The first cut-out 835a may fix a portion of a first trailing fixation arm on a first side of the intermediate region 815 and the second cut-out 835b may fix a portion of a second trailing fixation arm on an opposite side of the intermediate region 815. The cut-out(s) 835 can have any of a variety of shapes configured to receive and hold the portion of the trailing fixation arm. In some implementations, the cut-out 835 is substantially L-shaped and include a first portion 836 having a larger dimension configured to receive the portion of the arm and a second portion 837 having a smaller dimension configured to releasably fix the portion of the arm so that it remains engaged with the cut-out 835 as the insertion tool delivers the device 2100. The cut-outs 835 can engage the trailing arms in such a way that their anchors remain visible and easily graspable by a user. The insertion tool 800 with the cut-out 835 can be used with trailing arms that are biased to a bent configuration or trailing arms that are not biased. The trailing arms need not be inwardly biased and can instead can be held with by the cut-outs 835 (or other feature) of the insertion tool into the inwardly biased or bent configuration so a user may visualize them through the pupil. The trailing arms can be released from engagement with the cut-out 835 manually such as by pulling them out of the cut-out 835 with a set of forceps or by simply moving the insertion device 800 distally or twisting the device 800 relative to the device 2100 so that the portions of the arms are urged out of the smaller dimension second portion 837 of the cut-out 835 and released through the larger dimension first portion 836.

Figure 13C:
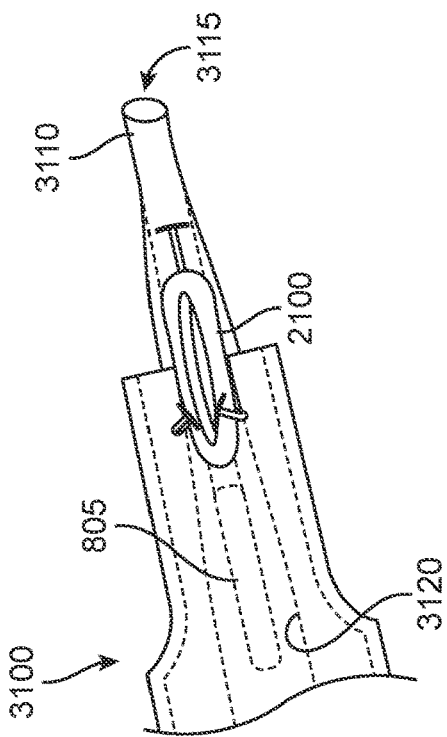
FIG. 13C illustrates the insertion tool being advanced to the distal end of the injector.
Figure 13A:
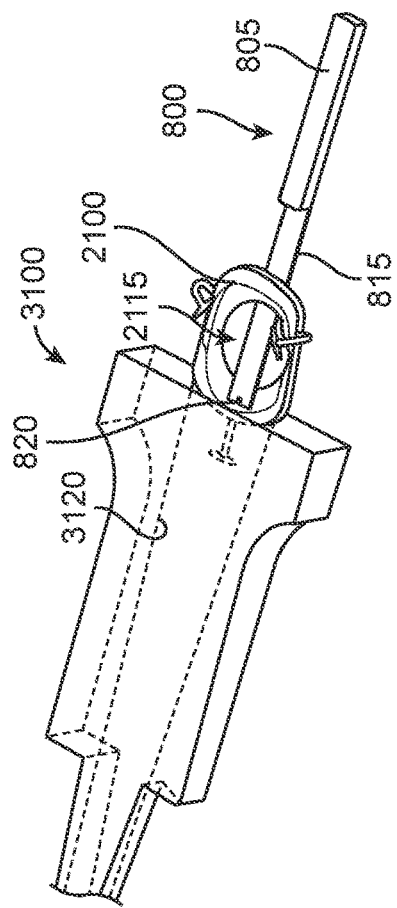
FIGS. 13A-13B illustrate an insertion tool engaged with a lens support device being loaded into an injector.
Figure 13B:
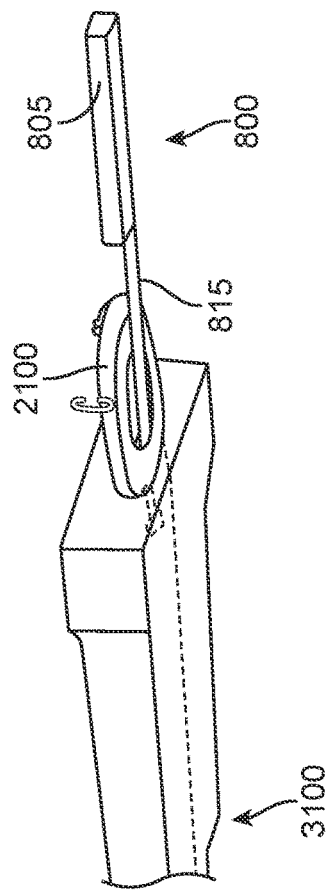

The device 2100 can be loaded from the proximal end as shown in FIGS. 13A-13C. Alternatively, the device 2100 can be loaded from the distal opening 3115 or from a front end of a cartridge 3200 configured to engage with the injector 3100 and withdrawn proximally. It should be appreciated that where the internal channel 3120 is referred to herein the internal channel 3120 can be part of or contiguous with an internal channel of a cartridge loaded with the injector or a distal end of the injector itself Any of a variety of loading configurations and injector configurations are considered herein. Similarly, any of a variety of actuation mechanisms for ejecting the insertion device 800 from the injector 3100 are considered herein.

The insertion tool 800 can present a device 2100 having fixation arms 2120 into the eye so that the anchor 2125 of the leading fixation arm 2120c is in a position most amenable to trans-scleral fixation (see FIGS. 14A-14B). The tool 800 can include one or more features that engage the anchors 2125 of the arms 2120. The anchors 2125 can be held back in a way that allows the surgeon to selectively expose or grab them as the device 2100 is being urged from the channel 3120. The surgeon can maneuver the cartridge (i.e., tilt, advance, retract) to position the anchors to make them easier to grab. The insertion tool 800 thus presents the anchors 2125 of the arms 2120 so that the biased arms 2120 of the device remain visible through the pupil for more convenient and safer capture prior to externalization.

The insertion tool 800 can deploy the device 2100 in the eye while mitigating inversion of the device within the injector 3100. The lower surface of the tool 800 can engage with the cartridge in a way that limits rotation of the tool 800 when positioned inside the cartridge. The channel 3120 and the tool 800 may include curvatures and interfacing surfaces having dimensions that limit the ability of the tool 800 and thus, the device 2100 engaged with the tool 800 to tilt or rotate relative to the channel 3120 longitudinal axis. The tool 800 may also engage with the channel 3120 via specific mating features that prevent inadvertent movements, including a tongue and groove mating surface.

The insertion tool 800 described above is designed to be compatible with any of a variety of injectors 3100. However, the devices 2100 described herein can be inserted with a tool without use of an injector 3100. For example, the support device 2100 can be loaded onto the insertion tool 800 and the device 2100 manipulated in the anterior chamber. Resistance from the edge of the incision can cause the device 2100 to fold and elongate as the tool 800 and the device 2100 are inserted into the eye.

FIGS. 15A-15D illustrate another implementation of an insertion tool 900 that can be used to deliver a device 2100 without use of an IOL injector. The insertion tool 900 can include a proximal end region comprising an actuator and a distal end region having a sled 905 with a distal hook 910 and a proximal hook 915. The distal end region is sized for insertion through a clear corneal incision and the proximal end region is sized to remain outside the eye. The sled 905 can provide posterior support in a Z-plane to prevent the lens support device from falling posteriorly within the eye during implantation. Each hook 910, 915 can be used to push, pull, capture, and/or restrain at least a portion of the device 2100 during insertion. The hooks 910, 915 are configured to extend through the central aperture 2115 of the device 2100 from a posterior side when a posterior surface of the device 2100 is supported on an upper surface of the sled 905. The distal hook 910 can engage a leading portion of the device 2100 and the proximal hook 915 can engage a trailing portion of the device 2100. Each hook 910, 915 has a shape that projects upwards from the sled 905 and over at least a portion of an anterior-facing surface of the device 2100 so that the device 2100 is held between the sled 905 and the hooks 910, 915. In some implementations, the distal hook 910 can be sized and shaped to fit under the distal awning 2126 so that a distally-facing surface of the hook 910 can bear against an inner surface of the device 2100, for example, near the leading end of the device 2100 to urge it distally. The shape of the distally-facing surface can be atraumatic and rounded to avoid penetrating the material of the device. The shape of the distally-facing surface can be wedge-shaped so that the distal hook 910 can insert within this region to act as a pusher or plunger for the device 2100. The proximal hook can have a proximally-facing surface arranged to bear against an inner surface on an end of the lens support device away from the leading fixation arm. The distal end region having the distal hook and that proximal hook can be sized for insertion into the anterior chamber, for example, through a clear corneal incision. The proximal end region is sized to remain outside the eye for manipulation by a user. At least one of the distal hook and the proximal hook is movable by an actuator between a first configuration where the distal hook and the proximal hook are nearer to one another compared to a second configuration where the distal hook and the proximal hook are farther away from one another as described in more detail below.

The insertion tool 900 can have a loading configuration in which the hooks 910, 915 are positioned relative to one another so that a space S1 between the base of each of the hooks 910, 915 is sized less than a diameter of the central aperture 2115 of the device 2100 (See FIGS. 15A-15B). This allows for the device 2100 to be loaded onto the sled 905 and the hooks 910, 915 to insert through the aperture 2115. The insertion tool 900 can have an insertion configuration in which the space S2 is enlarged by moving at least one of the hooks 910, 915 by an actuator 920 of the insertion tool 800 (see FIGS. 15C-15D). In some implementations, the actuator 920 is configured to urge the distal hook 910 distally away from the proximal hook 915 to increase the space. In other implementations, the actuator 920 is configured to retract the proximal hook 915 proximally away from the distal hook 910. In still further implementations, both hooks 910, 915 are movable by one or more actuators 920 and are urged away from one another to increase the space between them. The result regardless of the actual mechanism is that the device 2100 held by the hooks 910, 915 is urged into a stretched configuration suitable for insertion into the eye through the incision. The movement of one or both of the hooks 910, 915 can be a manual motion to stretch the device 2100 where the device 2100 provides a force to urge the hooks 910, 915 back toward each other. The insertion tool 900 can incorporate a spring or other feature that aids in controlling the stretch into the insertion configuration and/or the return to the loading configuration.

As with other implementations described herein, the resistance provided by the edge of the incision can further urge the device 2100 into a folded, elongate configuration while engaged with the sled 905 as the sled 905 and the device 2100 are inserted through the incision. The sled 905 provides posterior support preventing the device 2100 from falling posteriorly within the eye. The surgeon can maneuver the sled 905 (e.g., tilt, advance, retract) to position the anchors 2125 of the device 2100 to make them easier to grab.

It should be appreciated that the insertion tools described herein can be used to deliver any of a variety of lens support devices, which need not be configured exactly as shown in the figures. For example, FIGS. 15A-15D illustrate a lens support device 2100 having three fixation arms including two arms that are biased into a folded configuration. The device 2100 to be inserted may have fewer or more fixation arms than what is shown. In some implementations, the device need not have any fixation arms 2120 or the fixation arms 2120 need not be biased into a folded configuration and can be straight. The device may have any of a variety of configurations. The devices, regardless whether there are any fixation arms, includes a central aperture that allows for the device to be engaged with the insertion tool from a posterior side of the device.

The devices described herein can be implanted incorporating vitreoretinal techniques and tools modified to accommodate the features and components of the device. For example, the devices described herein can be implanted and/or manipulated using the delivery device inserted through a posterior segment hubbed cannulae having a narrow tube with an attached hub or overcap. The cannula may be inserted into an incision or puncture up to the overcap, which acts as a stop preventing the tube from fully entering the eye. Instruments can be inserted into the eye through the cannula and the tube protects the eye tissue from repeated contact with the instruments. The cannula also provides an easy access conduit to enter and re-enter the eye without needing to hung for openings using another tool.

Figure 16B:
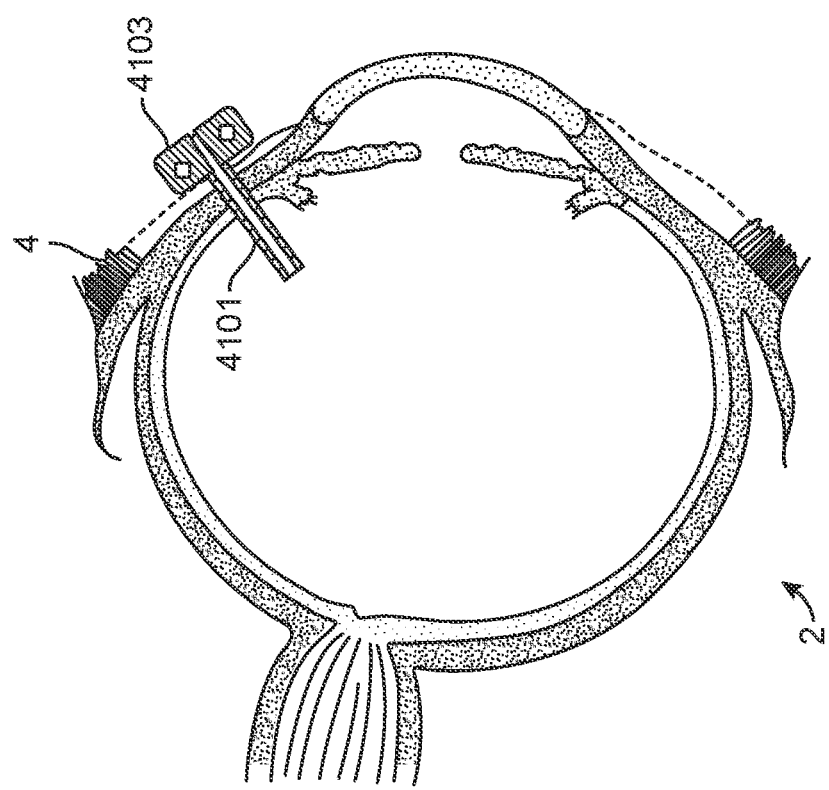
FIG. 16B is a cross-sectional schematic view of an eye having a cannula inserted trans-sclerally.
Figure 16A:
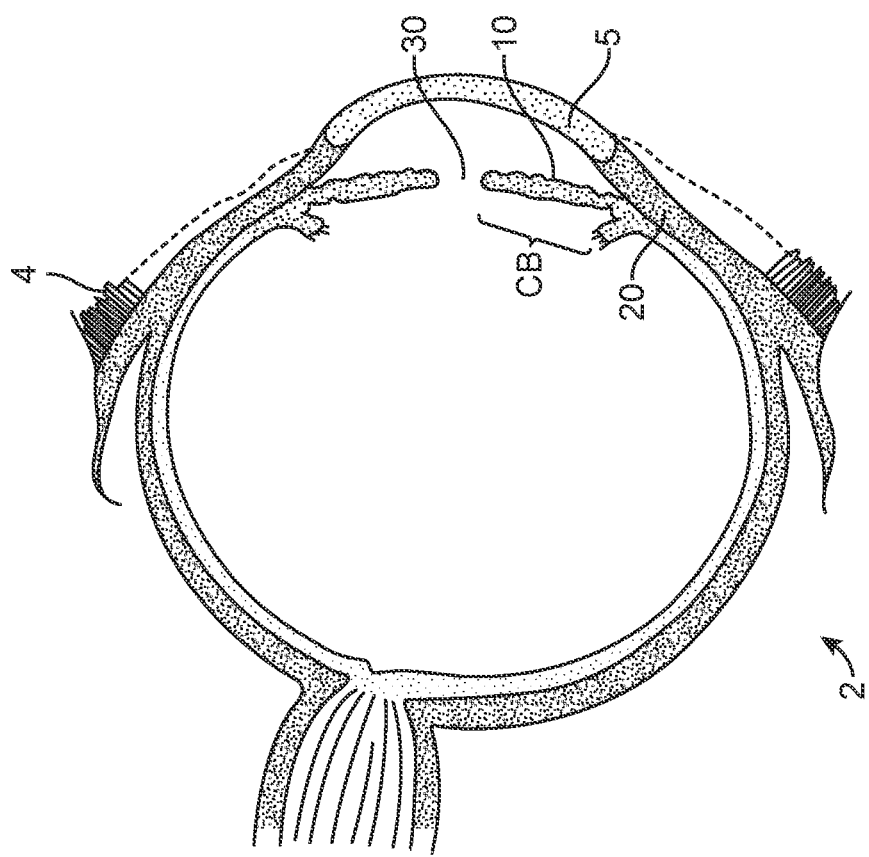
FIG. 16A is a cross-sectional schematic view of an eye.
Figure 16D:
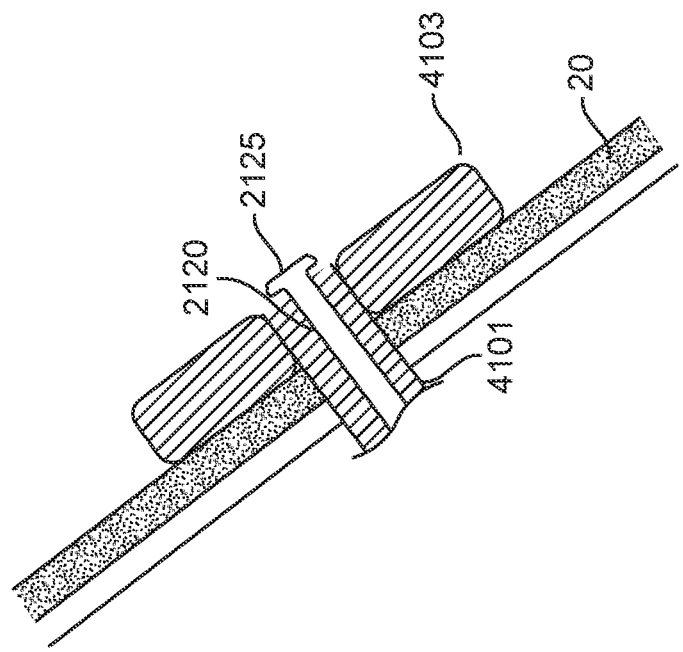
FIG. 16D is a close-up cross-sectional schematic view of a cannula being used to externalize a device anchor.
Figure 16C:
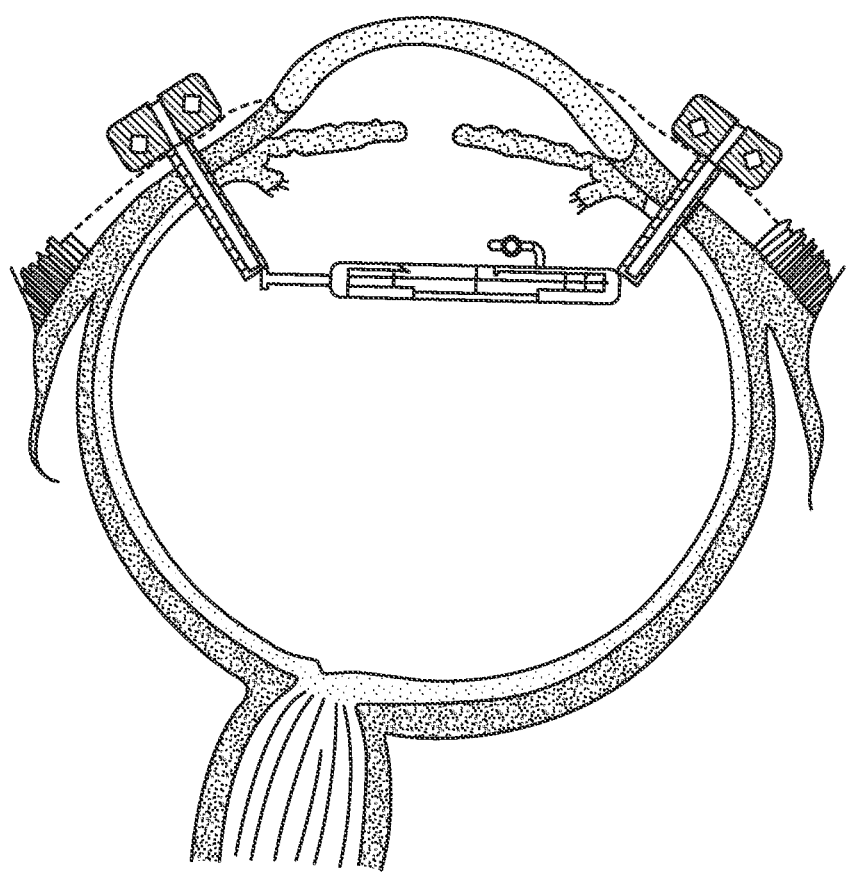
FIG. 16C is a cross-sectional schematic view of an eye having two cannulas inserted and one being used for externalization of a device anchor.

FIG. 16A illustrates an eye 2 showing the conjunctiva 4 and the sclera 20 and lacking a natural lens and capsular bag. FIG. 16B shows the eye 2 having a cannula 4101 inserted through the sclera 20 into the vitreous and a port or overcap 4103 positioned above the sclera 20. FIG. 16C shows the eye having an additional cannula 4101 and overcap 4103 inserted in another part of the sclera 20 and a device 2100 having a plurality of fixation arms 2120 positioned within the eye behind the iris 10. The one or more fixation arms 2120 can be externalized through the one or more cannulae 4101.

FIG. 17A shows an implementation of the cannula 4101 and the overcap 4103. Any of a variety of trocar cannula systems known in the art can be used to position and implant the devices described herein. This trocar cannula system is shown for illustrative purposes and is not intended to be limiting. The cannula 4101 may include a shaft 4105 capable of extending into the eye (e.g., through a sclera, conjunctiva, etc.). The cannula 4101 may be attached to the overcap 4103 at its proximal end. For example, the cannula 4101 may include one or more tabs 4107 configured to engage corresponding slots 4109 on the cannula 4101 (e.g., the cannula 4101 illustrated in FIG. 17A includes four tabs 4107 to engage four corresponding slots 4109 on the overcap 4103). Other attachments are also contemplated. For example, the cannula 4101 may include the slots and the overcap may include the tabs. In some embodiments, the cannula 4101 may be attached to the overcap 4103 through adhesive, thermal bonding, etc. In some embodiments, a seal 4111 may be coupled to the overcap 4103 (e.g., the seal 4111 may be disposed at least partially between the shaft 4105 and the overcap 4109) to form an overmolded valve. As shown in FIG. 17A, a surface of the seal 4111 may be exposed on the overcap 4109. In some embodiments, the exposed surface of the seal 4111 may include one or more slits 413 to allow passage of surgical tools into the cannula 4101. In the absence of a surgical instrument, the seal 4111 may inhibit fluid flow through the seal 4111. FIG. 17B illustrates the cannula 4101 affixed to the overcap 4103 (e.g., after engagement of the tabs 4107 in respective slots 4109). The tab/slot interface may prevent rotation of the overcap 4103 relative to the cannula 4101 (e.g., during insertion of the cannula 4101 into the eye). In some embodiments, the tabs 4107 may be configured to permanently hold the overcap 4103 to the cannula 4101 (such that the overcap 4103 may not be removed from the cannula 4101 without destroying part of the cannula 4101 and/or overcap 4103). For example, the tabs 4107 (and cannula 4101) may be made of stainless steel and the overcap 4103 may be made of plastic (e.g., polycarbonate). Other materials are also contemplated. The permanent hold between the overcap 4103 and the cannula 4101 may prevent inadvertent removal of the overcap 4103 from the cannula 4101 during surgery (e.g., externalization of the anchors 2125 of the device 2100).

FIG. 17C illustrates the cannula 4101 on a trocar inserter 4501. The trocar inserter 4501 can include a trocar blade 4503 attached to a handle 4505. The handle 4505 may be made of plastic and the blade 4503 may be made of stainless steel. Other materials are also contemplated. The trocar blade 4503 may extend past the end of the shaft 4105 and may include one or more sharp edges to pierce an eye (e.g., pierce a hole through the sclera and into the vitreous body) for insertion of the cannula 4101. A guide 4507 may fit into guide slot 4115 to inhibit rotation of the overcap 4103/cannula 4101 relative to the handle 4505 during insertion of the cannula 4101 into eye. In some embodiments, the guide 4507 may releasably engage the guide slot 4115 such that when the trocar inserter 4501 is withdrawn from the overcap 4103/cannula 4101, the guide 4507 does not pull the overcap 4103/cannula 4101 out of the eye. For example, the guide 4507 may frictionally engage the guide slot 4115 with a friction force that is less than a friction force exerted by the eye on the external sides of the cannula 4101 when the cannula 4101 is in the eye.

In an implementation, a transconjunctival sutureless vitreoretinal surgical procedure using a three-port trocar cannula setup can be used to position the device 2100, externalize the anchors 2125 of the fixation arms 2120, and/or implant an intraocular lens within the device 2100. The device can be inserted with or without peritomy, or making an incision at the limbus in order to reflect the conjunctiva 4 and Tenon's capsule of the eye to expose the sclera 20 and/or extraocular muscles. In a first implementation, a marker can be used to mark locations for cannula insertion. A sclerotomy guide can be used to align sclerotomy sites. The locations for the sclerotomy can include posterior to the limbus and anterior to the ora serrota. The anterior/posterior sclerotomy sites with respect to the limbus can vary between about 0.1 mm and about 4 mm (z axis) to control fixation arm tension within a desired range. The mark locations are preferably between 3-4 mm posterior to the limbus. The sclerotomy guide tool incorporating a plurality of marking elements can be used to assist in the identification of marking of sclerotomy sites for insertion of the trocar cannula system and externalization of the fixation arms. The guide can incorporate three marking features projecting from a distal end region that form a tri-pod. Each one of the marking features can be positioned around the circumference aligned relative to where a fixation arm 2120 is to be externalized, for example, approximately 120 degrees from one another.

The conjunctiva 4 can be mobilized and displaced so the entry through the conjunctiva 4 is not in line with the sclerotomy. Cannulas 4101 can be inserted through each of the three locations. Each cannula 4101 can be inserted, preferably perpendicularly through the sclera 20 over a trocar inserter 4501. The trocar cannula system can be 23G, 25G, 27G, or other small gauge to avoid the need for suturing upon removal of the cannulas 4101. In some implementations, the shaft of the cannula can be no larger than 23G. In other implementations, the shaft of the cannula can be as large as 20G, for example, so that one or more vitrectomy tools can be inserted through the cannula. For example, if implantation of the device is to be performed in combination with another procedure (e.g., removal of an intraocular foreign body or lens material fragmentation) that requires larger gauge sizes (e.g., 20G), the gauge size can be increased to accommodate the dimensions of those tools. Any of a variety of procedures can be performed through the trocar cannula systems once implanted, for example, vitrectomy can be performed through the cannula 4101, if necessary.

Once the cannulas 4101 are positioned within the eye and the ports 4103 available for use, the device 2100 can be inserted as described elsewhere herein. The device 2100 can be inserted through a corneal incision (e.g., about 3 mm) that can be located between two of the three cannulas 4101 such that the leading footplate or anchor 2125 is made available from the device inserter to be grasped by forceps within the eye accessed through the third of the cannulas 4101. The forceps may be inserted through the third cannula 4101 so as to grasp the leading anchor 2125 from within the eye once it has exited the inserter. The distal end region of the forceps are positioned trans-sclerally through the lumen of the cannula 4101 to grasp and hold the leading anchor 2125 inside the eye. The forceps can be used to externalize each of the anchors 2125 through respective cannulas 4101. The configuration of the forceps can vary, but generally the forceps are small enough and long enough to be inserted through the cannula 4101 and out the distal end of the cannula 4101 so as to grasp the anchor 2125 within the eye. The forceps can be vitreoretinal forceps such as GRIE-SHABER MAXGRIP Forceps (23G or smaller).

Each anchor 2125 can be externalized relative to the eye and also relative to the cannula 4101 and positioned in proper engagement with the external surface of the eye (e.g., the sclera) using any of a variety of step-by-step methods. In a first implementation, the distal end region of the forceps gripping the anchor 2125 can remain inside the eye while the cannula 4101 is elevated or withdrawn back through the sclera up onto a proximal end region of the forceps. The cannula 4101 can encircle the proximal end region of the forceps while the distal end region of the forceps remains inside the eye gripping the anchor 2125 distal to the distal end of the cannula 4101. Once the cannula 4101 is withdrawn and out of the way, the distal end region of the forceps gripping the anchor 2125 can be withdrawn pulling the anchor 2125 trans-sclerally to outside the eye. Once outside the eye, the anchor 2125 is released by the forceps and allowed to come into resting contact with an outside of the eye. In another implementation, the distal end region of the forceps gripping the anchor 2125 can be simultaneously withdrawn with the cannula 4101 out from the eye. The distal end region of the forceps gripping the anchor 2125 can remain outside the distal end of the cannula 4101 or can be withdrawn slightly inside the cannula 4101 as the forceps and the cannula 4101 are removed. Once the location of the anchor 2125 is external to the eye, the cannula 4101 can be lifted over a proximal end region of the forceps so that the anchor 2125 gripped at the distal end region of the forceps is fully outside the inner lumen of the cannula 4101. The fully externalized anchor 2125 (externalized from the eye and also from the cannula) can then be released by the forceps and allowed to come into resting contact with the external surface of the eye. In still further implementations, the forceps gripping the anchor 2125 can be withdrawn back through at least a portion or the entire cannula 4101 while the cannula 4101 remains in place through the eye. The anchor 2125 gripped by the distal end region of the forceps can be seen outside the eye and outside the proximal end of the cannula 4101. The cannula 4101 can then be lifted over both the distal end region of the forceps gripping the anchor 2125 and the proximal end region of the forceps as the cannula 4101 is removed from the eye. The anchor 2125 gripped by the distal end region of the forceps is then revealed out the distal end of the cannula 4101 upon full withdrawal of the cannula 4101 from the eye. The anchor 2125 can then be released by the forceps and allowed to come into resting contact with the outside of the eye.

The forceps can be inserted through each cannula 4101 to grasp and externalize each anchor 2125. Once each anchor 2125 is trans-sclerally positioned, the IOL can then be injected within the housing of the device 2100 using an IOL inserter positioned through the corneal incision. The visualization features 2117 can aid in the positioning of the IOL into the recess 2104 of the device 2104. The visualization features 2117 can project sufficiently out from behind the iris so that a surgeon can visualize the device 2100 anteriorly during the IOL insertion step. Direct visualization of the IOL relative to the device 2100 through the pupil increases the accuracy of insertion and that the IOL is properly secured to the device 2100. To ensure coverage of the anchors 2125, either the conjunctiva 4 or Tenon's capsule can be elevated during externalization of the anchors 2125 so the anchors 2125 are released sub-Tenon's/sub-conjunctiva. Alternatively, the anchors 2125 can be released above the conjunctiva 4 and tucked back under it using forceps.

In another implementation, the anchors 2125 can be externalized through the trocar cannulas 4101 without peritomy. After locations are marked, a limited peritomy can be performed in the area of planned sclerotomy with the bare sclera 20 exposed at the marking sites. The peritomy can either be limbal (e.g., anterior and opening back posteriorly) or posterior and opening anteriorly toward the limbus. The surgical steps can be performed as described above. Once the anchors 2125 are released and laying on the bare sclera 20, the overlying peritomy can be closed in one or two layers.

Suitable materials or combinations of materials for the preparation of the various components of the devices disclosed herein are provided throughout. It should be appreciated that other suitable materials are considered. The device can be constructed from any implant grade material that can provide the functions required of the posterior platform, fixation arms, and anchors. Materials that may be employed in this device could be but are not limited to silicone elastomer, fluorosilicone elastomer, polyurethane, hydrophilic or hydrophobic acrylics, polyolefins, nylons, PVDF, PMMA, polyimide, nitinol, titanium, stainless steel, or other implant grade materials. The device may be made from a combination of materials that are geometrically mated together, chemically bonded or welded to one another, overmolded, encapsulated, or other means for joining multiple materials. A given device element may be made of multiple materials. The fixation arms may be constructed from an inelastic or semi-rigid material common to ophthalmic applications such as polypropylene, Nylon, PVDF, polyimide, PMMA, polyurethane, hydrophilic or hydrophobic acrylics, or high durometer silicones. The fixation arms can incorporate or be formed of elastic materials such as acrylics, polyurethanes, silicone elastomers or copolymers thereof that facilitate manipulation of the fixation arm during implantation. In still further implementations, the fixation arm can be formed of a semi-rigid or rigid plastic material such as polypropylene, Nylon, PVDF, polyimide, PMMA, polyurethane, hydrophilic or hydrophobic acrylics, or high durometer silicones embedded or coated with a soft, elastomeric material such as acrylics, polyurethanes, silicone elastomers or copolymers thereof. As discuss elsewhere herein, one or more inorganic pigments or organic dyes can be incorporated into the material of one or more components of the device for visualization purposes to cause the otherwise transparent material to become translucent or opaque. The pigment or dye can vary including white pigments such as titanium dioxide, or pigments of other colors including purple, blue, green, yellow, orange, red, brown, and black.

In various implementations, description is made with reference to the figures. However, certain implementations may be practiced without one or more of these specific details, or in combination with other known methods and configurations. In the description, numerous specific details are set forth, such as specific configurations, dimensions, and processes, in order to provide a thorough understanding of the implementations. In other instances, well-known processes and manufacturing techniques have not been described in particular detain in order to not unnecessarily obscure the description. Reference throughout this specification to "one embodiment," "an embodiment," "one implementation, "an implementation," or the like, means that a particular feature, structure, configuration, or characteristic described is included in at least one embodiment or implementation. Thus, the appearance of the phrase "one embodiment," "an embodiment," "one implementation, "an implementation," or the like, in various placed throughout this specification are not necessarily referring to the same embodiment or implementation. Furthermore, the particular features, structures, configurations, or characteristics may be combined in any suitable manner in one or more implementations.

The devices and systems described herein can incorporate any of a variety of features. Elements or features of one implementation of a device and system described herein can be incorporated alternatively or in combination with elements or features of another implementation of a device and system described herein. For the sake of brevity, explicit descriptions of each of those combinations may be omitted although the various combinations are to be considered herein. Additionally, the devices and systems described herein can be positioned in the eye and need not be implanted specifically as shown in the figures or as described herein. The various devices can be implanted, positioned and adjusted etc. according to a variety of different methods and using a variety of different devices and systems. The various devices can be adjusted before, during as well as any time after implantation. Provided are some representative descriptions of how the various devices may be implanted and positioned, however, for the sake of brevity explicit descriptions of each method with respect to each implant or system may be omitted.

The use of relative terms throughout the description may denote a relative position or direction or orientation and is not intended to be limiting. For example, "distal" may indicate a first direction away from a reference point. Similarly, "proximal" may indicate a location in a second direction opposite to the first direction. Use of the terms "upper," "lower," "top", "bottom," "front," "side," and "back" as well as "anterior," "posterior," "caudal," "cephalad" and the like or used to establish relative frames of reference, and are not intended to limit the use or orientation of any of the devices described herein in the various implementations.

As used herein, the term "about" means a range of values including the specified value, which a person of ordinary skill in the art would consider reasonably similar to the specified value. In aspects, about means within a standard deviation using measurements generally acceptable in the art. In aspects, about means a range extending to +/−10% of the specified value. In aspects, about includes the specified value.

While this specification contains many specifics, these should not be construed as limitations on the scope of what is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Only a few examples and implementations are disclosed. Variations, modifications and enhancements to the described examples and implementations and other implementations may be made based on what is disclosed.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible.

What is claimed is:

1. A method of inserting into an eye an ophthalmic device for supporting an artificial intraocular lens, the method comprising:
    penetrating the eye at a first location with a distal end region of an insertion tool, the insertion tool having an ophthalmic device positioned inside it;
    injecting at least a portion of the ophthalmic device from the insertion tool; and
    manipulating the at least a portion of the ophthalmic device via a cannula penetrating the eye at a second location,
    wherein the cannula comprises a shaft having a proximal end and a distal end; and
    an overcap coupled to the proximal end of the shaft, wherein the cannula extends through a sclera of the eye at the second location so that the proximal end of the shaft remains outside the sclera of the eye and the distal end of the shaft extends within a vitreous chamber of the eye.

2. The method of claim 1, wherein the ophthalmic device comprises:
    a support structure comprising an anterior-facing surface; a posterior-facing surface; and a central aperture extending through a full thickness of the support structure between the anterior-facing surface and the posterior-facing surface, the central aperture having a first perimeter forming a closed, substantially circular shape centered on a central axis of the support structure; and
    one or more fixation arms coupled to the support structure and configured to be placed under tension to locate and stabilize the ophthalmic device within the eye, each of the fixation arms coupled to a trans-scleral anchor for sutureless scleral fixation of the device within the eye.

3. The method of claim 2, wherein the one or more fixation arms comprises a leading fixation arm and two trailing fixation arms.

4. The method of claim 3, further comprising externalizing the trans-scleral anchor of one of the fixation arms via the cannula.

5. The method of claim 4, further comprising inserting the distal end of the shaft through the sclera into the vitreous chamber of the eye up to the overcap positioned external to the sclera.

6. The method of claim 4, wherein the cannula and the overcap prevent contact between tools used during externalizing the anchors and the sclera.

7. The method of claim 4, wherein the overcap further comprises a valve configured to seal the proximal end of the shaft.

8. The method of claim 5, further comprising forming three sclerotomy sites, each of the three sclerotomy sites comprising a corresponding cannula.

9. The method of claim 8, wherein the three sclerotomy sites include sites posterior to a limbus of the eye and anterior to an ora serrota of the eye.

10. The method of claim 8, wherein the three sclerotomy sites are approximately 120 degrees from one another.

11. The method of claim 8, further comprising mobilizing and displacing at least a portion of a conjunctiva of the eye prior to forming the three sclerotomy sites.

12. The method of claim 5, wherein the shaft is no larger than 23G.

13. The method of claim 8, further comprising inserting one or more vitrectomy tools through a corresponding cannula of one or more of the three sclerotomy sites.

14. The method of claim 4, wherein manipulating the at least a portion of the ophthalmic device via the cannula comprises inserting a grasping tool through the cannula and grasping the one fixation arm within the eye.

15. The method of claim 14, wherein externalizing the trans-scleral anchor of the one fixation arm through the sclera comprises withdrawing the anchor relative to the cannula until the anchor is withdrawn through the sclera and elevating the cannula so as to withdraw the distal end of the cannula from the sclera before the anchor is withdrawn through the sclera.

16. The method of claim 15, further comprising externalizing an anchor of at least a second fixation arm through another penetration in the sclera.

17. The method of claim 16, further comprising inserting an intraocular lens (IOL) into the ophthalmic device anchored relative to the sclera.

18. The method of claim 4, further comprising inserting the insertion tool supporting the ophthalmic device through a corneal incision.

19. The method of claim 18, wherein the insertion tool comprises an intraocular lens (IOL) injector.

20. The method of claim 18, wherein the insertion tool comprises:
a proximal end region;
the distal end region; and
an intermediate region connecting the distal end region to the proximal end region, wherein the intermediate region is a generally planar elongate segment and the distal end region comprises a distal hook that together with the intermediate region is configured to be inserted into the eye to manipulate the ophthalmic device during implantation.

21. A method of inserting into an eye an ophthalmic device for supporting an artificial intraocular lens, the method comprising:
positioning a cannula within a first penetration of an eye so that a distal end of the cannula is positioned within a vitreous chamber of the eye and a proximal end of the cannula is positioned external to a sclera of the eye;
penetrating the eye with a distal end region of an insertion tool at a second penetration, the insertion tool having an ophthalmic device positioned inside it;
injecting at least a portion of the ophthalmic device from the insertion tool into the eye;
inserting a grasping tool through the cannula within the first penetration;
manipulating the at least a portion of the ophthalmic device within the eye with the grasping tool; and
withdrawing the at least a portion of the ophthalmic device through the sclera with the grasping tool.

22. The method of claim 21, wherein the ophthalmic device comprises:
a support structure comprising an anterior-facing surface; a posterior-facing surface; and a central aperture extending through a full thickness of the support structure between the anterior-facing surface and the posterior-facing surface, the central aperture having a first perimeter forming a closed, substantially circular shape centered on a central axis of the support structure; and
one or more fixation arms coupled to the support structure and configured to be placed under tension to locate and stabilize the ophthalmic device within the eye, each of the fixation arms coupled to a trans-scleral anchor for sutureless scleral fixation of the device within the eye.

23. The method of claim 22, wherein withdrawing the at least a portion of the ophthalmic device through the sclera comprises externalizing the trans-scleral anchor of one of the one or more fixation arms.

24. The method of claim 23, wherein positioning the cannula within the first penetration comprises inserting the distal end of the cannula through the sclera into the vitreous chamber of the eye up to an overcap positioned on the proximal end of the cannula external to the sclera.

25. The method of claim 24, wherein the cannula and the overcap prevent contact between tools and the sclera during externalizing.

26. The method of claim 23, wherein externalizing the trans-scleral anchor of the one fixation arm comprises withdrawing the trans-scleral anchor relative to the cannula and withdrawing the distal end of the cannula through the first penetration before the trans-scleral anchor of the one fixation arm is withdrawn through the first penetration.

27. The method of claim 26, further comprising externalizing an anchor of at least a second fixation arm of the one or more fixation arms through another penetration in the sclera.

28. The method of claim 27, further comprising inserting an intraocular lens (IOL) into the ophthalmic device anchored relative to the sclera.

29. The method of claim 23, wherein the second penetration is a corneal incision.

* * * * *